United States Patent
Kim et al.

(10) Patent No.: US 11,460,901 B2
(45) Date of Patent: Oct. 4, 2022

(54) METHOD FOR DISPLAYING ONE OR MORE GRAPHICAL ELEMENTS IN A SELECTED AREA OF DISPLAY WHILE A PORTION OF PROCESSOR IS IN A SLEEP MODE

(71) Applicant: Samsung Electronics Co., Ltd., Suwon-si (KR)

(72) Inventors: Na-Young Kim, Seoul (KR); Daehwan Kim, Suwon-si (KR); Seung Wook Nam, Bucheon-si (KR); Kwang-Tai Kim, Suwon-si (KR); Hyungsup Byeon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 54 days.

(21) Appl. No.: 16/614,255

(22) PCT Filed: May 10, 2018

(86) PCT No.: PCT/KR2018/005328
§ 371 (c)(1),
(2) Date: Nov. 15, 2019

(87) PCT Pub. No.: WO2018/212500
PCT Pub. Date: Nov. 22, 2018

(65) Prior Publication Data
US 2020/0089302 A1 Mar. 19, 2020

(30) Foreign Application Priority Data
May 17, 2017 (KR) .................. 10-2017-0061194

(51) Int. Cl.
*G06F 1/3203* (2019.01)
*G06F 1/3206* (2019.01)
(Continued)

(52) U.S. Cl.
CPC .......... *G06F 1/3206* (2013.01); *G06F 1/3243* (2013.01); *G06F 3/04144* (2019.05)

(58) Field of Classification Search
CPC .................................................... G06F 1/3203
(Continued)

(56) References Cited

U.S. PATENT DOCUMENTS 8,780,055 B2 * 7/2014 Marchand ............... G06F 1/324
345/173
9,075,612 B2 * 7/2015 Yang ...................... G06F 1/3262
(Continued)

FOREIGN PATENT DOCUMENTS

EP 2879037 A1 6/2015
KR 2015-0128138 A 11/2015
(Continued)

OTHER PUBLICATIONS

Extended European Search Report dated Apr. 7, 2020, issued in European Application No. 18802458.2-1231.

*Primary Examiner* — Suresh Suryawanshi
(74) *Attorney, Agent, or Firm* — Jefferson IP Law, LLP

(57) ABSTRACT

Various embodiments of the present disclosure relate to an apparatus and a method for outputting content in an electronic device, the electronic device comprises: a display located inside a housing and exposed through a portion of a first plate; a pressure sensor circuit, which detects pressure applied to the first plate by an external force; a wireless communication circuit; a display driving circuit; at least one processor; and a memory, wherein, the memory stores instructions for causing the processor to: perform control such that the display driving circuit displays at least one graphical element on a selected region of the display having a black background screen image while at least a portion of the processor is in a sleep mode; detect a change in pressure by using the pressure sensor circuit; and inactivate the
(Continued)

display in response to the detected pressure change. Other embodiments are possible.

8 Claims, 41 Drawing Sheets

(51) Int. Cl.
    *G06F 3/041*     (2006.01)
    *G06F 1/3234*     (2019.01)

(58) Field of Classification Search
    USPC .......................................................... 713/323
    See application file for complete search history.

(56) References Cited

U.S. PATENT DOCUMENTS

| | | | |
|---|---|---|---|
| 9,489,130 B2* | 11/2016 | Kim | H04W 52/027 |
| 2010/0099394 A1* | 4/2010 | Hainzl | H04W 52/027 |
| | | | 455/418 |
| 2011/0080349 A1* | 4/2011 | Holbein | G06F 1/3203 |
| | | | 345/173 |
| 2011/0080367 A1 | 4/2011 | Marchand et al. | |
| 2011/0187750 A1* | 8/2011 | Ko | G09G 5/00 |
| | | | 345/661 |
| 2012/0315960 A1* | 12/2012 | Kim | H04M 1/72448 |
| | | | 455/574 |
| 2013/0181931 A1 | 7/2013 | Kinoshita | |
| 2015/0042571 A1 | 2/2015 | Lombardi et al. | |
| 2015/0207925 A1* | 7/2015 | Ku | G06F 1/305 |
| | | | 715/810 |
| 2016/0012029 A1* | 1/2016 | Joo | G06F 3/048 |
| | | | 715/230 |
| 2016/0034117 A1 | 2/2016 | Kim et al. | |
| 2016/0062515 A1* | 3/2016 | Bae | G06F 3/0416 |
| | | | 345/174 |
| 2016/0259412 A1 | 9/2016 | Flint et al. | |
| 2017/0097715 A1 | 4/2017 | Kim et al. | |
| 2017/0115793 A1* | 4/2017 | Namgoong | G06F 3/0414 |
| 2017/0131896 A1* | 5/2017 | Park | G06F 3/04883 |
| 2018/0046359 A1* | 2/2018 | Kim | G06F 3/04842 |
| 2018/0164939 A1* | 6/2018 | Duan | G06F 3/04886 |
| 2018/0204303 A1 | 7/2018 | Bae et al. | |
| 2019/0204868 A1* | 7/2019 | Choi | H04M 1/725 |
| 2019/0278393 A1* | 9/2019 | Lee | G06F 3/0485 |

FOREIGN PATENT DOCUMENTS

| | | | | | |
|---|---|---|---|---|---|
| KR | 2016-0000110 A | | 1/2016 | | |
| KR | 2016-0014481 A | | 2/2016 | | |
| KR | 2016-0040262 A | | 4/2016 | | |
| KR | 20160040262 A | * | 4/2016 | ........... | G06F 1/3265 |
| KR | 2017-0008698 A | | 1/2017 | | |
| KR | 20170008698 A | * | 1/2017 | ............... | G09G 3/20 |
| WO | 2014/146443 A1 | | 9/2014 | | |
| WO | 2017/035756 A1 | | 3/2017 | | |

* cited by examiner

METHOD FOR DISPLAYING ONE OR MORE GRAPHICAL ELEMENTS IN A SELECTED AREA OF DISPLAY WHILE A PORTION OF PROCESSOR IS IN A SLEEP MODE

TECHNICAL FIELD

Various embodiments of the disclosure relate to a device and a method for displaying content in an electronic device.

BACKGROUND ART

With the development of information communication technology and semiconductor technology, electronic devices are developing into multimedia devices that provide various multimedia services. The multimedia services may include a voice call service, a messaging service, a broadcast service, a wireless Internet service, a camera service, a music playback service, and the like.

Electronic devices may visually provide a variety of content (e.g., images, videos, etc.) to users through a display. The display may include a display panel for displaying content and a display driving integrated circuit (DDI) for driving the display panel.

DISCLOSURE OF INVENTION

Technical Problem

Electronic devices may control a display panel through a display driving integrated circuit so as to display content data (e.g., graphic data) provided from a processor (e.g., an application processor). The processor may produce content data, and may transmit the produced content data to the display driving integrated circuit. The display driving integrated circuit may control the display panel so as to display the content data produced by the processor in the case where the processor is limited in driving (for example, when the processor is in a sleep mode).

The electronic device may merely display the content data, based on a specified method (e.g., the position at which the content is displayed, the size of displayed content, the duration of content display, or the like), using the display driving integrated circuit while the driving of the processor is limited, but may not provide a method of controlling the displayed content, based on user input. Since the displayed content is not able to be controlled while the driving of the processor is limited, a user may not be able to release the display of the content at a desired time, which may cause an increase in power consumption of the electronic device.

Various embodiments of the disclosure may provide a device and a method for controlling the display of content in an electronic device.

Solution to Problem

According to various embodiments of the disclosure, an electronic device may include: a housing including a first plate and a second plate facing in a direction opposite the first plate; a display positioned inside the housing and exposed through a portion of the first plate; a pressure sensor IC positioned between the first plate and the second plate and configured to detect a pressure applied to the first plate by an external force; a wireless communication circuit positioned inside the housing; a display driving integrated circuit positioned inside the housing; at least one processor positioned inside the housing and electrically connected to the display, the pressure sensor IC, the wireless communication circuit, and the display driving integrated circuit; and a memory positioned inside the housing and electrically connected to the processor; wherein the memory may store instructions that, when executed, cause the processor to: while at least a portion of the processor is in a sleep mode, control the display driving integrated circuit so as to display one or more graphical elements in a selected area of the display having a substantially black background screen; detect a change in pressure using the pressure sensor IC; and deactivate the display in response to the detected change in the pressure.

According to various embodiments of the disclosure, an electronic device may include: a housing including a first plate and a second plate facing in a direction opposite the first plate; a display positioned inside the housing and exposed through a portion of the first plate; a pressure sensor IC positioned between the first plate and the second plate and configured to detect a pressure applied to the first plate by an external force; a wireless communication circuit positioned inside the housing; a display driving integrated circuit positioned inside the housing; a processor positioned inside the housing and electrically connected to the display, the pressure sensor IC, the wireless communication circuit, and the display driving integrated circuit; and a memory positioned inside the housing and electrically connected to the processor, wherein the memory may store instructions that, when executed, cause the processor to: detect a change in pressure using the pressure sensor IC while the display is inactive; and control the display driving integrated circuit so as to display one or more graphical elements in a selected area of the display having a substantially black background screen in response to the detected change in the pressure while at least a portion of the processor is in a sleep mode.

According to various embodiments of the disclosure, an electronic device may include: a housing including a first plate and a second plate facing in a direction opposite the first plate; a display positioned inside the housing and exposed through a portion of the first plate; a sensor IC positioned between the first plate and the second plate and configured to detect a user input applied to the first plate; a wireless communication circuit positioned inside the housing; a display driving integrated circuit positioned inside the housing; at least one processor positioned inside the housing and electrically connected to the display, the pressure sensor IC, the wireless communication circuit, and the display driving integrated circuit; and a memory positioned inside the housing and electrically connected to the processor, wherein the memory may store instructions that, when executed, cause the processor to: detect a user input using the sensor IC; identify a state of a power saving display mode, based at least on the user input; and determine activation or deactivation of the power saving display mode, based at least on the user input and the state of the power saving display mode.

Advantageous Effects of Invention

An electronic device and an operation method thereof according to various embodiments can activate or deactivate the display of content, based on user input, while at least a portion of the processor is in a sleep mode, thereby displaying content at a time desired by a user and reducing power consumption of the electronic device, and can change the display of content, based on user input, thereby providing various user interfaces.

BEST MODE FOR CARRYING OUT THE INVENTION

Figure 1A:
FIGS. 1A and 1B illustrate an electronic device to which various embodiments of the disclosure are applied.

Hereinafter, various embodiments of the disclosure will be described with reference to the accompanying drawings. The embodiments and the terms used therein are not intended to limit the technology disclosed herein to specific forms, and should be understood to include various modifications, equivalents, and/or alternatives to the corresponding embodiments. In describing the drawings, similar reference numerals may be used to designate similar constituent elements. A singular expression may include a plural expression unless they are definitely different in a context. As used herein, the expression "A or B" or "at least one of A and/or B" may include all possible combinations of items enumerated together. The expression "a first", "a second", "the first", or "the second" may modify various elements regardless of the order and/or the importance, and is used merely to distinguish one element from another element without limiting the corresponding elements. When an element (e.g., first element) is referred to as being "(functionally or communicatively) connected," or "directly coupled" to another element (second element), the element may be connected directly to the another element or connected to the another element through yet another element (e.g., third element).

The expression "is configured to" as used in this document may be used interchangeably with, for example, "is suitable for", "has an ability to", "is designed to", "is modified to", "is made to", or "is capable of" depending on the context in terms of hardware or software. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., central processing unit (CPU) or application processor (AP)) that can perform the corresponding operations by executing one or more software programs stored in a memory device.

An electronic device according to various embodiments of the disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit). In some embodiments, the electronic device may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

In other embodiments, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.). According to some embodiments, an electronic device may include at least one of a part of furniture or a building/structure, an electronic board, an electronic signature receiving device, a projector, and various types of measuring instruments (e.g., a water meter, an electric meter, a gas meter, a radio wave meter, and the like). In various embodiments, the electronic device may be flexible, or may be a combination of one or more of the aforementioned various devices. The electronic device according to one embodiment of the disclosure is not limited to the above described devices. In the disclosure, the term "user" may indicate a person using an electronic device or a device (e.g., an artificial intelligence electronic device) using an electronic device.

Figure 1B:

FIGS. 1A and 1B illustrate an electronic device to which various embodiments of the disclosure are applied.

According to an embodiment, if a processor is driven, an electronic device 100 may support a wake-up mode and a power saving mode. For example, if the electronic device 100 operates in a wake-up mode, the electronic device 100 may supply sufficient power to hardware modules and/or software modules included in the electronic device 100, thereby providing a variety of content (e.g., graphical elements) required by a user. If the electronic device 100 operates in a power saving mode, the electronic device 100 may activate at least some of the hardware modules and/or software modules included in the electronic device 100 to perform limited functions. For example, the power saving mode may include a sleep mode.

According to an embodiment, if the electronic device 100 operates in the power saving mode, the electronic device 100 may display and update information on a display panel under the control of a display driving integrated circuit. For example, a processor may store graphic data to be displayed in the power saving mode and driving information thereof in the memory area of the display driving integrated circuit before switching to the power saving mode. The display driving integrated circuit may perform control such that the display panel outputs graphical elements using graphic data stored in the memory area while the processor is in the power saving mode. For example, the electronic device 100 may output graphical elements to a specified area of the display panel in the form as shown in FIGS. 1A and 1B while the processor is in the power saving mode. For example, the graphic data may include at least one of an icon, an image, time, a date, a font, a graphic usage time, or a user-specified phrase. The driving information may include at least one of an update period, a display size, the amount of display information, display time, display brightness, associated function information (e.g., an application associated with a graphical element), or a display area of a graphical element. For example, as shown in FIG. 1A, the electronic device 100 may output graphical elements 110 including a date, an analog clock indicating a current time, and notification information to a specified area of the display panel. For example, in the case where the electronic device 100 is configured as a wearable device 120, the electronic device 100 may output a digital clock 130 indicating a current time and an icon 140 for executing a function to a specified area of the display panel as shown in FIG. 1B.

According to an embodiment, in the case where the electronic device 100 outputs a graphical element while the processor is limited in driving, the electronic device 100 may configure the colors of pixels used to display the graphical element as full colors supported by the display panel or as at least some limited colors thereof. The electronic device 100 may configure at least one of the remaining pixels in which the graphical element is not displayed on the display panel as a predetermined color (e.g., black). For example, if the display panel is an OLED panel, the electronic device 100 may deactivate (OFF) at least one of the remaining pixels.

According to an embodiment, in the case where the electronic device 100 outputs graphic elements in the state in which the driving of the processor is limited, the electronic device 100 may configure the colors used to display corresponding graphic elements as being different according to the type of graphic element. For example, the electronic device 100 may configure the colors for representing the current time, date, weather, and notification information as being different from each other.

According to various embodiments of the disclosure, the electronic device 100 may be referred to as an "always-on display (AOD)" because the electronic device 100 always provides information required by a user through a display even in the state in which the processor is limited in driving. In addition, the electronic device 100 may be referred to as a "self-display" that controls display of a display panel by means of an operation of the display driving integrated circuit itself in the state in which the driving of the processor is limited, which is called a "power saving display mode". In the following description, the state in which the display of the display panel is controlled by the operation of the display driving integrated circuit itself while the processor of the electronic device 100 is limited in driving will be referred as a "power saving display mode" for the convenience of explanation.

Figure 2A:
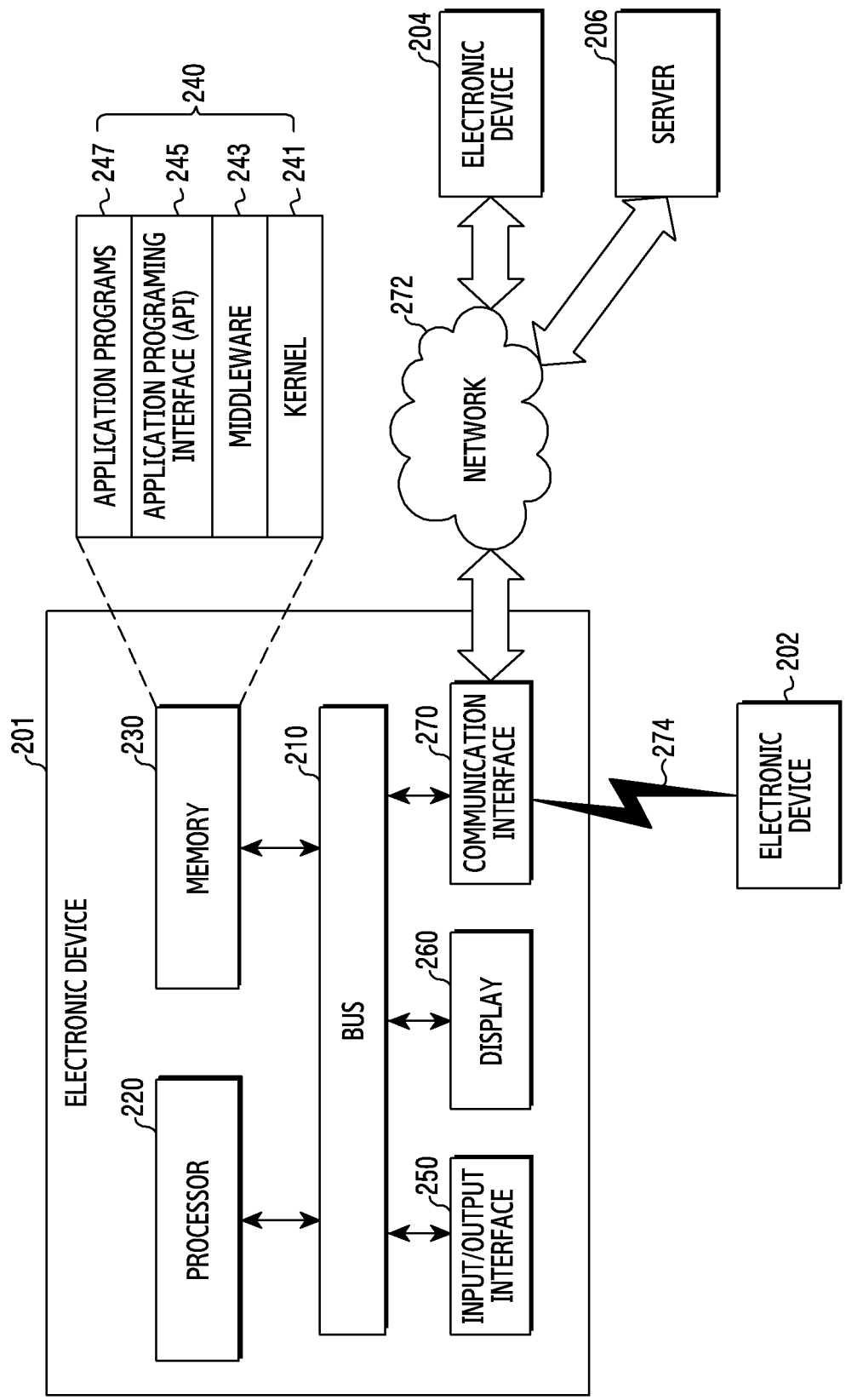
FIG. 2A illustrates an electronic device in a network environment according to various embodiments of the disclosure.

FIG. 2A illustrates an electronic device 201 in a network environment according to various embodiments of the disclosure.

Referring to FIG. 2A, an electronic device 201 may include a bus 210, a processor 220, a memory 230, an input/output interface 250, a display 260, and a communication interface 270. In an embodiment, the electronic device 201 can omit at least one of the components or further include an additional component.

The bus 210, for example, can include a circuit for connecting the components 220 through 270 and delivering communication signals (e.g., control messages or data) between the components 220 through 270.

A processor 220 may include at least one of a central processing unit (CPU), an application processor (AP), an image signal processor (ISP), a communication processor (CP), and a sensor hub {e.g., a micro controller unit (MPU)}, a display driving integrated circuit (DDI), a touch sensor IC, or a pressure sensor IC. The processor 220 may execute, for example, an operation or data processing related to control and/or communication of one or more other components of the electronic device 201.

According to an embodiment, the processor 220 may detect a user input using a touch sensor 290 or a pressure sensor 292 in the power saving display mode. For example, the touch sensor IC 291 may detect a touch using the touch sensor 290 in the power saving display mode, and the pressure sensor IC 293 may detect pressure using a pressure sensor 292.

According to an embodiment, if a user input is detected in the power saving display mode, the processor 220 may identify the state of the power saving display mode. For example, if a user input is detected in the power saving display mode, the processor 220 limited in driving may be activated to identify whether the power saving display mode is active or inactive, based at least on a user input. For example, the display driving integrated circuit 262 may display one or more graphical elements on the display panel 261 while the power saving display mode is active, and may display a black image (e.g., a black background screen) on the display panel 261 while the power saving display mode is inactive.

According to an embodiment, the processor 220 may determine activation or deactivation of the power saving display mode. For example, if a user input is detected while the power saving display mode is active, the processor 220 may deactivate the power saving display mode. In addition, for example, if a user input is detected while the power saving display mode is inactive, the processor 220 may activate the power saving display mode.

According to an embodiment, the processor 220 may determine functions of the power saving display mode, based at least on a user input and the state of the power saving display mode. For example, the processor 220 may determine whether or not the area in which a user input is detected is a first area corresponding to a specified effective touch area or effective pressure area using the touch sensor IC 291 or the pressure sensor IC 293. For example, if a user input is detected in a specified first area, the processor 220 may identify the state of the power saving display mode, and if a user input is detected in the area other than the specified first area, the processor 220 may skip the user input. For example, functions of the power saving display mode may include at least one of activation or deactivation of the power saving display mode, an update period of a graphical element, a display size of a graphical element, the amount of display information of a graphical element, a display time of a graphical element, display brightness of a graphical element, associated function information of a graphical element (e.g., an application associated with a graphical element), or a display area of a graphical element. For example, if a user input is detected in the first area, the processor 220 may activate an inactive power saving display mode, or may deactivate an active power saving display mode.

According to an embodiment, the processor 220 may display graphical elements on the display 260, based at least on the function of the power saving display mode, which is determined based at least on the user input and the state of the power saving display mode. For example, the processor 220 may display graphical elements for a time corresponding to the duration of a user input. For example, the processor 220 may display graphical elements in the display area determined based at least on a plurality of user inputs. For example, the processor 220 may display a graphical element corresponding to the area in which a user input is detected. For example, the processor 220 may display a graphical element with the brightness determined based at least on the intensity of a user input.

According to an embodiment, if a user input is detected on a graphical element, the processor 220 may execute a function related to the graphical element. For example, if a drag input is detected on a graphical element, the processor 220 may move the graphical element according to the drag input. For example, if a user input for selecting an image is detected, the processor 220 may display a detailed page including a plurality of images, and may replace the image. For example, if a user input for selecting an image is detected, the processor 220 may execute a direct call or a direct message to the contact information corresponding to the image. For example, if a user input for selecting an icon is detected, the processor 220 may display a notification window corresponding to the icon.

The memory 230 can include a volatile and/or nonvolatile memory. The memory 230, for example, can store commands or data relating to at least other component of the electronic device 201. According to an embodiment, the memory 230 can store software and/or a program 240. The program 240 can include a kernel 241, middleware 243, an Application Programming Interface (API) 245, and/or an application program (or "application") 247. At least some of the kernel 241, the middleware 243, and the API 245 may be referred to as an operating system.

The kernel 241 can control or manage system resources (e.g., the bus 210, the processor 220, or the memory 230) used for performing operations or functions implemented by the other programs (e.g., the middleware 234, the API 245, or the application program 247). Additionally, the kernel 241 can provide an interface for controlling or managing the system resources by accessing an individual component of the electronic device 201 from the middleware 243, the API 245, or the application program 247.

The middleware 243, for example, may play the intermediate role between the API 245 or the application programs 247 and the kernel 241 to facilitate communication with each other for transmission and reception of data. In addition, the middleware 243 may process one or more operation requests received from the application programs 247 according to priority. For example, the middleware 243 may give priority for using system resources (e.g., a bus 210, a processor 220, a memory 230, or the like) of the electronic device 201 to at least one of the application programs 247, and may process one or more operation requests. The API 245, as an interface through which the application 247 controls a function provided from the kernel 241 or the middleware 243, can include, for example, at least one interface or function (e.g., an instruction) for file control, window control, image processing, or character control.

The input/output interface 250, for example, can serve as an interface for delivering commands or data inputted from a user or another external device to other component(s) of the electronic device 201. For example, an input/output interface 250 may include a touch panel, and may receive touch input, gesture input, proximity input, or hovering input using electronic pens or a user's body part.

The display 260, for example, can include a Liquid Crystal Display (LCD), a Light Emitting Diode (LED) display, an Organic Light Emitting Diode (OLED) display, a Micro Electro Mechanical Systems (MEMS) display, or an electronic paper display. The display 260, for example, can display various contents (e.g., texts, images, videos, icons, or symbols) to the user. The display 260 can include a touch screen, for example, and receive touch, gesture, proximity, or hovering inputs by using an electronic pen or a user's body part.

The communication interface 270, for example, can set a communication between the electronic device 201 and an external device (e.g., a first external electronic device 202, a second external electronic device 204, or a server 206). For example, the communication interface 270 can communicate with the external device (e.g., the second external electronic device 204 or the server 206) over a network 272 using wireless communication 274 or wired communication.

For example, wireless communication 274 may include a cellular communication that uses at least one of LTE, LTE-A (LTE Advance), CDMA (code division multiple access), WCDMA (wideband CDMA), a UMTS (universal mobile telecommunications system), WiBro (Wireless Broadband), a GSM (Global System for Mobile Communications), or the like. According to an embodiment, the wireless communication 274, for example, may include at least one of LiFi (light fidelity), WiFi (wireless fidelity), Bluetooth, Bluetooth low-energy (BLE), Zigbee, NFC (near field communication), magnetic secure transmission, radio frequency (RF), or a body area network (BAN). According to an embodiment, the wireless communication may include a GNSS. The GNSS, for example, may be a GPS (Global Positioning System), a Glonass (Global Navigation Satellite System), Beidou (Beidou Navigation Satellite System), or Galileo (the European global satellite-based navigation system). Hereinafter, "GPS" may be used interchangeably with "GNSS" in this document. For example, wired communication may include at least one of a USB (universal serial bus), an HDMI (high definition multimedia interface), RS-232 (recommended standard 232), power line communication, a POTS (plain old telephone service), or the like. A network 272 may include at least one of telecommunication networks, such as a computer network (e.g., LAN or WAN), the Internet, or a telephone network.

Each of the first and second external electronic devices 202 and 204 can be of the same as or of a different type from the type of the electronic device 201. According to various embodiments, all or part of the operations executed in the electronic device 201 can be executed by one or more other electronic devices (e.g., the electronic devices 202 and 204, or the server 206). When the electronic device 201 is to perform a function or service automatically or by request, instead of or addition to performing the function or the service by the electronic device 201, the electronic device 201 can request at least part of the related function from other device (e.g., the electronic device 202 or 204, or the server 206). The other electronic device (e.g., the electronic device 202 or 204, or the server 206) can perform the requested function or an additional function and provide its result to the electronic device 201. The electronic device 201 can provide the requested function or service by processing the received result as it is or additionally. In doing so, for example, cloud computing, distributed computing, or client-server computing techniques can be used.

Figure 2B:
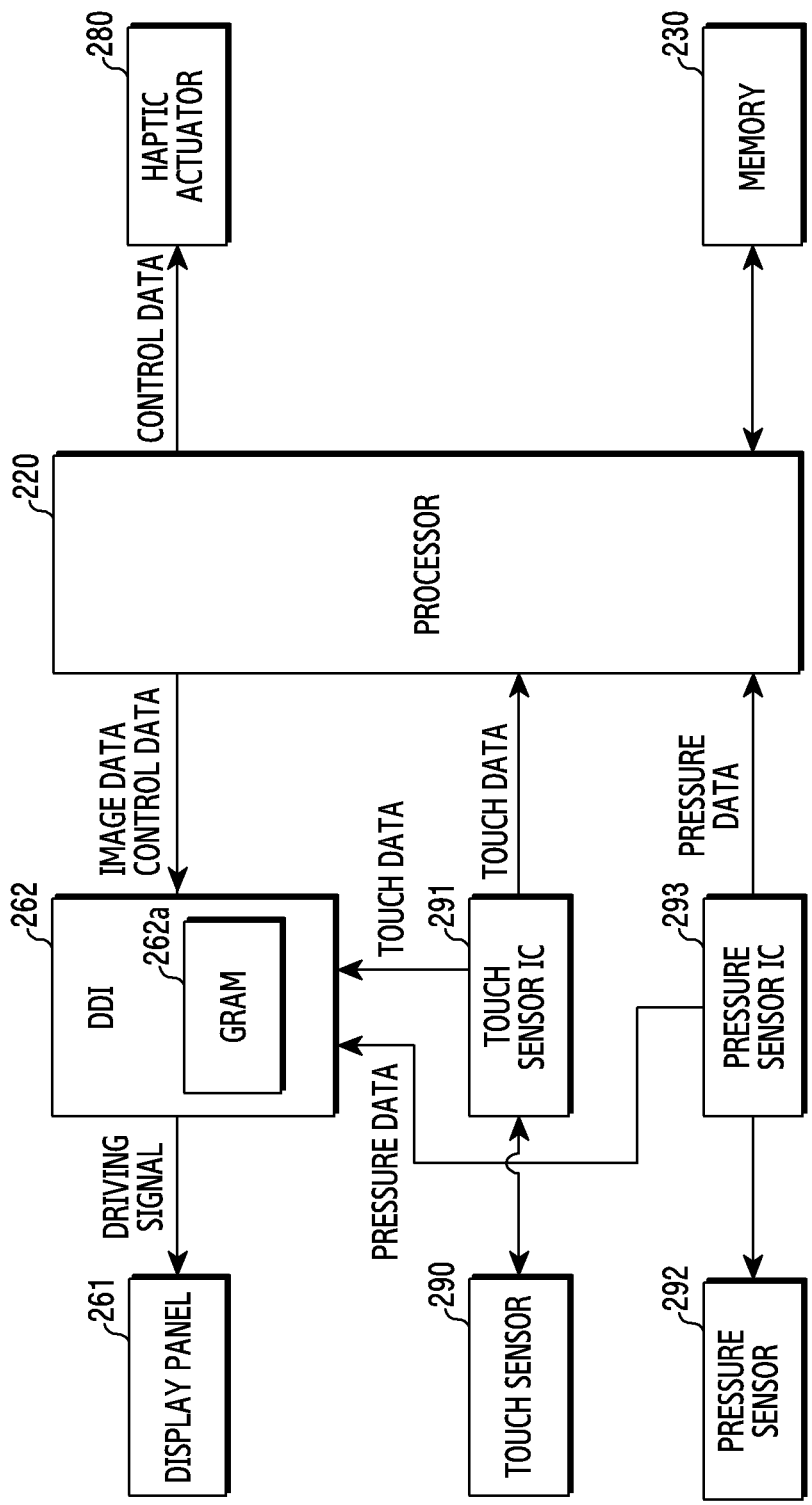
FIG. 2B is a block diagram of an electronic device for displaying content data according to various embodiments of the disclosure.

FIG. 2B is a block diagram of an electronic device for displaying content data according to various embodiments of the disclosure.

Referring to FIG. 2B, the electronic device 201 may include a processor 220, a memory 230, a display driving integrated circuit 262, a display (260 in FIG. 2A), a touch sensor IC 291, a touch sensor 290, a pressure sensor IC 293, a pressure sensor 292, and a haptic actuator 280. In some embodiments, the electronic device 201 may exclude at least one of the components, or may add other components in addition thereto. The touch sensor IC 291, the pressure sensor IC 293, and the haptic actuator 280 may be separate from each other, or may be configured as a single module. The display driving integrated circuit 262, the touch sensor IC 291, and the pressure sensor IC 293 may include a micro controller unit (MCU) therein.

The touch sensor IC 291 may transmit or receive signals {e.g., a transmission signal (TX), a reception signal (RX), a stimulus signal (shield), etc.} to and from the touch sensor 290. According to an embodiment, the touch sensor IC 291 may detect the position of a user's touch input, based on the signals transmitted/received to/from the touch sensor 290. The touch sensor IC 291 may transmit the detected position of the touch input to the processor 220. For example, the touch sensor IC 291 may transmit/receive, to/from the touch sensor 290, signals only in a touchable area defined by the processor 220. Alternatively, even though the touch sensor IC 291 transmits/receives signals with respect to the entire area to/from the touch sensor 290, if the touch input position is positioned within the touchable area, the touch sensor IC 291 may transmit the touch input position to the processor 220, and if the touch input position is positioned outside the touchable area, the touch sensor IC 291 may not transmit the touch input position to the processor 220. The touch sensor IC 291 may operate in a normal mode and/or in a low-power mode. For example, in the low-power mode, the touch sensor IC 291 may operate with a touch sensing frequency and/or a touch scan period lower than that of the normal mode. In addition, the touch sensor IC 291 may transmit and receive a touch signal only in the touchable area, and may partially drive only the touch sensor 290 disposed in the touchable area in the low-power mode.

According to an embodiment, the touch sensor IC 291 may detect a touch using the touch sensor 290 in the power saving display mode. For example, the touch sensor IC 291 may detect a touch input on the display panel 261 using the touch sensor 290 while the driving of the processor 220 is limited.

The touch sensor 290 may detect, for example, a user's touch input. The touch sensor 290 may be driven by a capacitive overlay type, a resistive overlay type, an infrared beam type, an electromagnetic induction type, or the like. In addition to the above types, all kinds of sensing types capable of detecting contact or pressure of an object may be used in the touch sensor 290. The touch sensor 290 may detect whether or not a user's touch input is received and the position of the touch input, thereby transmitting corresponding information to the touch sensor IC 291. According to an embodiment, the touch sensor 290 may be coupled to the display panel 261, may be implemented as a touch panel, and may detect a user input that comes into contact with or approaches the surface of the touch panel.

For example, the pressure sensor IC 293 may transmit or receive signals {e.g., a transmission signal (TX), a reception signal (RX), a stimulus signal (shield), etc.} to and from the pressure sensor 292. The pressure sensor IC 293 may transmit the detected intensity (pressure) of a touch input and/or the duration of pressure to the processor 220. The processor 220 or the pressure sensor IC 293 may determine the intensity (pressure) of a user's touch input and/or the duration of pressure, based on the signal received from the pressure sensor 292.

According to an embodiment, the pressure sensor IC 293 may transmit/receive, to/from the pressure sensor 292, signals only in a pressure-receivable area (e.g., an effective pressure area) defined by the processor 220. Alternatively, even though the pressure sensor IC 293 transmits and receives signals with respect to the entire area to and from the pressure sensor 292, if the pressure position is positioned within the pressure-receivable area, the pressure sensor IC 293 may transmit the pressure position to the processor 220, and if the pressure input position is positioned outside the pressure-receivable area, the pressure sensor IC 293 may not transmit the pressure position to the processor 220. The pressure sensor IC 293 may operate in a normal mode and/or in a low-power mode. For example, in the low-power mode, the pressure sensor IC 293 may operate with a pressure sensing frequency and/or a pressure scan period lower than that of the normal mode. In addition, the pressure sensor IC 293 may transmit and receive a pressure signal only in the pressure-receivable area, and may partially drive only the pressure sensor 292 corresponding to the area in which the touch sensor 290 is operated in the low-power mode.

According to an embodiment, the pressure sensor IC 293 may detect a pressure using the pressure sensor 292 in the power saving display mode. For example, the pressure sensor IC 293 may detect a pressure in a first area corresponding to the effective pressure area using the pressure sensor 292 while the driving of the processor 220 is limited.

The pressure sensor 292 may measure, for example, the intensity of pressure with respect to the user's touch. According to an embodiment, the pressure sensor 292 may be implemented integrally with the display panel 261, or may be implemented separately from the display panel 261.

The processor 220 may configure, for example, a user input-receivable area (touchable area, pressure-receivable area, etc.) that the touch sensor IC 291 and/or the pressure sensor IC 293 is able to recognize, and may transmit the same to the touch sensor IC 291 and/or the pressure sensor IC 293. The position of the user input-receivable area may be changed. In this case, the processor 220 may transmit the changed position of the user input-receivable area to the touch sensor IC 293 and/or the pressure sensor IC 293. The processor 220 may determine image information to be transmitted to the display driving integrated circuit 262, the position of the image information, and/or haptic information to be transmitted to the haptic actuator 280. For example, if the intensity of the received touch input is equal to or greater than a first threshold, the processor 220 may transmit first image information to the display driving integrated circuit 262, and may transmit first haptic information to the haptic actuator. For example, if the intensity of the received touch input is greater than or equal to a second threshold, which is greater than the first threshold, the processor 220 may transmit second image information (e.g., image information in which at least a portion of the first image information is enlarged) to the display driving integrated circuit 262, and may transmit second haptic information (e.g., haptic information stronger than the first haptic information) to the haptic actuator 280. The processor 220 may, for example, synchronize a first position and a first intensity of a touch input received at a first time, and may synchronize a second position and a second intensity of a touch input received at a second time different from the first time. The processor 220 may switch to an inactive state after transferring the information to respective modules. The processor 220 may be inactive in the power saving display mode (AOD mode). The processor 220 may be inactive in the power saving display mode, and if image information and/or control information is required to be transmitted to the display driving integrated circuit 262, the touch sensor IC 293, or the pressure sensor IC 293, the processor 220 may be activated to transmit the information, and thereafter, may return to the inactive state.

The display driving integrated circuit 262 may transmit driving signals (e.g., a driver driving signal, a gate driving signal, etc.) to the display panel 261, for example, based on the image information received from the processor 220.

According to an embodiment, the display driving integrated circuit 262 may display one or more graphical elements on the display panel 261 in the power saving display mode. For example, the display driving integrated circuit 262 may display, on the display panel 261, the graphical element pre-stored in the GRAM 262*a* while the driving of the processor 220 is limited.

For example, the display panel 261 may display a variety of content (e.g., text, images, videos, icons, and/or symbols) to the user. According to an embodiment, the display panel 261 may include a liquid crystal display (LCD), a light-emitting diode (LED) display, an organic light-emitting diode (OLED) display, or a microelectromechanical system (MEMS) display, or an electronic paper. For example, the display panel 261 may be implemented to be flexible, transparent, or wearable. In addition, the display panel 261 may be included in a cover of a case electrically connected to the electronic device 201.

The memory 230 may store, for example, instructions or data to cause the processor 220 to perform the operations above, and may include a volatile or nonvolatile memory.

The haptic actuator 280 may produce, for example, various tactile effects that the user can feel. A representative example of the tactile effects produced by the haptic actuator 280 may be a vibration effect. If the haptic actuator 280 produces vibration as a tactile effect, the intensity and pattern of the vibration produced by the haptic actuator 280 may vary, and it is possible to output vibration by mixing different vibrations or to output different vibrations in sequence. In addition to the vibration effect, the haptic actuator 280 may produce a variety of tactile effects such as an effect by stimulation due to the arrangement of pins moving perpendicular to a skin contact surface, an effect by stimulation by the jetting force or the suction force of an air through an injection nozzle or an inlet, an effect by stimulation by grazing a skin surface, an effect by stimulation through contact of an electrode, the effect by stimulation using electrostatic force, an effect by reproducing sense of coldness and warmth using an element capable of absorbing or emitting heat, and the like. The haptic actuator 280 may give a tactile effect through direct contact, or may allow the user to feel the tactile effect through a muscle sensation in a user's finger or arm. The haptic actuator 280 may include at least one vibration motor, at least one ultrasonic motor, at least one piezoelectric actuator, or at least one linear resonant actuator (LRA).

Figure 2C:
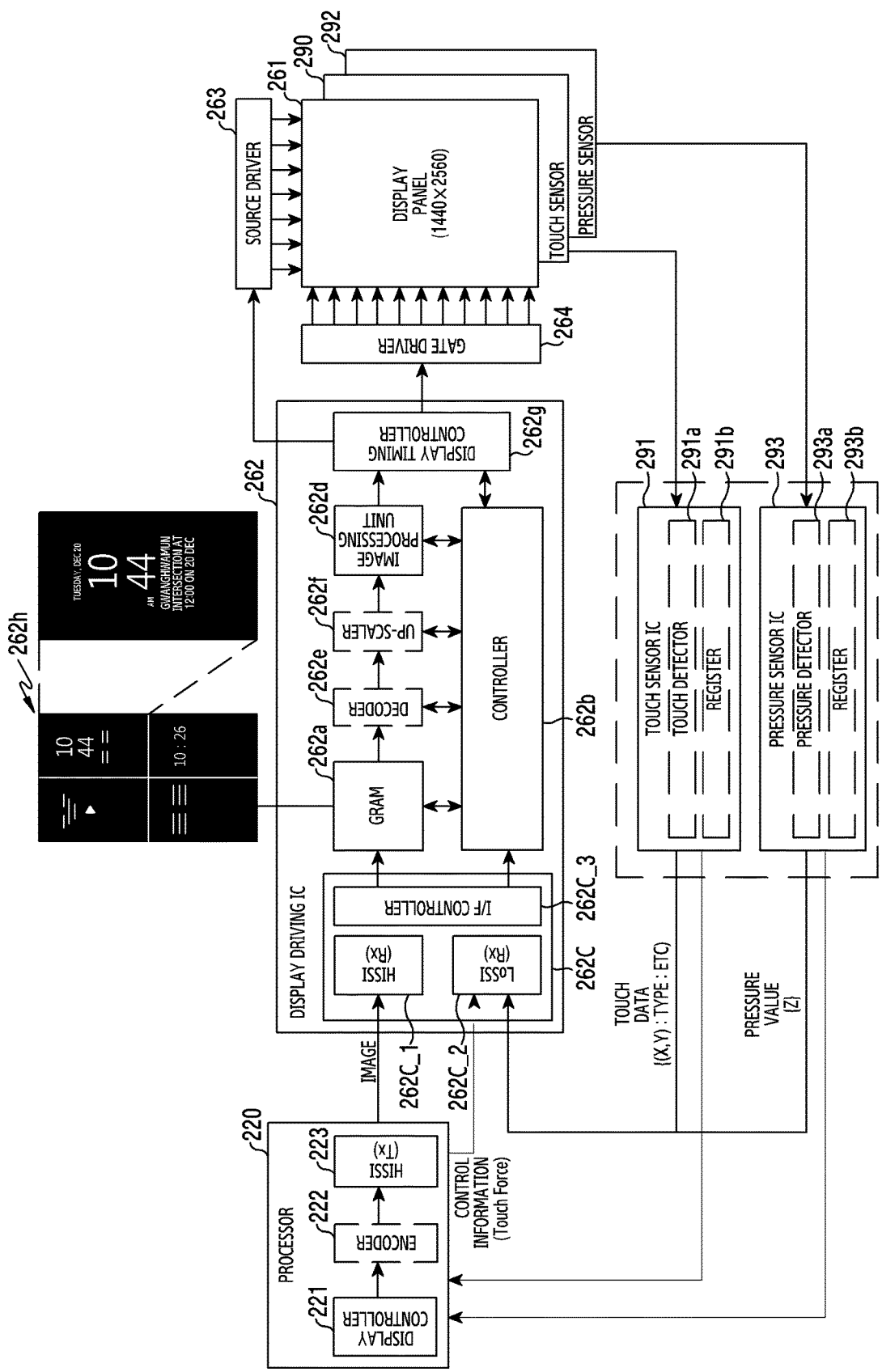
FIG. 2C is a detailed block diagram illustrating an electronic device for displaying content data according to various embodiments of the disclosure.

FIG. 2C is a detailed block diagram of an electronic device for displaying content data according to various embodiments of the disclosure. The description made with reference to FIG. 2B may be omitted herein for the convenience of explanation.

Referring to FIG. 2C, the processor 220 may include a display controller 221, an encoder 222, and a high-speed serial interface 223. In some embodiments, the processor 220 may exclude at least one of the components, or may add other components in addition thereto.

The display controller 221 of the processor 220 may produce, for example, image data. According to an embodiment, the image data may include image data in which a plurality of pieces of partial image data is concatenated. For example, the plurality of pieces of partial image data may include a first group of partial image data, a second group of partial image data, or more. According to an embodiment, the display controller 221 may include one piece of low-resolution image data having a resolution lower than the resolution of the display panel 261 (e.g., 1/m of the resolution of the display panel 261), or may produce image data by concatenating two or more (e.g. m) pieces of low-resolution image data.

The encoder 222 of the processor 220 may encode, for example, the image data produced by the display controller 221 in a specified manner (e.g., a DSC method defined by VESA). As a result, the image data produced by the display controller 221 may be compressed to reduce the data size. For example, the size of the image data produced by the display controller 221 may be reduced to 1/n by the encoding. According to various embodiments, the encoder 222 may be omitted. That is, the image data may be transmitted to the display driving integrated circuit 262 without encoding or compression.

For example, the processor 220 may transmit the image data encoded by the encoder 222 to the display driving integrated circuit 262 through a Tx high-speed serial interface 223. In addition, the processor 220 may transmit control information for selecting or controlling an image to be output to the display panel 261 to the display driving integrated circuit 262 through a Tx low-speed serial interface (not shown).

A display driving integrated circuit (DDI) 262 may drive the display panel 261. For example, the display driving integrated circuit 262 may supply an image signal corresponding to the graphic data stored in the memory of the display driving integrated circuit 262 to the display panel 261 at a predetermined number of frames. For example, if the driving of the processor 220 is limited, the display driving integrated circuit 262 may perform control so as to select at least one piece of the graphic data stored in the memory of the display driving integrated circuit 262 and to output the same to a specified area of the display panel 261. The display driving integrated circuit 262 may perform control so as to change the area displaying the graphical elements on the display panel 261 and the graphical elements displayed on the display panel 261, based on driving information stored in the memory. The memory may include a graphic random access memory (RAM) 262a of the display control module 262.

According to an embodiment, the display driving integrated circuit 262 may include a graphic RAM 262a, a controller 262b, an interface module 262c, an image processing unit 262d, a decoder 262e, an up-scaler 262f, and a display timing controller 262g. In some embodiments, the display driving integrated circuit 262 may exclude at least one of the components, or may add other components in addition thereto. Although not shown, according to various embodiments, the display driving integrated circuit 262 may further include an oscillator, a frame frequency adjusting module, a pixel power supply module, and the like.

For example, the display driving integrated circuit 262 may receive encoded image data and control information from the processor 220 through the interface module 262c. For example, the encoded image data may be received through an Rx high-speed serial interface (HiSSI) 262c_1 under the control of an interface controller 262c_3, and the control information may be received through an Rx low-speed serial interface (LoSSI) 262c_2 under the control of the interface controller 262c_3.

In addition, the display driving integrated circuit 262 may receive touch data from the touch sensor IC 291 and receive pressure data from the pressure sensor IC 293 through the interface module 262c. For example, touch data and pressure data may be received through the Rx low-speed serial interface (LoSSI) 262c_2 under the control of the interface controller 262c_3.

The graphic RAM 262a may store, for example, image data received from the processor 220 through the interface module 262c, touch data received from the touch sensor IC 291 through the interface module 262c, and pressure data received from the pressure sensor IC 293 through the interface module 262c. For example, the graphic RAM 262a may store one or more graphical elements 262h as shown in FIG. 2C. The graphic RAM 262a may include a memory space corresponding to the resolution and/or color tone of the display panel 261. According to an embodiment, the graphic RAM 262a may store at least one piece of encoded image data received through the Rx high-speed serial interface 262c_1. For example, if image data is compressed to 1/n by the encoder 222 of the processor 220, n pieces of encoded image data may be stored in the graphic RAM 262a. According to an embodiment, the encoded image data may include at least one piece (e.g., two or more pieces) of encoded low-resolution image data.

The controller 262b may control the display timing controller 262g so as to, for example, select a portion of the image data stored in the graphic RANI 262a and output the selected portion to a specified area of the display panel 261. The controller 262b may be referred by means of control logic. In addition, the controller 262b may be implemented by embedding a circuit (so-called self-display generator) for performing a display driving method of the disclosure.

For example, the interface module 262c may receive image data and control information from the processor 220, may receive touch data from the touch sensor IC 291, and may receive pressure data from the pressure sensor IC 293. The interface module 262c may include an Rx high-speed serial interface (HiSSI) 262c_1 capable of receiving the image data, an Rx low-speed serial interface (LoSSI) 262c_2 capable of receiving the control information, touch data, and pressure data, and an interface controller 262c_3 for controlling the Rx high-speed serial interface 262c_1 and the Rx low-speed serial interface 262c_2.

The image processing unit 262d may, for example, improve image quality of image data. The image processing unit 262d may include a pixel data processing circuit, a pre-processing circuit, a gating circuit, and the like.

For example, if a portion of the image data selected by the controller 262b is encoded, the decoder 262e may decode the selected portion in a specified method, and may transmit the decoded data to the display timing controller 262g. For example, if the size of the image data is compressed to 1/n by the encoder 222 of the processor 220, the decoder 262e may decompress the selected portion, thereby restoring the image data to the state before being compressed.

According to an embodiment, an up-scaler 262f and/or an image processing unit 262d may be disposed between the decoder 262e and the display timing controller 262g. According to various embodiments, if the part selected by the controller 262b is not encoded, the decoder 262e may be omitted or bypassed.

For example, the up-scaler 262f may enlarge an image to a specified magnification. According to an embodiment, if the portion selected by the controller 262b is a low-resolution video image or needs to be enlarged according to a user configuration, the up-scaler 262f may enlarge the selected portion. For example, a portion selected by the controller 262b may be enlarged to a specified magnification (e.g., m times).

According to an embodiment, the image data enlarged by the up-scaler 262f may be transmitted to the display timing controller 262g. In this case, the image processing unit 262d may be disposed between the up-scaler 262f and the display timing controller 262g. According to various embodiments, if a portion of the image data selected by the controller 262b is not required to be enlarged, the up-scaler 262f may be omitted or bypassed.

For example, the display timing controller 262g may receive image data from the graphic RAM 262a through the decoder 262e, the up-scaler 262f, and/or the image processing unit 262d, and may produce a data control signal for controlling the operation timing of the source driver 263 and a gate control signal for controlling the operation timing of the gate driver 264 under the control of the controller 262b. According to an embodiment, the display timing controller 262g may be implemented to be included in the controller 262b.

The display 260 may include, for example, a source driver 263, a gate driver 264, and a display panel 261. In some embodiments, the display 260 may exclude at least one of the components, or may add other components in addition thereto.

The source driver 263 and the gate driver 264 may supply electrical signals to scan lines and data lines (not shown) of the display panel 261, based on, for example, image signals received from the display timing controller 262g.

The display panel 261 may provide various images to the user, based on electrical signals supplied from the source driver 263 and the gate driver 264.

FIGS. 2B and 2C illustrate that the encoder 222 and the decoder 262e corresponding thereto are included in the processor 220 and the display driving integrated circuit 262, respectively, and the display driving integrated circuit 262 includes the up-scaler 262f. However, according to various embodiments, at least one of the encoder 222, the decoder 262e, and the up-scaler 262f may be omitted, or may be implemented as a part of the controller 262b.

The touch sensor IC 291, for example, may transmit or receive signals {e.g., a transmission signal (TX), a reception signal (RX), a stimulus signal (shield), etc.} to or from the touch sensor 290. According to an embodiment, the touch sensor IC 291 may transmit touch data acquired through the touch sensor 290 to the interface module 262c of the display driving integrated circuit 262. The touch sensor IC 291 may include a touch detector 291a capable of detecting a signal using the touch sensor 290 and a register 291b capable of storing touch information.

The pressure sensor IC 293 may transmit or receive signals {e.g., a transmission signal (TX), a reception signal (RX), a stimulus signal (shield), etc.} to or from the pressure sensor 292. According to an embodiment, the pressure sensor IC 293 may transmit pressure data acquired through the pressure sensor 292 to the interface module 262c of the display driving integrated circuit 262. The pressure sensor IC 293 may include a pressure detector 293a capable of detecting a signal using the pressure sensor 292 and a register 291b capable of storing pressure information.

Figure 2D:
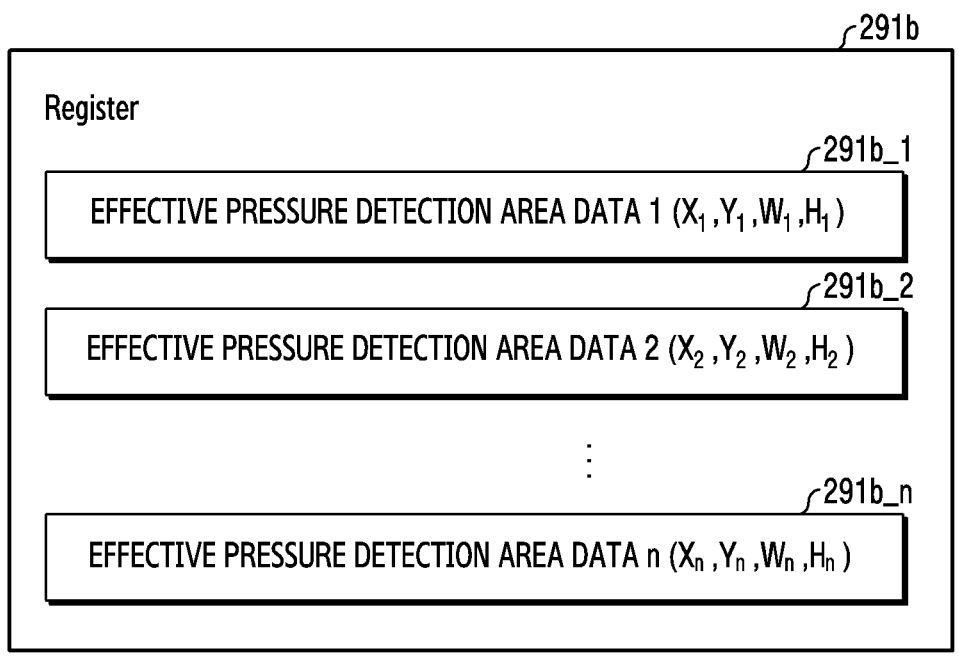
FIG. 2D is the configuration of a pressure sensor IC according to various embodiments of the disclosure.

FIG. 2D illustrates a configuration of a pressure sensor IC according to various embodiments of the disclosure.

Referring to FIG. 2D, the pressure sensor IC 291 may employ a resistor. The electronic device 201 may store information 291b_1, 291b_2, and 291b_n related to a first area in a register of the pressure sensor IC 291. Here, the first area may be an area capable of detecting pressure in the power saving display mode. For example, the electronic device may recognize only the pressure detected in the first area as an effective pressure, and may control the power saving display mode only by means of the pressure detected in the first area. Thus, the first area may be an effective pressure detection area. The electronic device 201 may produce information 291b_1, 291b_2, and 291b_n related to the first area using the processor 220, and may transmit information 291b_1, 291b_2, 291b_n related to the first area from the processor 220 to the pressure driving circuit 291. The processor 220 may transmit the information 291b_1, 291b_2, and 291b_n related to the first area to the pressure driving circuit 291 just before switching to the power saving display mode. The information 291b_1, 291b_2, and 291b_n related to the first area may be configured to correspond to the graphical elements displayed in the power saving display mode. For example, the processor 220 may make configuration such that only a touch input, other than a pressure input, is recognized in the area in which graphical elements are displayed in the power saving display mode. Alternatively, while the electronic device 201 operates in the power saving display mode, the processor 220 may recognize a first level of pressure input in the area in which graphical elements are displayed, and may recognize a second level of pressure input in the area in which graphical elements are not displayed.

Figure 3A:
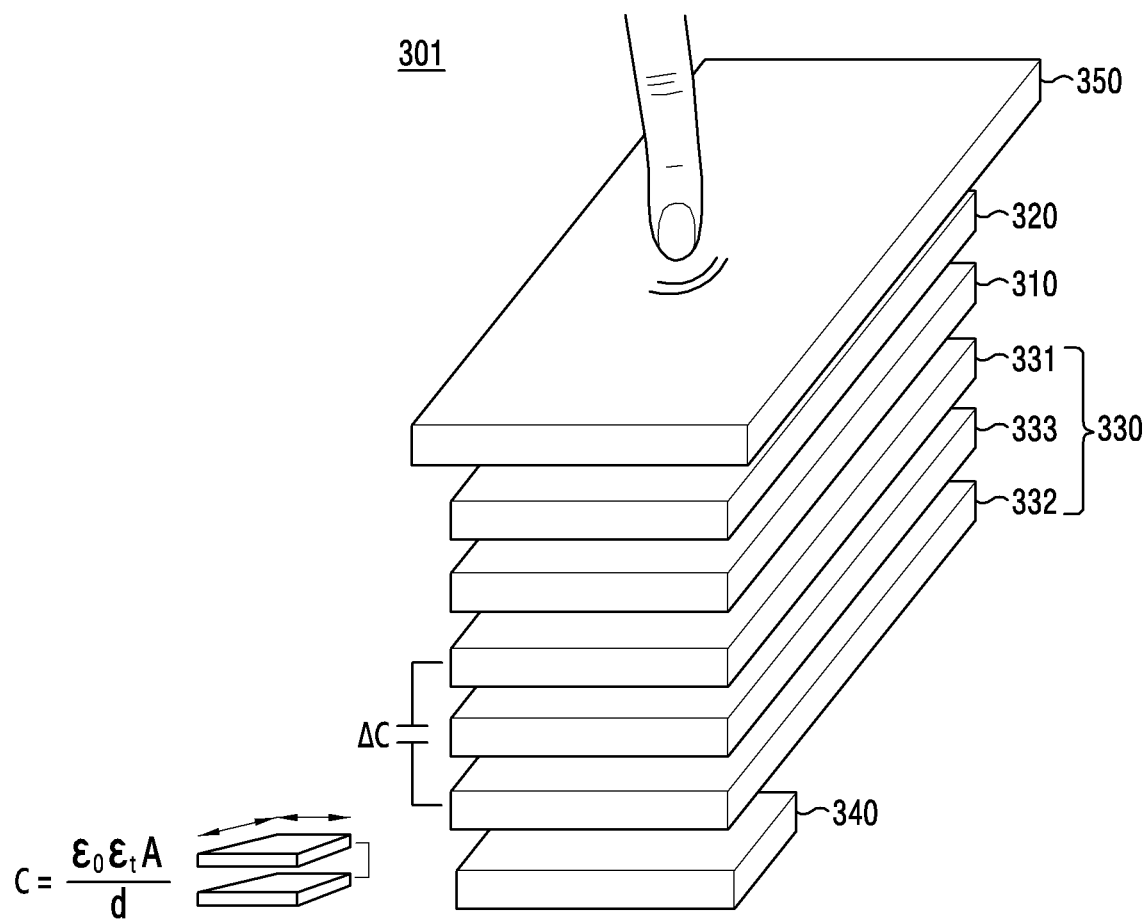
FIG. 3A is a perspective view of an electronic device according to various embodiments of the disclosure.
Figure 3B:
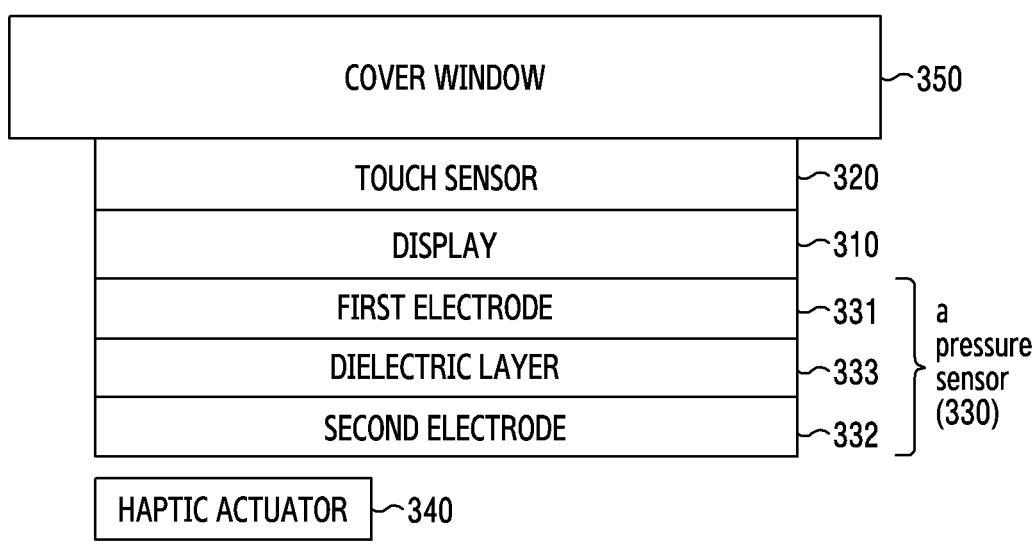
FIG. 3B is a cross-sectional view of an electronic device according to various embodiments of the disclosure.

FIG. 3A is a perspective view of an electronic device according to various embodiments of the disclosure. FIG. 3B is a cross-sectional view of an electronic device according to various embodiments of the disclosure. The description made with reference to FIGS. 2A to 2D may be omitted herein.

Referring to FIGS. 3A and 3B, the electronic device 301 may include a display 310, a touch sensor 320, a pressure sensor 330, a haptic actuator 340, and a cover window 350. In some embodiments, the electronic device 301 may exclude at least one of the components, or may add other components in addition thereto. As shown in FIG. 3A, the electronic device 301 may be configured by stacking elements in the order of the haptic actuator 340, the pressure sensor 330, the display 310, the touch sensor 320, and the cover window 350, and the configurations of the electronic device 301, which are not shown, may be arranged between the elements. As shown in FIG. 3B, the electronic device 301 may be configured by stacking elements in the order of the haptic actuator 340, the pressure sensor 330, the display 310, the touch sensor 320, and the cover window 350 so as to come into close contact with each other.

The pressure sensor 330 may include, for example, a first electrode 331, a second electrode 332, and a dielectric layer 333 interposed between the first electrode 331 and the second electrode 332. According to an embodiment, the pressure sensor 330 may be disposed below the display 310 as shown in FIGS. 3A and 3B, and in this case, the first electrode 331 or the second electrode 332 may be disposed integrally with the display 310, or may be disposed on a separate support member (e.g., FPCB).

According to an embodiment, unlike the illustrated example, the pressure sensor 330 may be disposed between the cover window 350 and the display 310, and in this case, the first electrode 331 or the second electrode 332 may be disposed integrally with the touch sensor 330, or may be disposed on a separate support member (e.g., PET).

According to an embodiment, unlike the illustrated example, at least a portion (at least one electrode layer) of the pressure sensor 330 may be disposed inside the display 310, and in this case, the first electrode 331 or the second electrode 332 may be disposed between the display electrodes.

According to an embodiment, the pressure sensor 330 may be implemented in a self-capacitance type or a mutual-capacitance type, and details thereof will be described with reference to FIGS. 3C to 3H.

According to an embodiment, the pressure sensor 330 may detect pressure in the power saving display mode under the control of the pressure sensor IC 293 in FIG. 2B, and may detect pressure in the normal display mode under the control of the processor 220 in FIG. 2B. For example, the pressure sensor 330 may detect the pressure produced in the effective pressure area in the power saving display mode.

The touch sensor 320 may be disposed, for example, between the cover window 350 and the display 310. Alternatively, according to an embodiment, at least a portion (at least one electrode layer) of the touch sensor 320 may be disposed inside the display 310. The touch sensor 320 may be implemented by a self-capacitance type or a mutual-capacitance type.

According to an embodiment, the touch sensor 290 may detect a touch in the power saving display mode under the control of the touch sensor IC 291 in FIG. 2B, and may detect a touch in the normal display mode under the control of the processor 220 in FIG. 2B. For example, the touch sensor 290 may detect a touch produced in the display 320 in the power saving display mode.

For example, although only one haptic actuator 340 is illustrated as being disposed under the pressure sensor 330, the haptic actuator 340 may be variously disposed at various positions of the electronic device 301 and a plurality of haptic actuators may be provided. The haptic actuator 340 may provide various kinds of vibration feedback to the whole or a part of the electronic device 301.

The cover window 350 may include, for example, a substantially rigid layer, such as glass (including tempered glass or sapphire glass), or a substantially flexible layer such as polymer (e.g., PI, PET, PC, etc.).

The display 310 may include, for example, a liquid crystal display (LCD), a light-emitting diode (LED) display, an organic light-emitting diode (OLED) display, or a micro-electromechanical system (MEMS) display, or an electronic paper display. For example, the display panel 261 may be implemented to be flexible, transparent, or wearable.

FIGS. 3C to 3H illustrate perspective views of a pressure sensor according to various embodiments of the disclosure. The pressure sensor according to various embodiments of the disclosure may be implemented as a capacitive type, an inductive type, a strain gauge type, or a piezoelectric type.

Figure 3C:
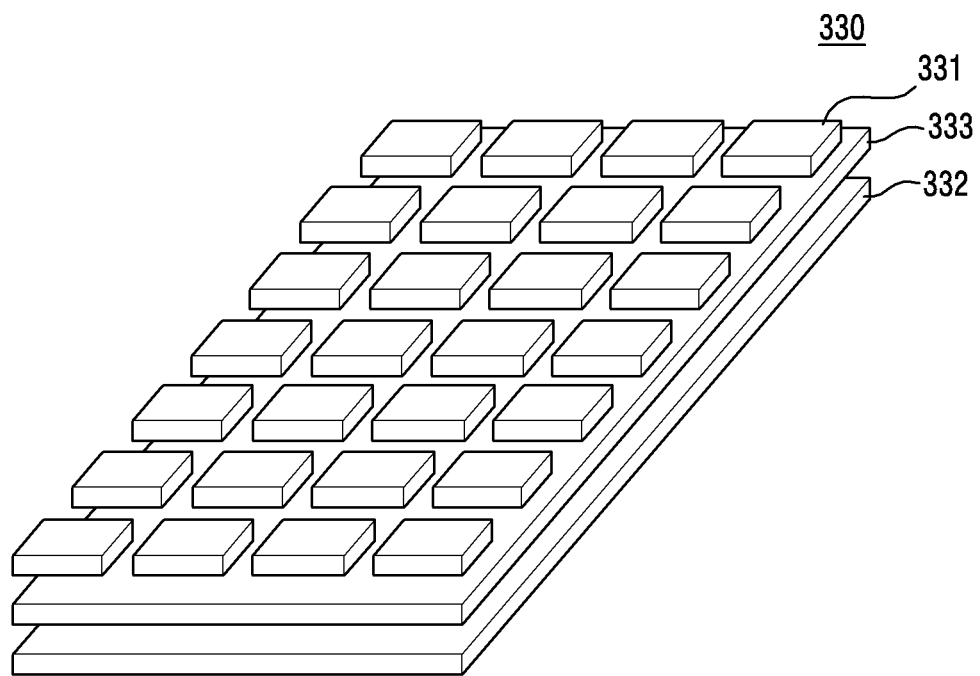
FIGS. 3C to 3H are perspective views of a pressure sensor according to various embodiments of the disclosure.

Referring to FIG. 3C, the pressure sensor 330 may be implemented as a self-capacitance type. The self-capacitance type pressure sensor 330 may include a first electrode 331 in the form of a plurality of repeated polygons (or circles), a second electrode 332 configured as one piece extending through the entire area corresponding to the plurality of repeated polygons, and a dielectric layer 333 interposed between the first electrode 331 and the second electrode 332. The pressure sensor 330 may sense pressure, based on a change in the capacitance between each partial electrode of the first electrode 331 and the second electrode 332. The positions or shapes of the first electrode 331 and the second electrode 332 may be interchanged with each other.

Figure 3D:
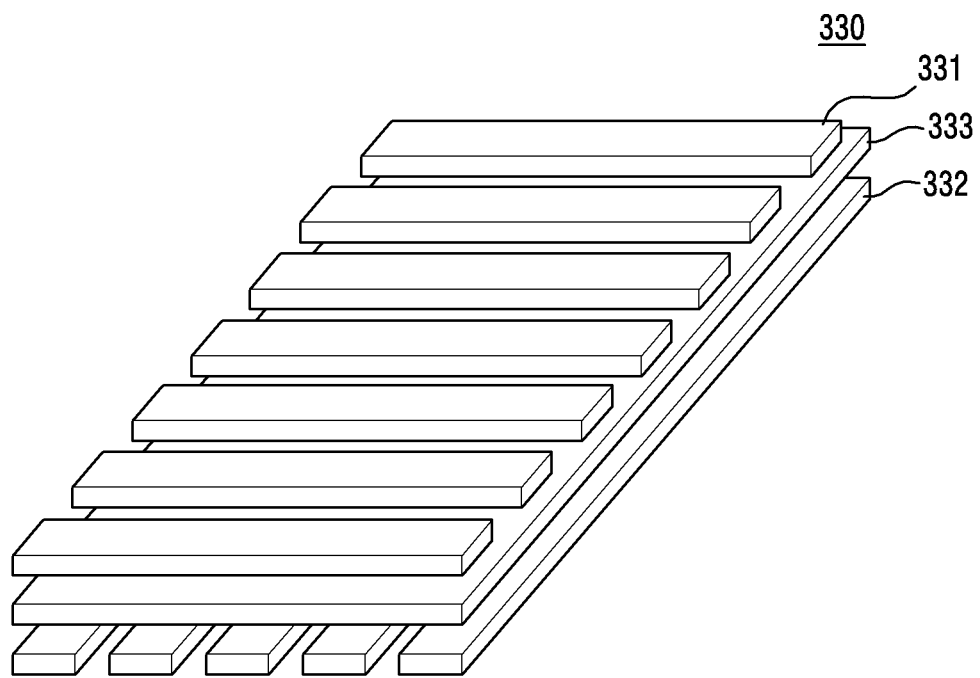

Referring to FIG. 3D, the pressure sensor 330 may be implemented as a mutual-capacitance type. The mutual-capacitance-type pressure sensor 330 may include a first electrode 331 extending in a first direction, a second electrode 332 extending in a second direction substantially perpendicular to the first direction, and a dielectric layer 333 interposed between the first electrode 331 and the second electrode 332. The pressure sensor 330 may sense pressure, based on a change in the capacitance between the first electrode 331 and the second electrode 332 at the intersection of the first electrode 331 and the second electrode 332. The positions or shapes of the first electrode 331 and the second electrode 332 may be interchanged with each other.

According to an embodiment, the first electrode 331 or the second electrode 332 may be opaque or transparent. That is, if the user looks at the pressure sensor, an object arranged on the side opposite the pressure sensor may be invisible (opaque) or visible (transparent). If the first electrode 331 or the second electrode 332 is opaque, the first electrode 331 or the second electrode 332 may include at least one of Cu, Ag, Mg, or Ti, or a combination of two or more thereof. If the first electrode 331 or the second electrode 332 is transparent, the first electrode 331 or the second electrode 332 may include at least one of ITO, IZO, a polymer conductor, graphene, or an opaque wiring pattern having a specific line width or less (e.g., a Ag nanowire, a metal mesh, etc.), or a combination of two or more thereof.

According to an embodiment, the dielectric layer 333 may include at least one of silicon, air, foam, membrane, OCA, sponge, rubber, ink, or polymer (e.g., PC, PET, etc.).

Figure 3E:
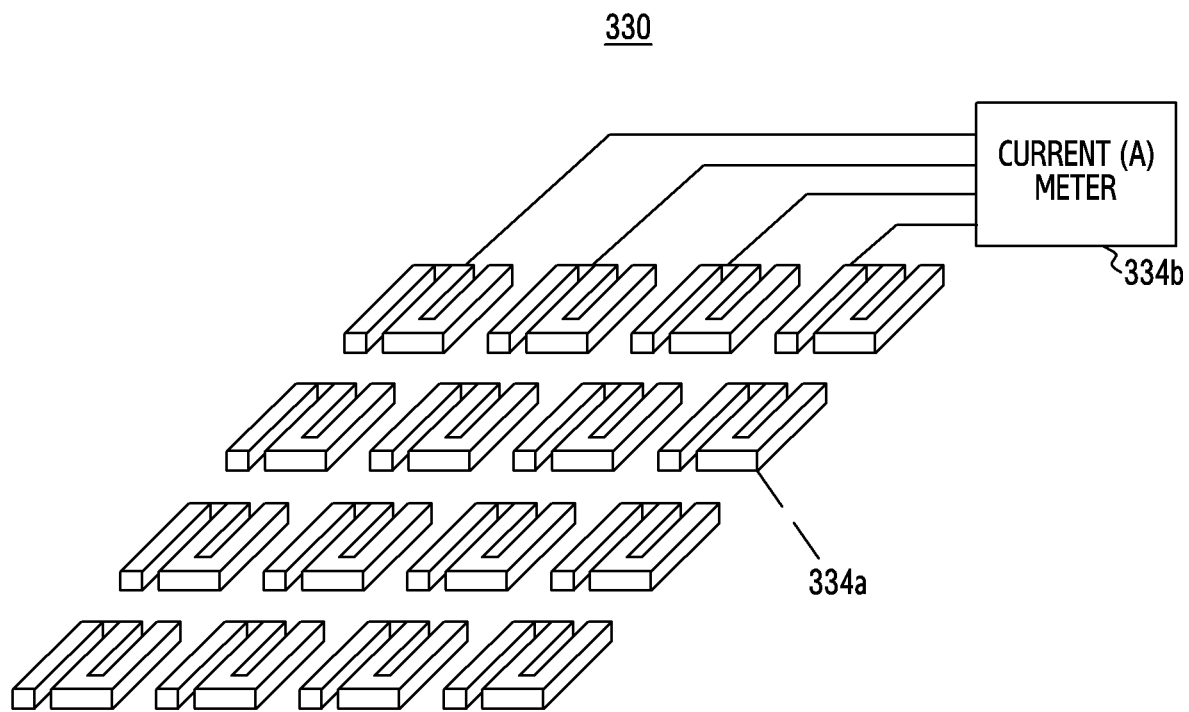

Referring to FIG. 3E, the inductive-type pressure sensor 330 may detect pressure, based on a change in the current induced in an inductor 334a (e.g., a coil) according to the pressure applied by a user. For example, as a conductor (e.g., a metal housing, a user's finger, etc.) approaches the inductor 334a disposed inside the housing according to the pressure applied by the user, the current may increase, which may be measured by a current meter 334b.

Figure 3F:
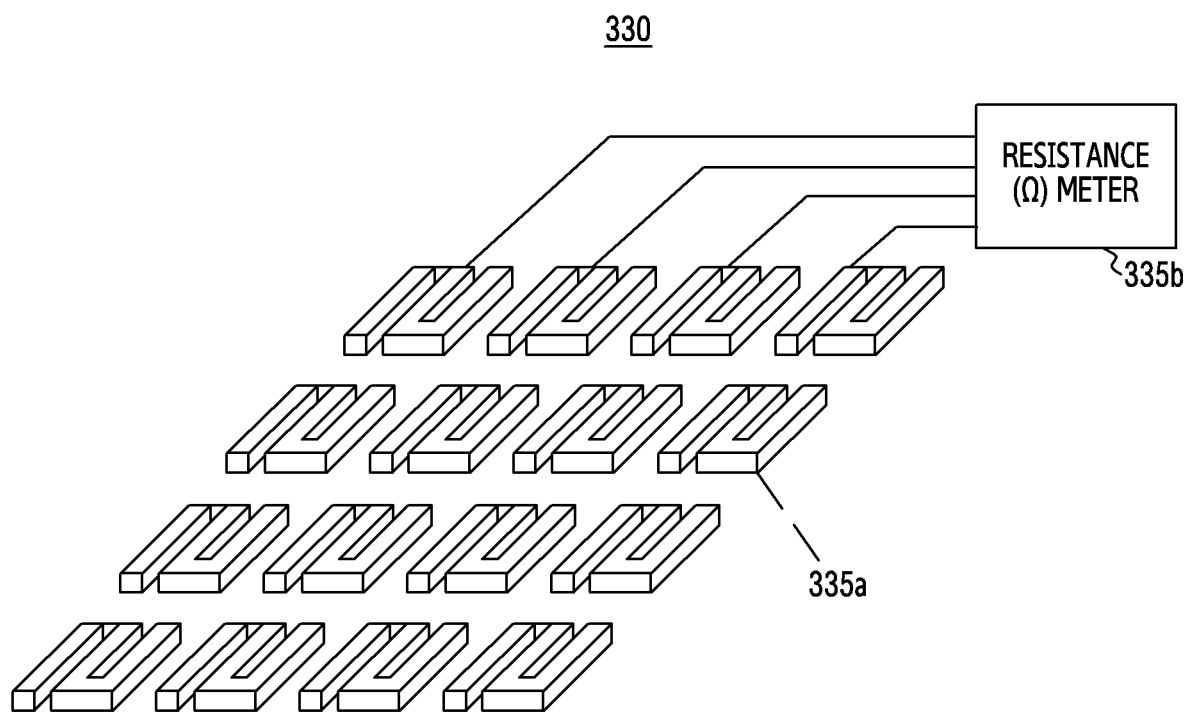

Referring to FIG. 3F, the strain gauge-type pressure sensor 330 may detect pressure, based on a change in the resistance of a conductor 335a (e.g., a wire) according to the pressure applied by the user. As the length of the conductor 335a increases by the pressure of the user, the resistance may increase due to the reduction in the cross-sectional area 335a of the conductor, which may be measured by a resistance meter 335b. The conductor 335a may be configured in the form of a Wheatstone bridge.

Figure 3G:
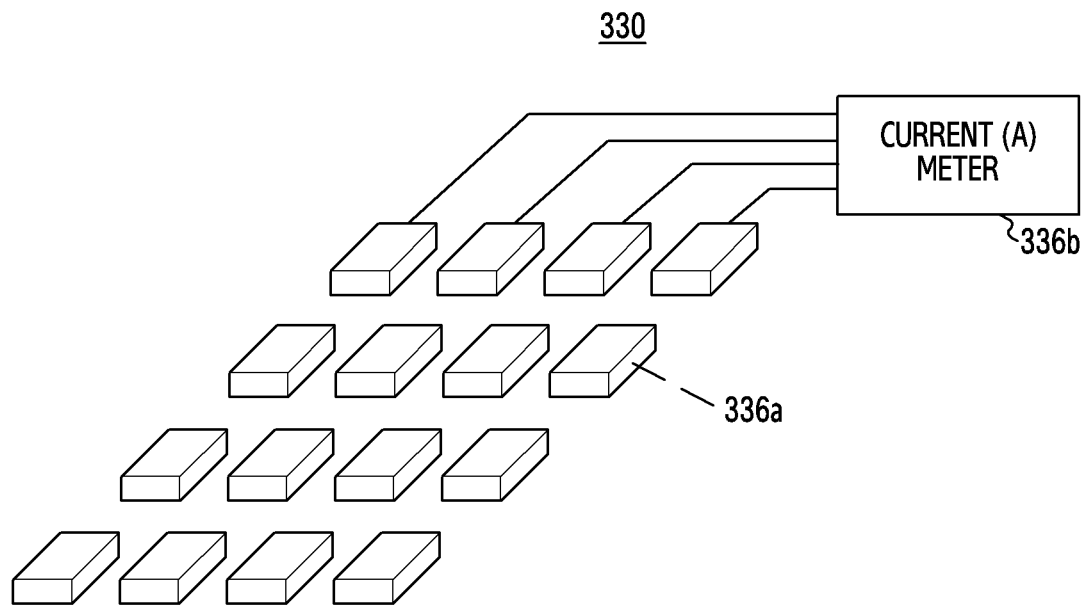
Figure 3H:
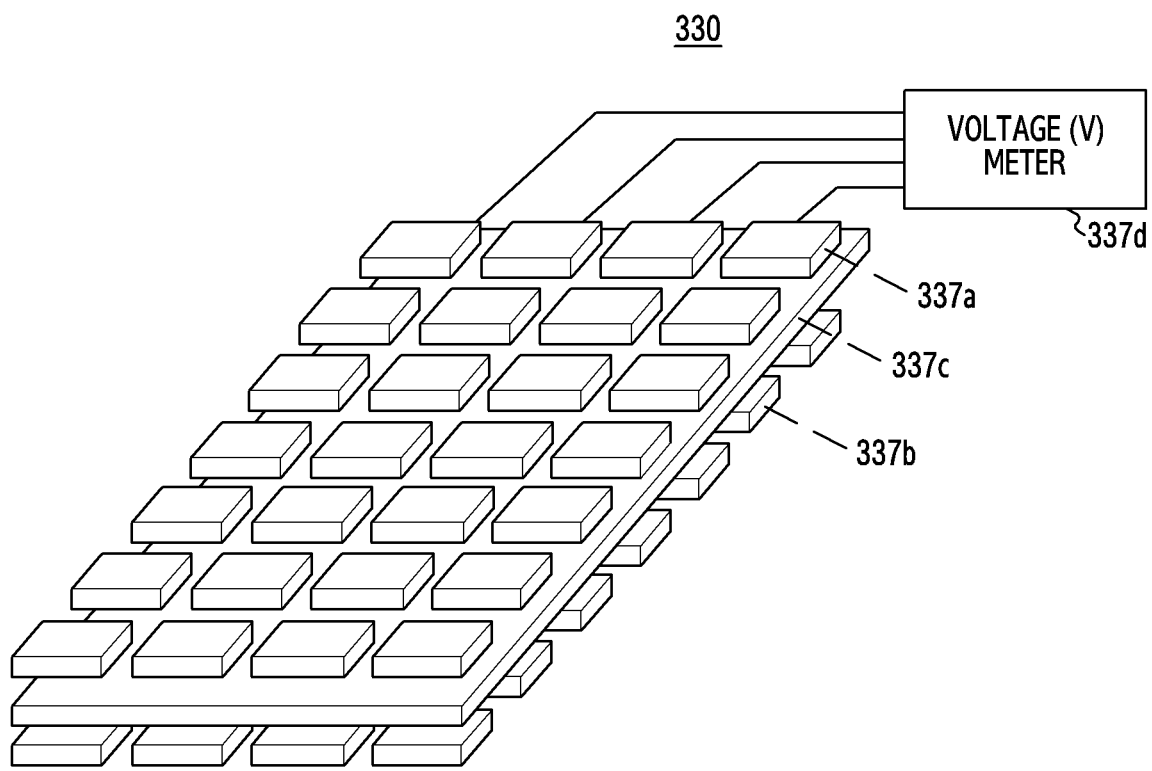

Referring to FIGS. 3G and 3H, the piezoelectric-type pressure sensor 330 may detect pressure, based on the difference in the current or voltage produced by a piezoelectric material 336a or 337c according to the pressure by the user. The current or voltage difference may increase as the amount of current converted by the piezoelectric material 336a or 337c increases according to the pressure by the user, which may be measured by the current meter 336b or the voltage meter 337d, respectively. According to an embodiment, the piezoelectric-type pressure sensor 330 may be made of only a piezoelectric material 336a. Alternatively, the piezoelectric-type pressure sensor 330 may include a first electrode 337a in the form of a plurality of repeated polygons (or circles), and a second electrode 337b in the form of a plurality of polygons (or circles) disposed in the areas corresponding to the plurality of repeated polygons, a piezoelectric material 337c interposed between the first electrode 337a and the second electrode 337b.

Figure 4:
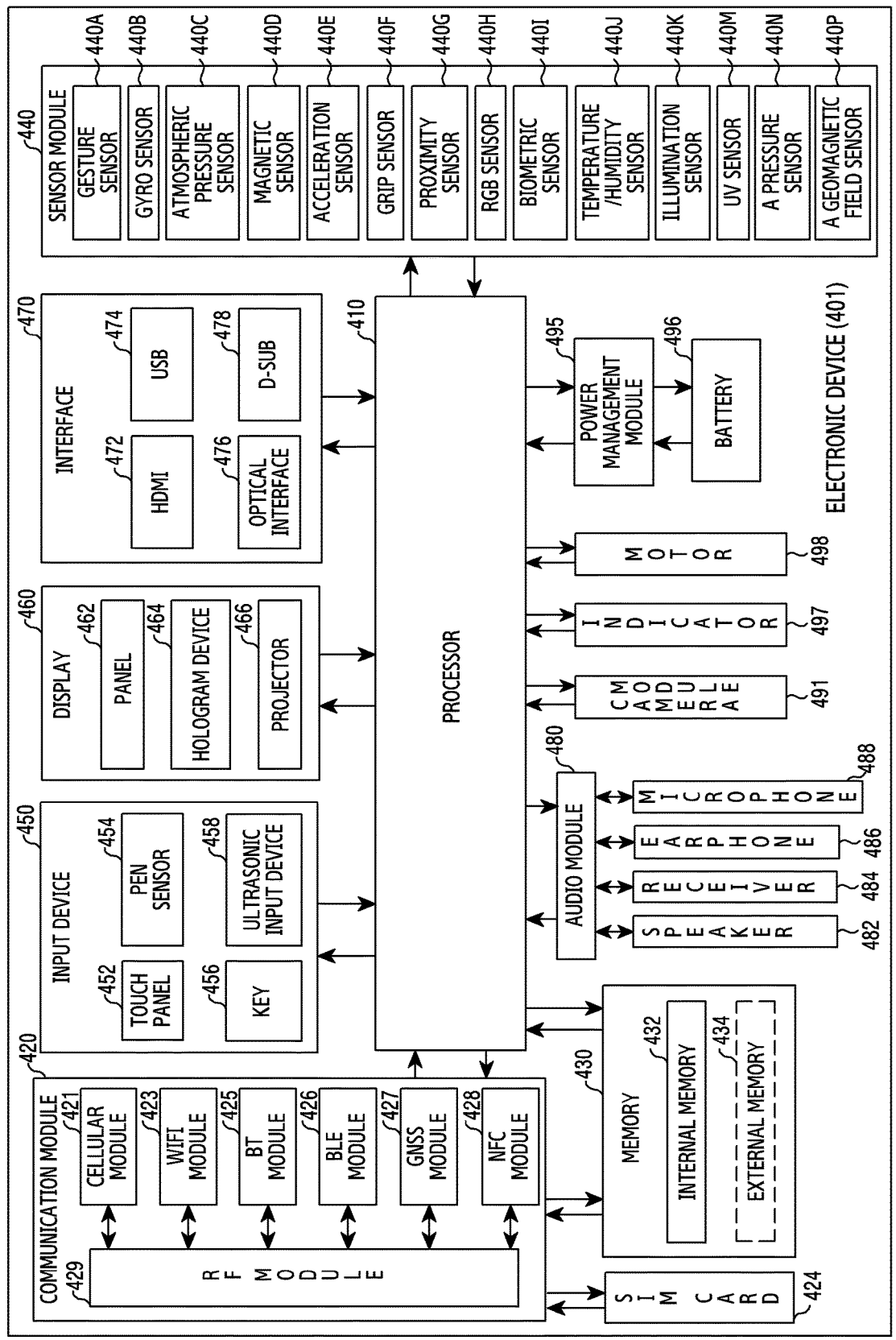
FIG. 4 is a block diagram of an electronic device according to various embodiments of the disclosure.

FIG. 4 is a block diagram of an electronic device according to various embodiments of the disclosure.

The electronic device 401, for example, can include all or part of the electronic device 201 of FIG. 2A. The electronic device 401 can include one or more processors (APs) 410, a communication module 420, a Subscriber Identification Module (SIM) 424, a memory 430, a sensor module 440, a sensor hub 442, an input device 450, a display 460, an interface 470, an audio module 480, a camera module 491, a power management module 495, a battery 496, an indicator 497, and a motor 498.

The processor 410, for example, can control a plurality of hardware or software components connected to the processor 410 by executing an OS or an application program, and process various data and operations. The processor 410 can be implemented with, for example, a System on Chip (SoC). According to one embodiment, the processor 410 can further include a Graphic Processing Unit (GPU) and/or an image signal processor. The processor 410 may include at least part (e.g., a cellular module 221) of the components shown in FIG. 4. The processor 410 can load and process commands or data received from at least one of the other components (e.g., a nonvolatile memory) into a volatile memory, and store various data in the nonvolatile memory.

The communication module 420 can have the same or similar configuration to the communication interface 170 of FIG. 1. The communication module 420 can include, for example, a cellular module 421, a WiFi module 423, a Bluetooth (BT) module 425, a Bluetooth Low Energy (BLE) module 426, a GNSS module 427, a Near Field Communication (NFC) module 428, and a Radio Frequency (RF) module 429. The cellular module 421, for example, may provide services of voice calls, video calls, text messaging, or the Internet through communication networks. According to an embodiment, the cellular module 421 may perform identification and verification of an electronic device 401 in communication networks using a subscriber identification module (e.g., a SIM card) 424. According to an embodiment, the cellular module 421 may perform at least some of the functions provided by a processor 410. According to an embodiment, the cellular module 421 may include a communication processor (CP). According to some embodiments, at least some (e.g., two or more) of the cellular module 421, a Wi-Fi module 423, a Bluetooth module 425, a Bluetooth-low-energy module 426, a GNSS module 427, or an NFC module 428 may be included in a single integrated chip (IC) or IC package. The RF module 429, for example, may transmit and receive communication signals (e.g., RF signals). The RF module 429 may include, for example, a transceiver, a power amp module (PAM), a frequency filter, a low-noise amplifier (LNA), antennas, or the like. According to another embodiment, at least one of the cellular module 421, the Wi-Fi module 423, the Bluetooth module 425, the Bluetooth-low-energy module 426, the GNSS module 427, or the NFC module 428 may transmit and receive RF signals through a separate RF module. The subscriber identification module 424, for example, may include a card including a subscriber identification module or an embedded SIM, and may contain inherent identification information {e.g., an integrated circuit card identifier (ICCID)} or subscriber information {e.g., an international mobile subscriber identity (IMSI)}.

The memory 430 (e.g., the memory 230), for example, may include an internal memory 432 or an external memory 434. The internal memory 432 may include, for example, at least one of volatile memories (e.g., a DRAM, an SRAM, an SDRAM, or the like} or nonvolatile memories {e.g., an one-time programmable ROM (OTPROM), a PROM, an EPROM, an EEPROM, a mask ROM, a flash ROM, a flash memory, a hard drive, a solid state drive (SSD), or the like}. The external memory 434 may include a flash drive, and may include, for example, compact flash (CF), secure digital (SD), Micro-SD, Mini-SD, extreme digital (xD), a multimedia card (MMC), a memory stick, or the like. The external memory 434 may be functionally and/or physically connected to the electronic device 401 through any of various interfaces.

The sensor module 440, for example, may measure physical quantities or may detect the operation state of the electronic device 401, thereby converting the measured or detected information to electrical signals. The sensor module 440 may include at least one of, for example, a gesture sensor 440A, a gyro sensor 440B, an atmospheric pressure sensor 440C, a magnetic sensor 440D, an acceleration sensor 440E, a grip sensor 440F, a proximity sensor 440G, a color sensor 440H {e.g., a red-green-blue (RGB) sensor}, a biometric sensor 440I, a temperature/humidity sensor 440J, an illuminance sensor 440K, an ultra-violet (UV) sensor 440M, a pressure sensor 440N, or a geomagnetic field sensor 440P. Additionally or alternatively, the sensor module 440, for example, may further include an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 440 may further include a control circuit for controlling one or more sensors included therein. In some embodiments, the electronic device 401 may further include a processor configured as a part of the processor 410 or separately from the processor 410 so as to control the sensor module 440, thereby controlling the sensor module 440 while the processor 410 is in a sleep mode. It is possible to detect wearing of a head mounted electronic device on the user using the gyro sensor 440B, the acceleration sensor 440E, the geomagnetic field sensor 440P, the proximity sensor 440G, or the grip sensor 440F.

The input device 450, for example, may include a touch panel 452, a (digital) pen sensor 454, keys 456, or an ultrasonic input device 458. The touch panel 452 may be at least one of, for example, a capacitive type, a pressure-sensitive type, an infrared type, or an ultrasonic type. In addition, the touch panel 452 may further include a control circuit. The touch panel 452 may further include a tactile layer, thereby providing the user with a tactile reaction. The (digital) pen sensor 454, for example, may be a part of the touch panel, or may include a separate recognition sheet. The keys 456 may include, for example, physical buttons, optical keys, or a keypad. The ultrasonic input device 458 may detect ultrasonic waves generated by the input tools through a microphone (e.g., a microphone 488), thereby identifying data corresponding to the detected ultrasonic waves.

The display 460 (e.g., the display 260) may include a panel 462, a hologram device 464, a projector 466, and/or a control circuit to control the same. The panel 462 may be implemented to be, for example, flexible, transparent, or wearable. The panel 462 may be configured as at least one module with the touch panel 452. The panel 462 may include an LCD, an organic light-emitting diode (OLED), electronic ink, an electron wetting display (EWD), or the like. The display 460 may allow light to pass therethrough (e.g., a display having a light transmittance). For example, the display 460 having a light transmittance may be implemented by arranging a plurality of transparent or translucent areas that light can pass through together with pixels. Alternatively, the display 460 having a light transmittance may be implemented by arranging a plurality of through-holes that light can pass through together with pixels. The hologram device 464 may display 3D images in the air using light interference. The projector 466 may display images by projecting light onto a screen. The screen may be provided, for example, inside or outside the electronic device 401. The interface 470 may include, for example, an HDMI 472, a USB 474, an optical interface 476, or a D-subminiature (D-sub) 478. The interface 470 may be included in, for example, the communication interface 270 shown in FIG. 2A. Additionally or alternatively, the interface 470 may include, for example, a mobile high-definition link (MHL) interface, a SD card/multi-media card (MMC) interface, or an infrared data association (IrDA) standard interface.

The audio module 480, for example, may convert a sound into an electrical signal, and vice versa. At least some elements of the audio module 480 may be included, for example, in the input/output interface 245 shown in FIG. 2A. For example, the audio module 480 may process voice information that is input or output through a speaker 482, a receiver 484, earphones 486, or a microphone 488. The camera module 491, for example, may be a device for photographing still and moving images, and, according to an embodiment, the camera module 491 may include one or more image sensors (e.g., a front sensor or a rear sensor), lenses, an image signal processor (ISP), or a flash (e.g., an LED or a xenon lamp). The power management module 495, for example, may manage power of the electronic device 401. According to an embodiment, the power management module 495 may include a power management integrated circuit (PMIC), a charging integrated circuit (IC), or a battery or fuel gauge. The PMIC may be implemented by a wired charging type and/or a wireless charging type. The wireless charging type may encompass, for example, a magnetic resonance type, a magnetic induction type, or an electromagnetic wave type, and additional circuits for wireless charging, such as coil loops, resonance circuits, or rectifiers, may be further included. The battery gauge may measure, for example, the remaining power of the battery 496, a charging voltage, current, or temperature thereof. The battery 496 may include, for example, a rechargeable battery and/or a solar battery.

The indicator 497 may display a specific state (e.g., a booting state, a message state, or a charging state) of the whole or a part (e.g., the processor 410) of the electronic device 401. The motor 498 may convert an electrical signal to a mechanical vibration, and may provide a vibration or a haptic effect. The electronic device 401 may include a mobile-TV supporting device (e.g., a GPU) for processing media data according to standards, such as, for example, digital multimedia broadcasting (DMB), digital video broadcasting (DVB), or mediaFlo™.

The respective elements described in this document may include one or more components, and the names of the elements may vary depending on the type of electronic device. According to various embodiments, the electronic device (e.g., the electronic device 401) may be configured by excluding some of the elements or by further including other elements. Alternatively, some of the elements of the electronic device may be combined to constitute a single entity, thereby performing the same function as that of the elements before being combined.

Figure 5:
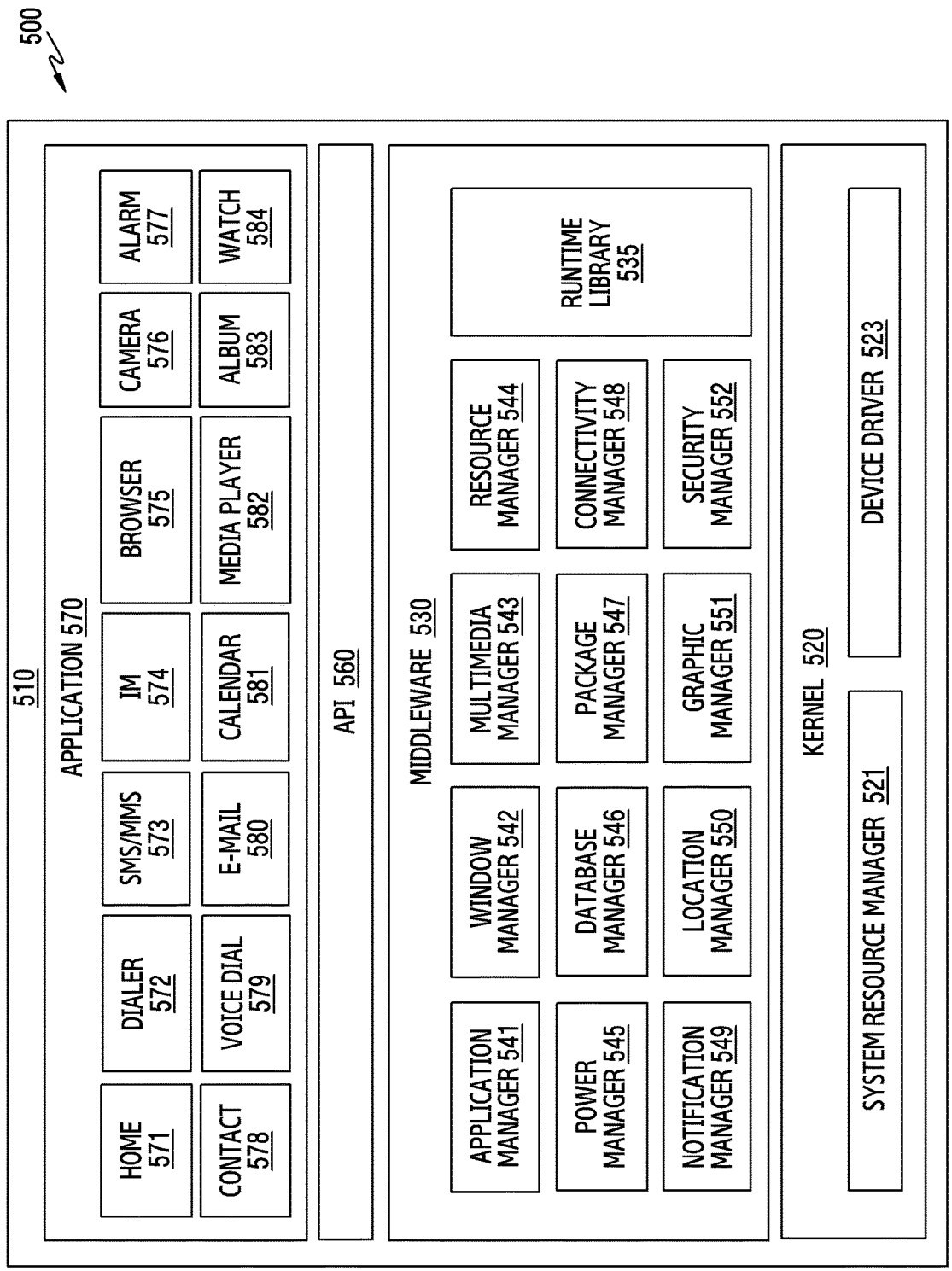
FIG. 5 is a block diagram of a program module according to various embodiments of the disclosure.

FIG. 5 is a block diagram of a program module according to various embodiments.

According to one embodiment, the program module 510 (e.g., the program 240) can include an OS for controlling resources relating to an electronic device (e.g., the electronic device 201) and/or various applications (e.g., the application program 247) running on the OS. The OS can include, for example, Android™, iOS™, Windows™, Symbian™, Tizen™, or Samsung Bada™ OS. Referring to FIG. 5, The program module 510 can include a kernel 520 (e.g., the kernel 241), a middleware 530 (e.g., the middleware 243), an API 560 (e.g., the API 245), and/or an application 570 (e.g., the application 247). At least part of the program module 510 can be preloaded on the electronic device or downloaded from the external electronic device (e.g., the electronic device 202 or 204, the server 206).

The kernel 520 can include, for example, a system resource manager 521 and/or a device driver 523. The system resource manager 521 can control, allocate, or retrieve a system resource. According to one embodiment, the system resource manager 521 can include a process management unit, a memory management unit, or a file system management unit. The device driver 523 can include, for example, a display driver, a camera driver, a Bluetooth driver, a sharing memory driver, a USB driver, a keypad driver, a WiFi driver, an audio driver, or an Inter-Process Communication (IPC) driver. The middleware 530, for example, can provide a function commonly required by the application 570 or provide various functions to the application 570 through the API 560 so that the application 570 can efficiently use limited system resources inside the electronic device. According to one embodiment, the middleware 530 (e.g., the middleware 143) can include at least one of a runtime library 535, an application manager 541, a window manager 542, a multimedia manager 543, a resource manager 544, a power manager 545, a database manager 546, a package manager 547, a connectivity manager 548, a notification manager 549, a location manager 550, a graphic manager 551, and a security manager 552.

The runtime library 535 can include, for example, a library module used by a complier to add a new function through a programming language while the application 570 is running. The runtime library 535 can manage input/output, memory, or arithmetic function. The application manager 541, for example, can manage a life cycle of at least one of the applications 570. The window manager 542 can manage a Graphical User Interface (GUI) resource used in a screen. The multimedia manager 543 can recognize a format for playing various media files, and encode or decode a media file by using the codec of a corresponding format. The resource manager 544 can manage a source code of at least one of the application 570, and the resources such as memory or storage space. The power manager 545, for example, may manage capacity of a battery or a power resource, and may provide power information necessary for the operation of the electronic device. According to an embodiment, the power manager 545 may be association with a basic input/output system (BIOS). The database manager 546, for example, may generate, retrieve, or change a database that is to be used in the applications 570. The package manager 547 may manage the installation or update of the applications that are distributed in the form of a package file.

The connectivity manager 548, for example, may manage a wireless connection. The notification manager 549 may provide the user with events such as received messages, appointments, or proximity notifications. The location manager 550 may manage location information of the electronic device. The graphic manager 551 may manage graphic effects to be provided to the user or user interfaces related thereto. The security manager 552 may provide, for example, system security or user authentication. According to an embodiment, the middleware 530 may include a telephony manager for managing a voice call function or a video call function of the electronic device, or may include a middleware module capable of configuring a combination of the functions of the elements described above. According to an embodiment, the middleware 530 may provide a module that is specialized according to the type of operating system. The middleware 530 may dynamically exclude some of the typical elements or add new elements in addition thereto. The API 560 may be, for example, a set of API programming functions, and may be provided as different configurations according to an operating system. For example, one configuration of APIs may be provided to each platform in the case of Android or iOS, and two or more sets of APIs may be provided to each platform in the case of Tizen.

The application 570 (e.g., the application program 147) can include, for example, applications of a home 571, a dialer 572, an SMS/Multimedia Messaging System (MIMS) 573, an Instant Message (IM) 574, a browser 575, a camera 576, an alarm 577, a contact 578, a voice dial 579, an e-mail 580, a calendar 581, a media player 582, an album 583, a watch 584. According to various embodiments, the application 570 can include one or more applications for health care (e.g., measure an exercise amount or blood sugar level) or environmental information provision (e.g., provide air pressure, humidity, or temperature information). According to one embodiment, the application 570 can include an application for supporting information exchange between the electronic device and the external electronic device. The information exchange application can include, for example, a notification relay application for relaying specific information to the external device or a device management application for managing the external electronic device. For example, the notification relay application can forward notification information generated from another application of the electronic device to the external electronic device. Also, the notification relay application, for example, can receive and forward notification information from the external electronic device to the user. The device management application, for example, may install, delete, or update functions of an external electronic device {e.g., turning on and off the external electronic device (or some elements thereof) or adjusting the brightness (or resolution) of a display} that communicates with the electronic device or applications executed in the external electronic device. According to an embodiment, the applications 570 may include applications that are designated according to the attributes of the external electronic device (e.g., the healthcare application of a mobile medical device). According to an embodiment, the applications 570 may include applications that are received from an external electronic device. At least some of the program module 510 may be implemented (e.g., executed) by software, firmware, hardware (e.g., the processor 220), or a combination of two or more thereof, and may include modules, programs, routines, sets of instructions, or processes for executing one or more functions.

The term "module" as used herein may include a unit including hardware, software, or firmware, and may, for example, be used interchangeably with the term "logic", "logical block", "component", "circuit", or the like. The "module" may be an integrated element, or a minimum unit for performing one or more functions or a part thereof. The "module" may be mechanically or electronically implemented and may include, for example, an application-specific integrated circuit (ASIC) chip, a field-programmable gate arrays (FPGA), or a programmable-logic device, which has been known or are to be developed in the future, for performing certain operations. At least some of devices (e.g., modules or functions thereof) or methods (e.g., operations) according to various embodiments may be implemented by an instruction which is stored a computer-readable storage medium (e.g., the memory 130) in the form of a program module. The instruction, when executed by a processor (e.g., the processor 120), may cause the one or more processors to execute the function corresponding to the instruction. The computer-readable storage medium may include a hard disk, a floppy disk, a magnetic medium (e.g., a magnetic tape), an Optical Media (e.g., CD-ROM, DVD), a Magneto-Optical Media (e.g., a floptical disk), an inner memory, etc. The instruction may include a code made by a complier or a code that can be executed by an interpreter. The programming module according to the disclosure may include one or more of the aforementioned components or may further include other additional components, or some of the aforementioned components may be omitted. Operations performed by a module, a programming module, or other elements according to various embodiments may be executed sequentially, in parallel, repeatedly, or in a heuristic manner. At least some operations may be executed according to another sequence, may be omitted, or may further include other operations.

According to various embodiments of the disclosure, an electronic device may include: a housing including a first plate and a second plate facing in a direction opposite the first plate; a display positioned inside the housing and exposed through a portion of the first plate; a pressure sensor IC positioned between the first plate and the second plate and configured to detect a pressure applied to the first plate by an external force; a wireless communication circuit positioned inside the housing; a display driving integrated circuit positioned inside the housing; at least one processor positioned inside the housing and electrically connected to the display, the pressure sensor IC, the wireless communication circuit, and the display driving integrated circuit; and a memory positioned inside the housing and electrically connected to the processor, wherein the memory may store instructions that, when executed, cause the processor to: while at least a portion of the processor is in a sleep mode, control the display driving integrated circuit so as to display one or more graphical elements in a selected area of the display having a substantially black background screen; detect a change in pressure using the pressure sensor IC; and deactivate the display in response to the detected change in the pressure.

According to various embodiments, the one or more graphical elements may include at least one of text, numbers, symbols, or icons.

According to various embodiments, the at least one processor may include an application processor and a micro control unit electrically connected to the display and the pressure sensor IC, and the instructions may cause the micro control unit to perform control such that the display driving integrated circuit displays the one or more graphical elements while the application processor is in a sleep mode.

According to various embodiments, the instructions may cause the micro control unit to detect the change in the pressure and to deactivate the display while the application processor is in the sleep mode.

According to various embodiments of the disclosure, an electronic device may include: a housing including a first plate and a second plate facing in a direction opposite the first plate; a display positioned inside the housing and exposed through a portion of the first plate; a pressure sensor IC positioned between the first plate and the second plate and configured to detect a pressure applied to the first plate by an external force; a wireless communication circuit positioned inside the housing; a display driving integrated circuit positioned inside the housing; a processor positioned inside the housing and electrically connected to the display, the pressure sensor IC, the wireless communication circuit, and the display driving integrated circuit; and a memory positioned inside the housing and electrically connected to the processor, wherein the memory may store instructions that, when executed, cause the processor to: detect a change in pressure using the pressure sensor IC while the display is inactive; and control the display driving integrated circuit so as to display one or more graphical elements in a selected area of the display having a substantially black background screen in response to the detected change in the pressure while at least a portion of the processor is in a sleep mode.

According to various embodiments, the one or more graphical elements may include at least one of text, numbers, symbols, or icons.

According to various embodiments, the processor may include an application processor and a micro control unit electrically connected to the display and the pressure sensor IC, and the instructions may cause the micro control unit to perform control such that the display driving integrated circuit displays the one or more graphical elements while the application processor is in a sleep mode.

According to various embodiments, the instructions may cause the micro control unit to detect the change in the pressure and to deactivate the display while the application processor is in the sleep mode.

According to various embodiments of the disclosure, an electronic device may include: a housing including a first plate and a second plate facing in a direction opposite the first plate; a display positioned inside the housing and exposed through a portion of the first plate; a sensor IC positioned between the first plate and the second plate and configured to detect a user input applied to the first plate; a wireless communication circuit positioned inside the housing; a display driving integrated circuit positioned inside the housing; at least one processor positioned inside the housing and electrically connected to the display, the sensor IC, the wireless communication circuit, and the display driving integrated circuit; and a memory positioned inside the housing and electrically connected to the processor, wherein the memory may store instructions that, when executed, cause the processor to: detect a user input using the sensor IC; identify a state of a power saving display mode, based at least on the user input; and determine activation or deactivation of the power saving display mode, based at least on the user input and the state of the power saving display mode.

According to various embodiments, the processor may include an application processor and a micro control unit electrically connected to the display and the sensor IC, and the instructions may cause the micro control unit to perform control such that the display driving integrated circuit displays the one or more graphical elements while the application processor is in a sleep mode.

According to various embodiments, the instructions may cause the micro control unit to detect the user input and to deactivate the display while the application processor is in the sleep mode.

According to various embodiments, the instructions may cause the processor to: detect the user input using the sensor IC while at least a portion of the processor is in a sleep mode; and determine whether or not a position in which the user input is detected is a specified first area of the display.

According to various embodiments, the instructions may cause the processor to, if the position in which the user input is detected is the specified first area of the display, identify the state of the power saving display mode, based at least on the user input.

According to various embodiments, the instructions may cause the processor to, if the identified state of the power saving display mode is an inactive state, control the display driving integrated circuit so as to display one or more graphical elements in a second area of the display, based at least on the user input.

According to various embodiments, the instructions may cause the processor to, if the identified state of the power saving display mode is an active state, control the display driving integrated circuit so as to release display of one or more graphical elements on the display, based at least on the user input.

According to various embodiments, the instructions may cause the processor to: determine a function of the power saving display mode, based at least on the user input; transmit control information including the determined function of the power saving display mode to the display driving integrated circuit; and control the display driving integrated circuit so as to display one or more graphical elements on the display, based at least on the control information.

According to various embodiments, the instructions may cause the processor to determine the function of the power saving display mode, based on at least one of a duration, a detection position, or an intensity of a user input or a plurality of user inputs.

According to various embodiments, the function of the power saving display mode may include at least one of a size of a graphical element, a display time of a graphical element, a display area of a graphical element, brightness of a graphical element, an update period of a graphical element, or an application associated with a graphical element.

According to various embodiments, the instructions may cause the processor to: control the display driving integrated circuit so as to display one or more graphical elements while the processor is in a sleep mode; detect a user input on the graphical element; and execute a function related to the graphical element, based at least on the user input detected on the graphical element.

According to various embodiments, the function related to the graphical element may include at least one of movement of the graphical element, change of the graphical element, execution of an application associated with the graphical element, or display of a notification window associated with the graphical element.

Figure 6A:
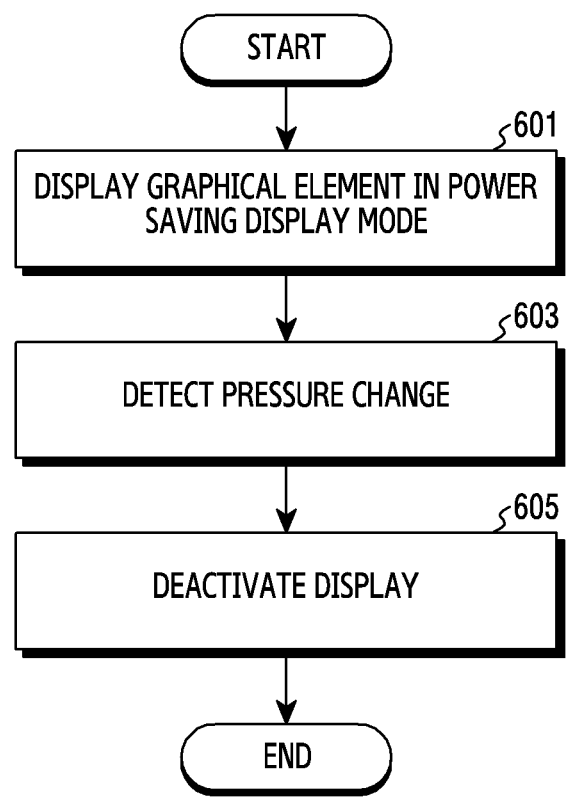
FIGS. 6A and 6B are flowcharts illustrating a process of displaying a graphical element in an electronic device according to various embodiments of the disclosure.
Figure 6B:
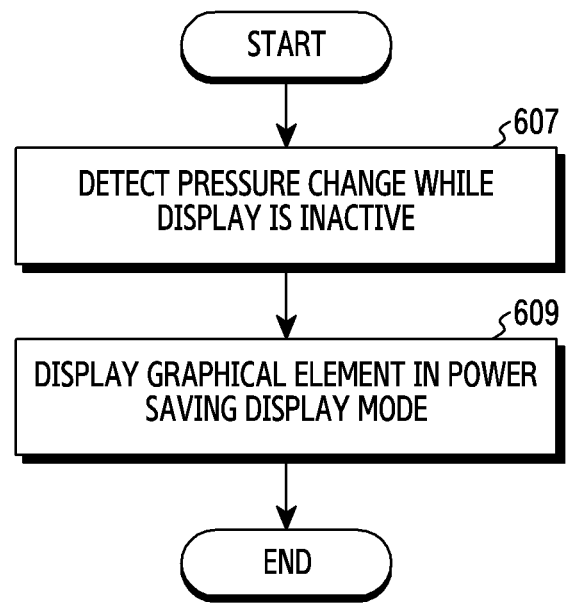

FIGS. 6A and 6B illustrate flowcharts for displaying graphical elements in an electronic device according to various embodiments of the disclosure. In the following description, an electronic device may include the electronic device 201 shown in FIGS. 2A and 2B or at least a part thereof (e.g., the processor 220, the display driving integrated circuit 262, the touch sensor IC 291, and the pressure sensor IC 293).

According to various embodiments of the disclosure, the power saving display mode may be the state in which a graphical element can be output through the display driving integrated circuit 262 while at least a portion of the processor is limited in driving. The power saving display mode may be configured based at least on a user input, or may be configured based at least on the initial configuration. For example, if the configured power saving display mode is activated (On), the electronic device 201 may display one or more graphical elements. On the other hand, if the configured power saving display mode is deactivated (OFF), the electronic device 201 may release the display of the graphical elements, thereby displaying only a black image. For example, even if the power saving display mode is deactivated, since the power saving display mode is still configured, the electronic device 201 may re-activate (On) the power saving display mode, based on a user input.

According to an embodiment, configuration and activation/deactivation of the power saving display mode may be simultaneously performed based at least on a user input. For example, the electronic device 201 may configure a power saving display mode, and may display graphical elements, based at least on a user input detected while the driving of the processor is limited. On the other hand, the electronic device 201 may release the display of the graphical elements, and may release the configuration of the power saving display mode, based at least on a user input detected while the driving of the processor is limited.

Referring to FIG. 6A, the electronic device (e.g., the processor 220) may display graphical elements in the power saving display mode in operation 601. For example, the processor 220 may perform control such that the display driving integrated circuit 262 displays one or more graphical elements in a selected area of a display panel 261 in FIG. 2B having a black background screen while at least a portion of the processor 220 is in a sleep mode. For example, the processor 220 may transmit graphical elements and driving information to the display driving integrated circuit 262, and may then be limited in driving. The display driving integrated circuit 262 may select at least some of the graphical elements in the power saving display mode. The display driving integrated circuit 262 may output at least some of the graphical elements corresponding to a specified area of the display panel 261, which corresponds to the driving information configured by the processor 220. For example, the display driving integrated circuit 262 may continuously or periodically update the graphical elements (e.g., time) displayed on the display panel 261. For example, the display driving integrated circuit 262 may output graphical elements including at least one of a digital clock, an analog clock, a date, a calendar, notification information, status information of the electronic device 201 (e.g., the battery level), emergency contact information, schedule information, member identification information (e.g., an employee ID card, membership information, etc.), a discount voucher, or memo information through the display panel 261 in the state in which the driving of the processor 220 is terminated.

According to various embodiments of the disclosure, the electronic device 201 may maintain activation of a touch function of at least a portion of the touch sensor 290 in FIG. 2B in the power saving display mode. For example, the electronic device 201 may maintain activation of a touch function of at least a portion, in which graphical elements are displayed, of the touch sensor 290 overlapping the display panel 261.

According to various embodiments of the disclosure, the electronic device 201 may maintain activation of a pressure sensing function of at least a portion of the pressure sensor 292 in FIG. 2B in the power saving display mode. For example, the electronic device 201 may maintain activation of a pressure sensing function of the pressure sensor 292 overlapping the display panel 261. Alternatively, the electronic device 201 may maintain activation of a pressure sensing function of an area, excluding at least a portion in which graphical elements are displayed, of the touch sensor 290 overlapping the display panel 261.

The electronic device (e.g., the processor 220) may detect a change in the pressure in operation 603. For example, the processor 220 may control the pressure sensor IC 293 so as to detect a change in the pressure through the pressure sensor 292. For example, the pressure sensor IC 293 may detect a pressure change in an area, excluding at least a portion in which graphical elements are displayed, using the pressure sensor 292.

In operation 605, the electronic device (e.g., the processor 220) may deactivate the display 260 in response to the detected pressure change. For example, the processor 220 may deactivate the display panel 264 by controlling the display driving integrated circuit 262. For example, the display driving integrated circuit 262 may release the display of the graphical elements, and may turn off the screen of the display panel 261.

Referring to FIG. 6B, the electronic device (e.g., the processor 220) may detect a change in the pressure using the pressure sensor IC 293 while the display 260 is inactive in operation 607. For example, the processor 220 may detect a change in the pressure by controlling the pressure sensor IC 293 in the power saving display mode. For example, the pressure sensor IC 293 may detect a change in the pressure in an area, excluding at least a portion in which graphical elements are displayed, using the pressure sensor 292.

The electronic device (e.g., the processor 220) may display graphical elements in the power saving display mode in operation 609. For example, the processor 220 may perform control such that the display driving integrated circuit 262 displays one or more graphical elements in a selected area of the display panel 261 having a black background while at least a portion of the processor 220 is in a sleep mode.

Figure 7:
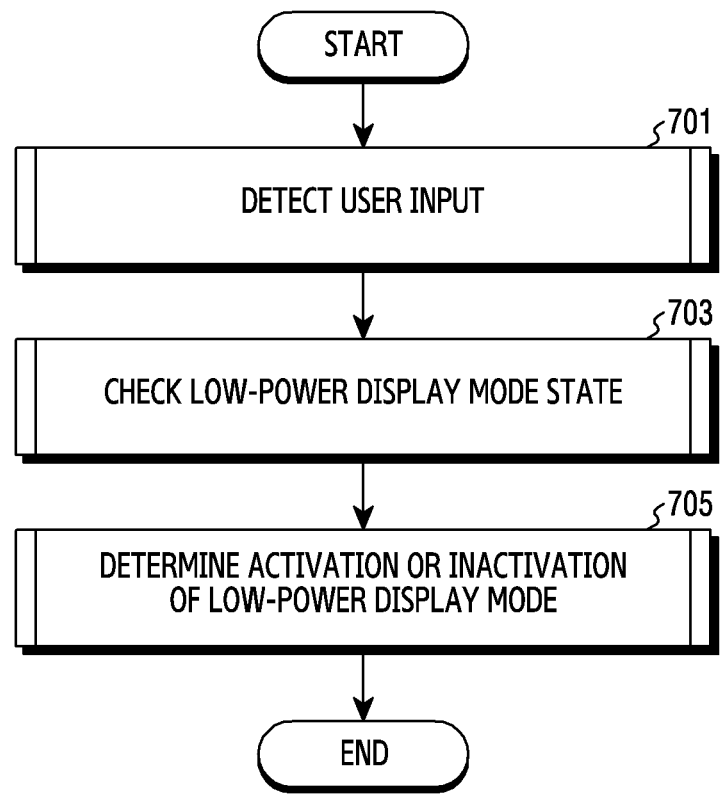
FIG. 7 is a flowchart illustrating a process of determining activation or deactivation of a power saving display mode in an electronic device according to various embodiments of the disclosure.
Figure 8:
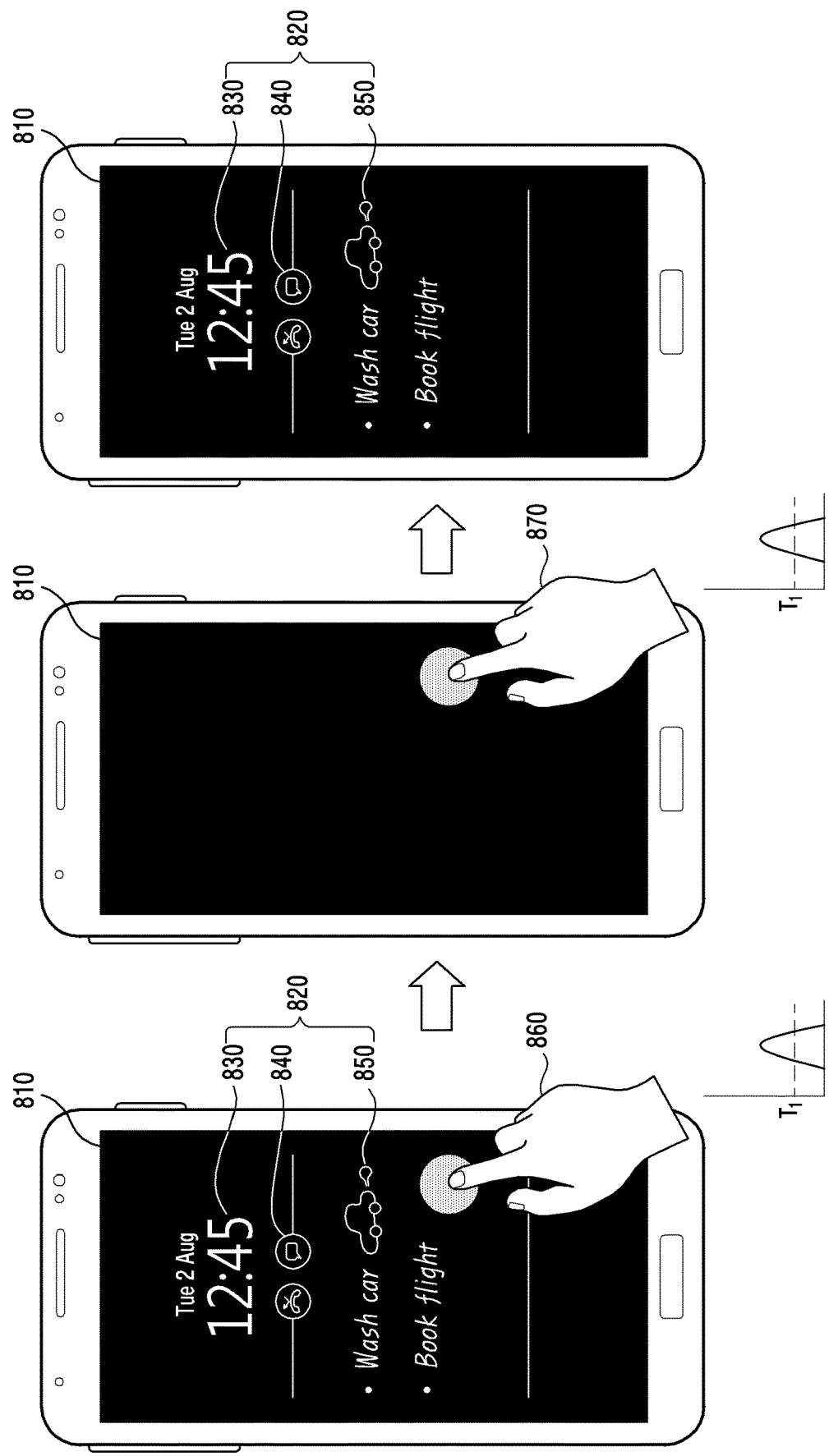
FIG. 8 illustrates a screen configuration for determining activation or deactivation of a power saving display mode in an electronic device according to various embodiments of the disclosure.

FIG. 7 is a flowchart illustrating a process of determining activation or deactivation of a power saving display mode in an electronic device according to various embodiments of the disclosure. FIG. 8 illustrates a screen configuration for determining activation or deactivation of a power saving display mode in an electronic device according to various embodiments of the disclosure. In the following description, an electronic device may include the electronic device 201 shown in FIGS. 2A and 2B or at least a part thereof (e.g., the processor 220, the display driving integrated circuit 262, the touch sensor IC 291, and the pressure sensor IC 293).

Referring to FIG. 7, the electronic device (e.g., the touch sensor IC 291 or the pressure sensor IC 293) may detect a user input using the touch sensor 290 or the pressure sensor 292 in operation 701. For example, the touch sensor IC 291 may detect a touch using the touch sensor 290 in a power saving display mode. In addition, the pressure sensor IC 293 may detect pressure produced in a first area using the pressure sensor 292 in the power saving display mode. For example, the pressure sensor IC 293 may receive first area information from the processor 220, and may detect pressure, based on the first area information. The first area may be an effective pressure area in which pressure is able to be detected in the power saving display mode. For example, the electronic device 201 may recognize the pressure detected only in the first area as an effective pressure. According to an embodiment, the position and area of the first area may vary. For example, if the power saving display mode is not activated, the first area may be the same as the entire display 260 in FIG. 2A, and if the power saving display mode is activated, the position and area of the first area may be the same as those of the area in which the graphical elements are not displayed. In addition, the position and area of the first area may be changed according to the user's configuration while the power saving display mode is active. As described above, the processor 220 may determine a function of the power saving display mode, based on the detected touch and pressure. Meanwhile, the user input detection operation 701 may be activated and processed when the processor 220 in the sleep mode performs operation 701.

In operation 703, the electronic device (e.g., the processor 220) may identify the state of the power saving display mode. For example, the processor 220 may be activated if a user input is detected in the power saving display mode, and the processor 220 may identify whether the power saving display mode is active or inactive, based at least on the user input. The active state of the power saving display mode may denote the state in which at least one graphical element is displayed on the display panel 261, and the inactive state of the power saving display mode may denote the state in which only a black image (e.g., a black background screen) is displayed on the display panel 261. Meanwhile, the operation 703 of identifying the state of the power saving display mode may be performed by the display driving integrated circuit 262, the touch sensor IC 291, or the pressure sensor IC 293.

The electronic device (e.g., the processor 220) may determine whether to activate or deactivate the power saving display mode in operation 705. For example, if a user input is detected while the power saving display mode is active, the processor 220 may deactivate the power saving display mode. For example, as shown in FIG. 8, if the processor 220 detects a user input 860 having a predetermined intensity (T1) or more while displaying graphical elements 820 including a clock 830, icons 840, a memo 850, and the like on the display screen 810, the processor 220 may release the display of the graphical elements 820 and may then display only a black background screen. In addition, for example, the processor 220 may activate the power saving display mode if a user input is detected while the power saving display mode is inactive. For example, as shown in FIG. 8, if the processor 220 detects a user input 870 having a predetermined intensity (T1) or more while only a black background screen is being displayed on the display screen 810, the processor 220 may display the graphical elements 820 on the display screen 810. Meanwhile, the operation 705 of determining whether to activate or deactivate the power saving display mode may be performed by the display driving integrated circuit 262, the touch sensor IC 291, or the pressure sensor IC 293.

Figure 9:
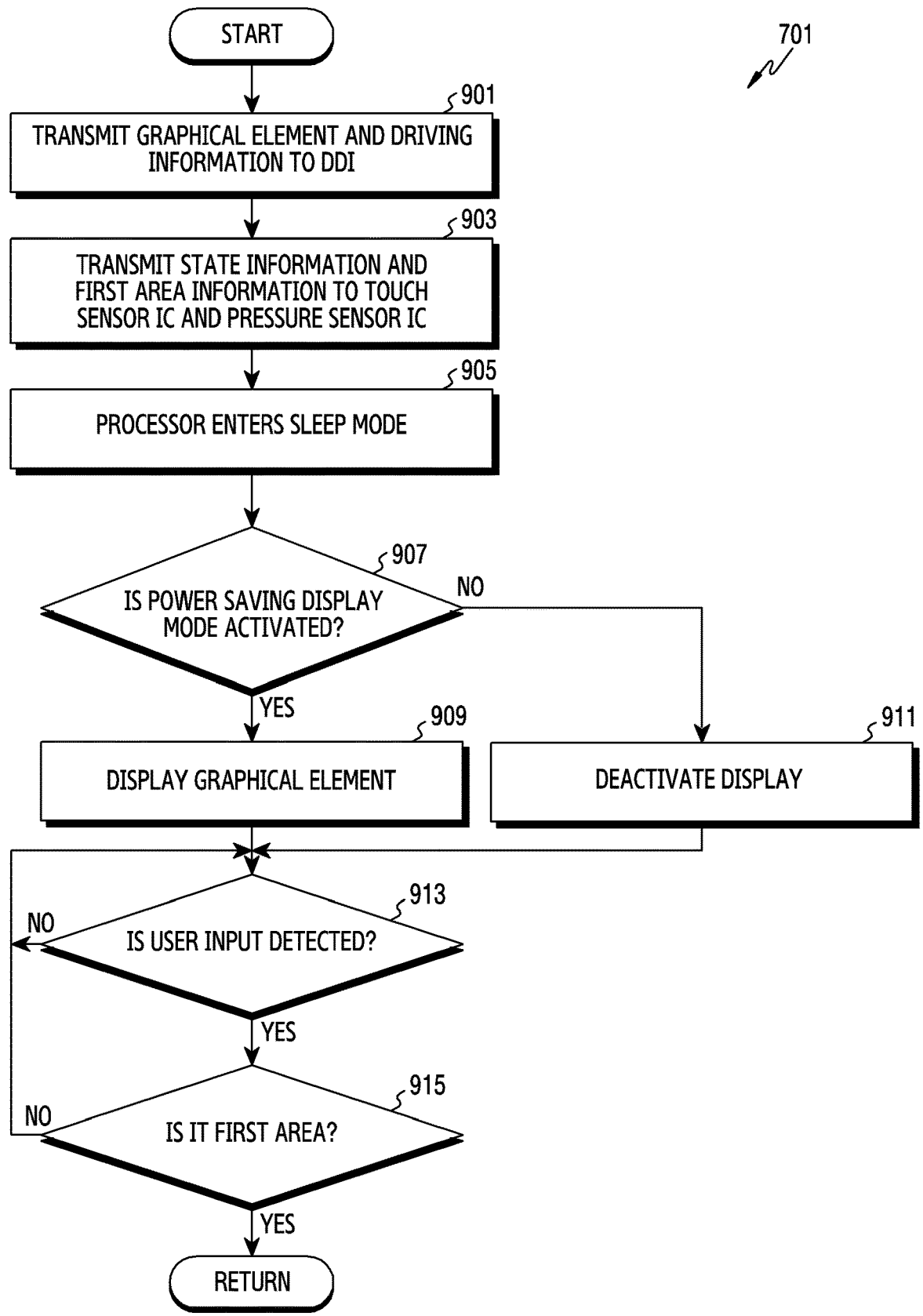
FIG. 9 is a flowchart illustrating a process of detecting a user input in an electronic device according to various embodiments of the disclosure.
Figure 10:
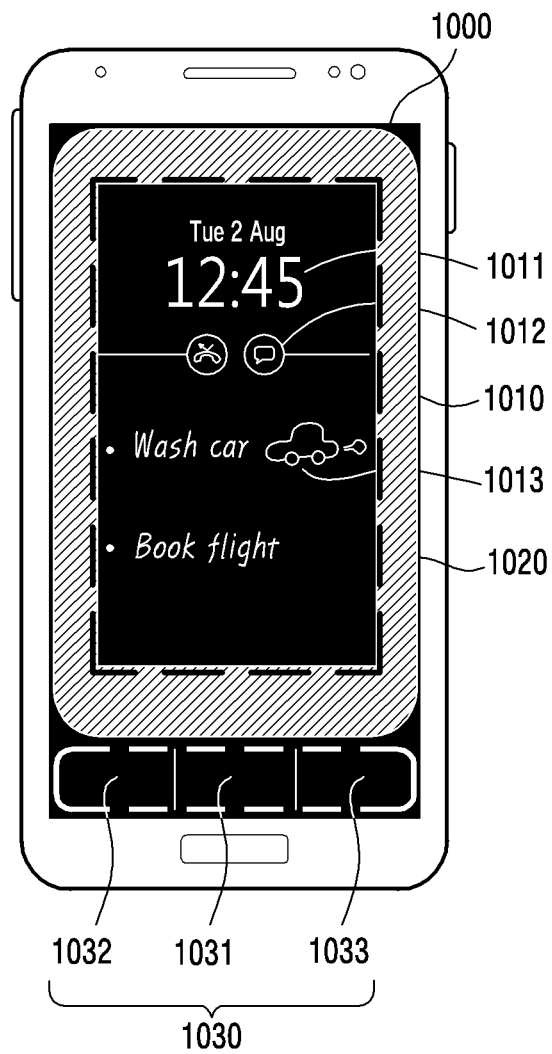
FIG. 10 illustrates a screen configuration for detecting a user input in an electronic device according to various embodiments of the disclosure.

FIG. 9 is a flowchart illustrating a process of detecting a user input in an electronic device according to various embodiments of the disclosure. FIG. 10 illustrates a screen configuration for detecting a user input in an electronic device according to various embodiments of the disclosure. Hereinafter, a description will be made of the operation 701 of detecting a user input in FIG. 7. In the following description, an electronic device may include the electronic device 201 shown in FIGS. 2A and 2B or at least a part thereof (e.g., the processor 220, the display driving integrated circuit 262, the touch sensor IC 291, and the pressure sensor IC 293).

Referring to FIG. 9, the electronic device (e.g., the processor 220) may transmit graphical elements and driving information to the display driving integrated circuit 262 in operation 901. For example, the processor 220 may produce graphical elements and driving information, and may transmit the produced graphical elements and driving information to the display driving integrated circuit 262. For example, the graphical elements may include at least one of an icon, an image, time, a date, a font, a graphic use time, or a user-specified phrase. The driving information may include at least one of an update period of a graphical element, a display size of a graphical element, an amount of display information of a graphical element, a display time of a graphical element, the display brightness of a graphical element, associated function information of a graphical element (e.g., an application associated with the graphical element), or a display area of a graphical element.

In operation 903, the electronic device (e.g., the processor 220) may transmit state information, first area information, and second area information to the touch sensor IC 291 and the pressure sensor IC 293. For example, the state information may include whether or not the power saving display mode is applied. For example, the processor 220 may transmit, to the touch sensor IC 291 and the pressure sensor IC 293, information informing that the processor 220 operates in the power saving display mode. The first area information may include a first area in which an effective touch or an effective pressure is able to be recognized. Here, the effective touch or the effective pressure may denote a touch or pressure that can determine the function of the power saving display mode. The second area information may include a graphical-element display area or a system area of a display screen, excluding the first area.

According to an embodiment, operation 901 and operation 903 may be performed in an order different from the order illustrated in FIG. 9. For example, operation 903 may be executed prior to operation 901, or operation 901 and operation 903 may be executed simultaneously.

According to an embodiment, as shown in FIG. 10, the processor 220 may divide a screen 1000 of the display panel 261 into a graphical-element display area 1010, an outer area 1020, and a system area 1030 in the power saving display mode. The graphical-element display area 1010 may display graphical elements including a clock 1011, icons 1012, a memo 1013, and the like, and may be an area capable of recognizing a touch and/or pressure. If a touch or pressure is recognized in the graphical-element display area 1010, the processor 220 may execute a function corresponding to the object in which the corresponding touch or pressure is detected. For example, if a touch or pressure is detected in the clock 1011, the processor 220 may execute a clock application, and if a touch or pressure is detected in the memo 1013, the processor 220 may execute a memo application. The system area 1030 may include a home key area 1031 and left and right physical-key areas 1032 and 1033, may be an area in which a home key and left and right physical-keys are implemented in the form of a soft key, and may an area capable of recognizing pressure. For example, icons corresponding to the keys may be displayed in the system area 1030, and the system area may be turned on/off based on a predefined touch operation (e.g., an up/down-swipe or a double tap). The system area 1030 may be activated even in the inactive state of the power saving display mode. The processor 220 may ignore a touch input produced in the system area 1030, except for a predefined touch operation, and may perform a key operation defined in the system area if pressure is produced and recognized in the system area 1030. For example, if pressure is recognized in the system area 1030, the processor 220 may execute an operation corresponding to the home key or the left or right physical keys. The outer area 1020 may be an area capable of recognizing a long-pressed touch or pressure. In addition to the long-pressed touch, the outer area 1020 may also recognize other touch inputs (e.g., a double tap). The processor 220 may ignore a touch input other than the long-pressed touch recognized in the outer area 1020, and if a long-pressed touch or pressure is recognized in the outer area 1020, the processor 220 may determine the function of the power saving display mode.

According to an embodiment, the processor 220 may configure the outer area 1020 illustrated in FIG. 10 as a first area. For example, the processor 220 may activate or deactivate the power saving display mode if a long-pressed touch or pressure is detected in the outer area 1020. Alternatively, the processor 220 may configure the area excluding the home key area 1031 of the system area 1030 illustrated in FIG. 10 as a first area. For example, if a long-pressed touch or pressure is detected in the graphical-element display area 1010, the outer area 1020, or the left and right physical-key areas 1032 and 1033, the processor 220 may activate or deactivate the power saving display mode.

In operation 905, the electronic device (e.g., the processor 220) may switch the processor 220 to a sleep mode. For example, as the processor 220 switches to a sleep mode, the electronic device 201 may operate in a power saving display mode. In the power saving display mode, the touch sensor IC 291 or the pressure sensor IC 293 may detect a user input.

In operation 907, the electronic device (e.g., the display driving integrated circuit 262) may determine whether or not to activate the power saving display mode. For example, as the electronic device 201 is driven in the power saving display mode, the display driving integrated circuit 262 may determine whether or not to activate the power saving display mode. For example, the display driving integrated circuit 262 may determine whether or not to display graphical elements in the graphical-element display area 1010 of the display panel 261, based on the graphical elements and driving information.

If it is determined that the power saving display mode is to be activated, the electronic device (e.g., the display driving integrated circuit 262) may proceed to operation 909, thereby displaying graphical elements in the graphical-element display area 1010 of the display panel 261.

On the other hand, if it is determined that the power saving display mode is to be deactivated, the electronic device (e.g., the display driving integrated circuit 262) may proceed to operation 911, thereby deactivating the display panel 261. For example, the display driving integrated circuit 262 may display a black background screen.

The electronic device (e.g., the touch sensor IC 291 or the pressure sensor IC 293) may detect a user input in operation 913. For example, the touch sensor IC 291 or the pressure sensor IC 293 may detect a touch or pressure using the touch sensor 290 or the pressure sensor 292, respectively.

In operation 915, the electronic device (e.g., the touch sensor IC 291 or the pressure sensor IC 293) may determine whether or not the area in which the user input was detected is a first area. For example, the touch sensor IC 291 may determine whether or not the touch detected using the touch sensor 290 is a long-pressed touch. If the detected touch is a long-pressed touch, the touch sensor IC 291 may determine whether or not the area in which the touch was detected is the first area. In addition, for example, the pressure sensor IC 293 may determine whether or not the area in which the pressure was detected is the first area.

If the area in which the user input was detected is the first area, the electronic device (e.g., the processor 220) may return to operation 703 in FIG. 7 to identify the state of the power saving display mode. On the other hand, if the area in which the user input was detected is not the first area, the electronic device (e.g., the processor 220) may proceed to operation 913 to determine whether or not a user input is detected. For example, if the detected user input does not belong to the first area, the processor 220 may ignore the detected user input, and may proceed to operation 913, thereby determining whether or not a user input is detected.

According to an embodiment, although not shown in the drawing, if the area in which the user input was detected is not the first area, the electronic device (e.g., the processor 220) may determine whether or not the area in which the user input was detected is a second area. For example, if it is determined that the area in which the user input was detected is the graphical-element display area 1010 of the second area, the processor 220 may execute a function related to the graphical element in which the user input was detected. In addition, if it is determined that the area in which the user input was detected is the system area 1030 of the second area, the processor 220 may execute a function related to a key (e.g., the home key or the left and right physical keys) on which the user input was detected.

According to an embodiment, the processor 220 in the sleep mode may be temporarily activated, and may then perform operations 907 to 915, and after performing operations 907 to 915, the processor 220 may return to the sleep mode.

Figure 11:
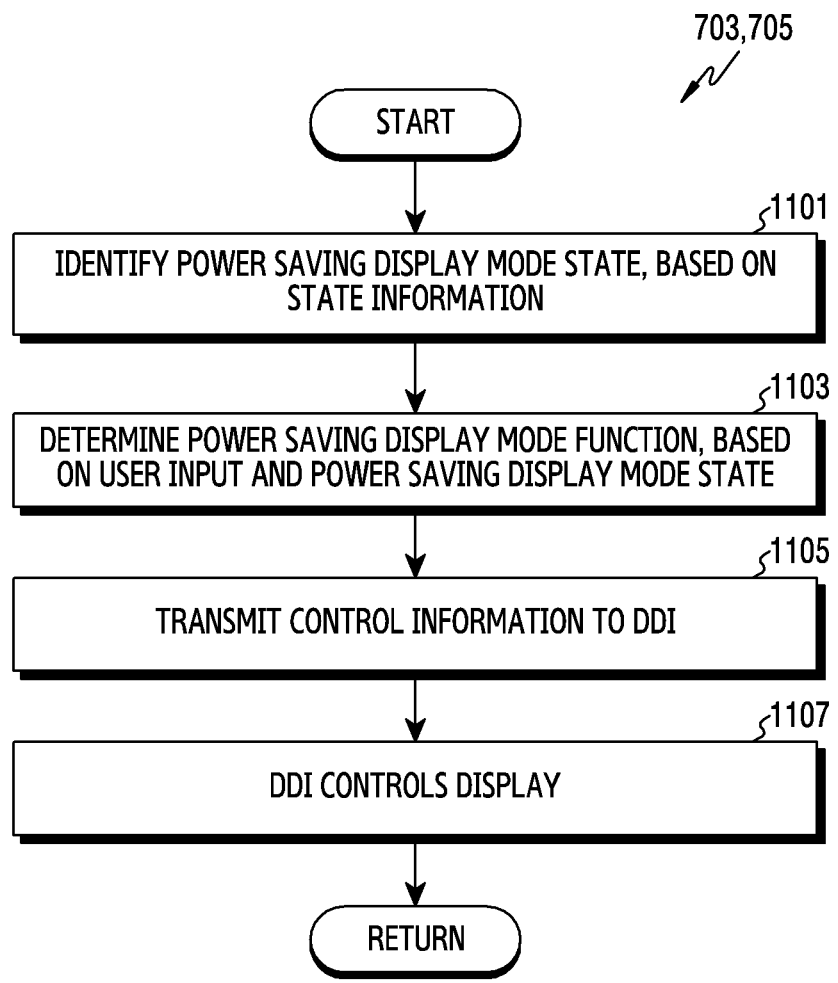
FIG. 11 is a flowchart illustrating a process of controlling a function of a power saving display mode in an electronic device according to various embodiments of the disclosure.

FIG. 11 is a flowchart illustrating a process of controlling a function of a power saving display mode in an electronic device according to various embodiments of the disclosure. Hereinafter, a description will be made of operations 703 and 705 shown in FIG. 7. In the following description, an electronic device may include the electronic device 201 shown in FIGS. 2A and 2B or at least a part thereof (e.g., the processor 220, the display driving integrated circuit 262, the touch sensor IC 291, and the pressure sensor IC 293).

Referring to FIG. 11, the electronic device (e.g., the processor 220) may identify the state of a power saving display mode, based at least on state information in operation 1101. For example, if a user input is detected in a first area, the processor 220 may be temporarily activated to identify whether or not the power saving display mode is activated, and may return to the sleep mode after executing the corresponding operation. For example, the processor 220 may identify whether to display graphical elements or only a black background screen on the display panel 261 at the time of detecting a user input in the first area.

In operation 1103, the electronic device (e.g., the processor 220) may determine a function of the power saving display mode, based at least on the user input and the state of the power saving display mode. For example, the function of the power saving display mode may include at least one of activation or deactivation of the power saving display mode, an update period of a graphical element, a display size of a graphical element, an amount of display information of a graphical element, a display time of a graphical element, display brightness of a graphical element, associated function information of a graphical element (e.g., an application associated with a graphical element), or a display area of a graphical element. For example, if a user input is detected in the first area, the processor 220 may activate the deactivated power saving display mode, or may deactivate the activated power saving display mode.

In operation 1105, the electronic device (e.g., the processor 220) may transmit control information to the display driving integrated circuit 262. The control information may include information about a user's touch or pressure (e.g., coordinates, gesture type, gesture direction, etc.), a determined power saving display mode function, and the like. For example, the processor 220 may transmit control information to the display driving integrated circuit 262, and may switch to a sleep mode.

The electronic device (e.g., the display driving integrated circuit 262) may control the display 260 using the display driving integrated circuit 262 in operation 1107. For example, the display driving integrated circuit 262 may control the display of the display panel 261, based at least on the control information.

According to an embodiment, the display driving integrated circuit 262 may identify the state of the power saving display mode, based on state information, and may determine the function of the power saving display mode, based on the user input and the state of the power saving display mode. That is, the display driving integrated circuit 262 may perform operation 1101, operation 1103, and operation 1107, omitting operation 1105.

Figure 12:
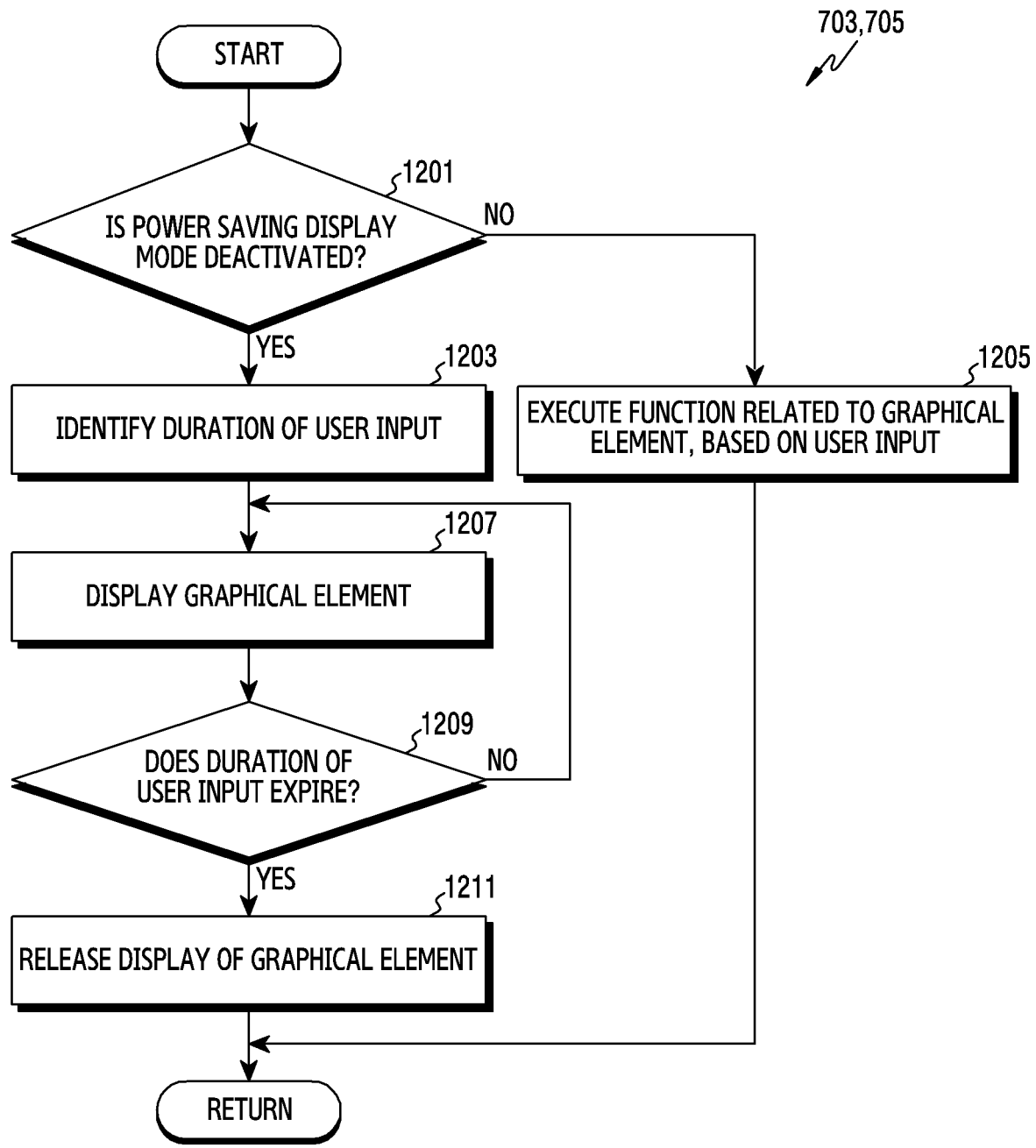
FIG. 12 is a flowchart illustrating a process of determining a time of displaying a graphical element in an electronic device according to various embodiments of the disclosure.
Figure 13:
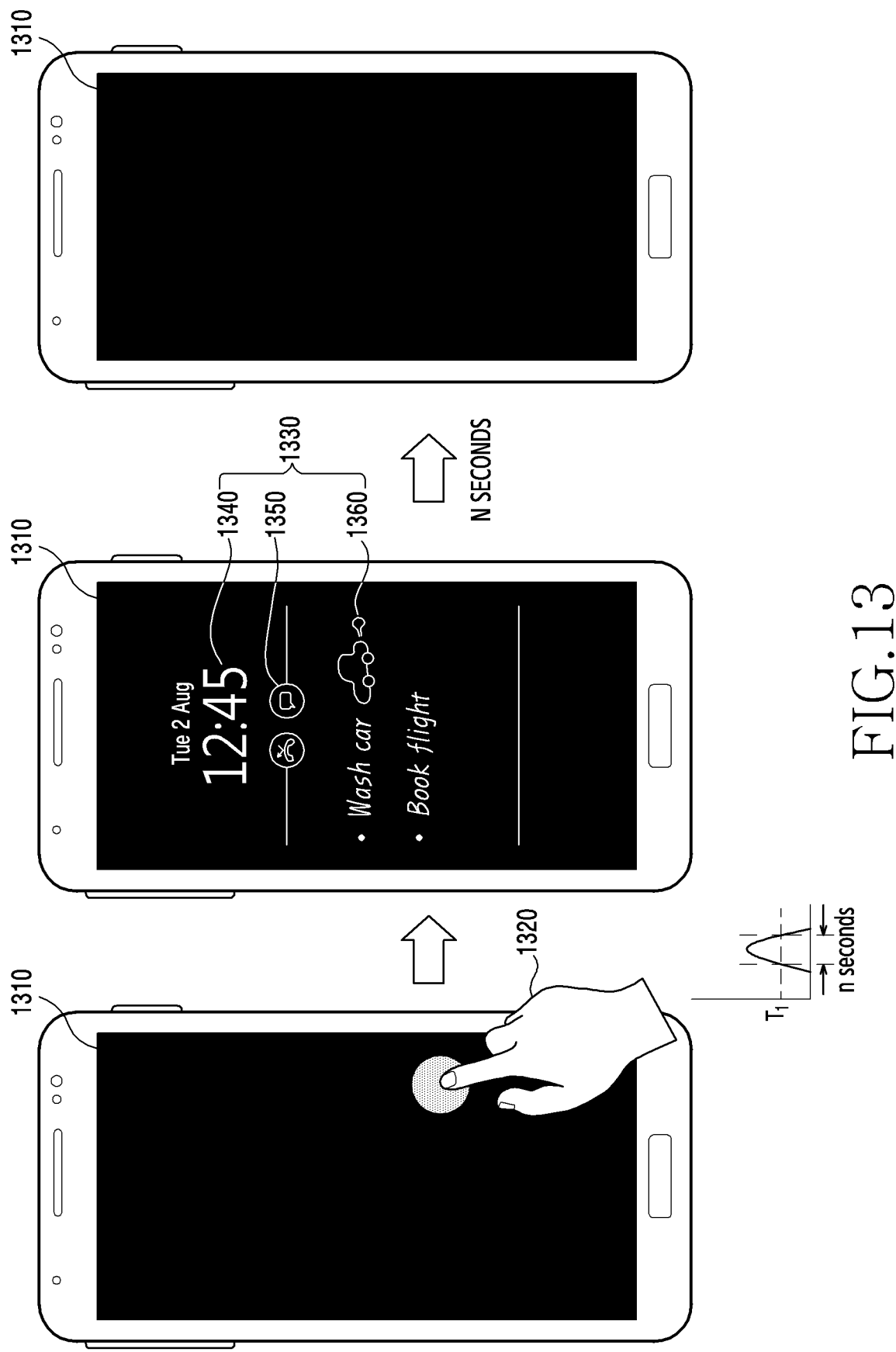
FIG. 13 illustrates a screen configuration for determining a time of displaying a graphical element in an electronic device according to various embodiments of the disclosure.

FIG. 12 is a flowchart illustrating a process of determining a time for displaying a graphical element in an electronic device according to various embodiments of the disclosure. FIG. 13 illustrates a screen configuration for determining a time for displaying a graphical element in an electronic device according to various embodiments of the disclosure. Hereinafter, a description will be made of operations 703 and 705 shown in FIG. 7. In the following description, an electronic device may include the electronic device 201 shown in FIGS. 2A and 2B or at least a part thereof (e.g., the processor 220, the display driving integrated circuit 262, the touch sensor IC 291, and the pressure sensor IC 293).

Referring to FIG. 12, the electronic device (e.g., the processor 220) may determine whether or not to deactivate the power saving display mode in operation 1201. For example, the processor 220 may identify whether or not the display panel 261 is displaying one or more graphical elements.

If the power saving display mode is activated, the electronic device (e.g., the processor 220) may proceed to operation 1205, thereby executing a function related to the graphical elements, based at least on a user input. For example, if the first area includes a graphical-element display area 1010 in FIG. 10, the processor 220 may determine whether or not the user input detected in the first area is an input for selecting some of the graphical elements. If the user input is an input for selecting some of the graphical elements, the processor 220 may execute functions related to the graphical elements. For example, the processor 220 may execute an application associated with the graphical element.

On the other hand, if the power saving display mode is deactivated, the electronic device (e.g., the processor 220) may proceed to operation 1203, thereby identifying the duration of a user input. For example, as shown in FIG. 13, the processor 220 may identify that the duration of a user input 1320 having a predetermined intensity (T1) or more, which is detected on the display screen 1310, is n seconds.

The electronic device (e.g., the display driving integrated circuit 262) may display graphical elements in operation 1207. For example, the processor 220 may transmit, to the display driving integrated circuit 262, control information including the duration of a user input. The display driving integrated circuit 262 may display, on the display screen 1310, graphical elements 1330 including a clock 1340, icons 1350, and a memo 1360, based at least on the control information received from the processor 220, as shown in FIG. 13.

The electronic device (e.g., the processor 220) may identify whether or not the duration of the user input expires in operation 1209. For example, the processor 220 may identify whether or not n seconds corresponding to the identified duration of the user input elapsed.

If the duration of the user input expires, the electronic device (e.g., the display driving integrated circuit 262) may proceed to operation 1211, thereby releasing the display of the graphical elements. For example, as the duration of the user input expires, the processor 220 may transmit, to the display driving integrated circuit 262, control information to release the display, and the display driving integrated circuit 262 may release the display of the graphical elements 1330 as shown in FIG. 13.

On the other hand, if the duration of the user input does not expire, the electronic device (e.g., the display driving integrated circuit 262) may proceed to operation 1207, thereby displaying the graphical elements.

According to an embodiment, the electronic device 201 may display the graphical elements only while a user input is recognized, and may release the display of the graphical elements if the user input is released.

According to various embodiments of the disclosure, operations 1201 to 1211 may be executed by the display driving integrated circuit 262, and the processor 220 may remain in the sleep state.

Figure 14:
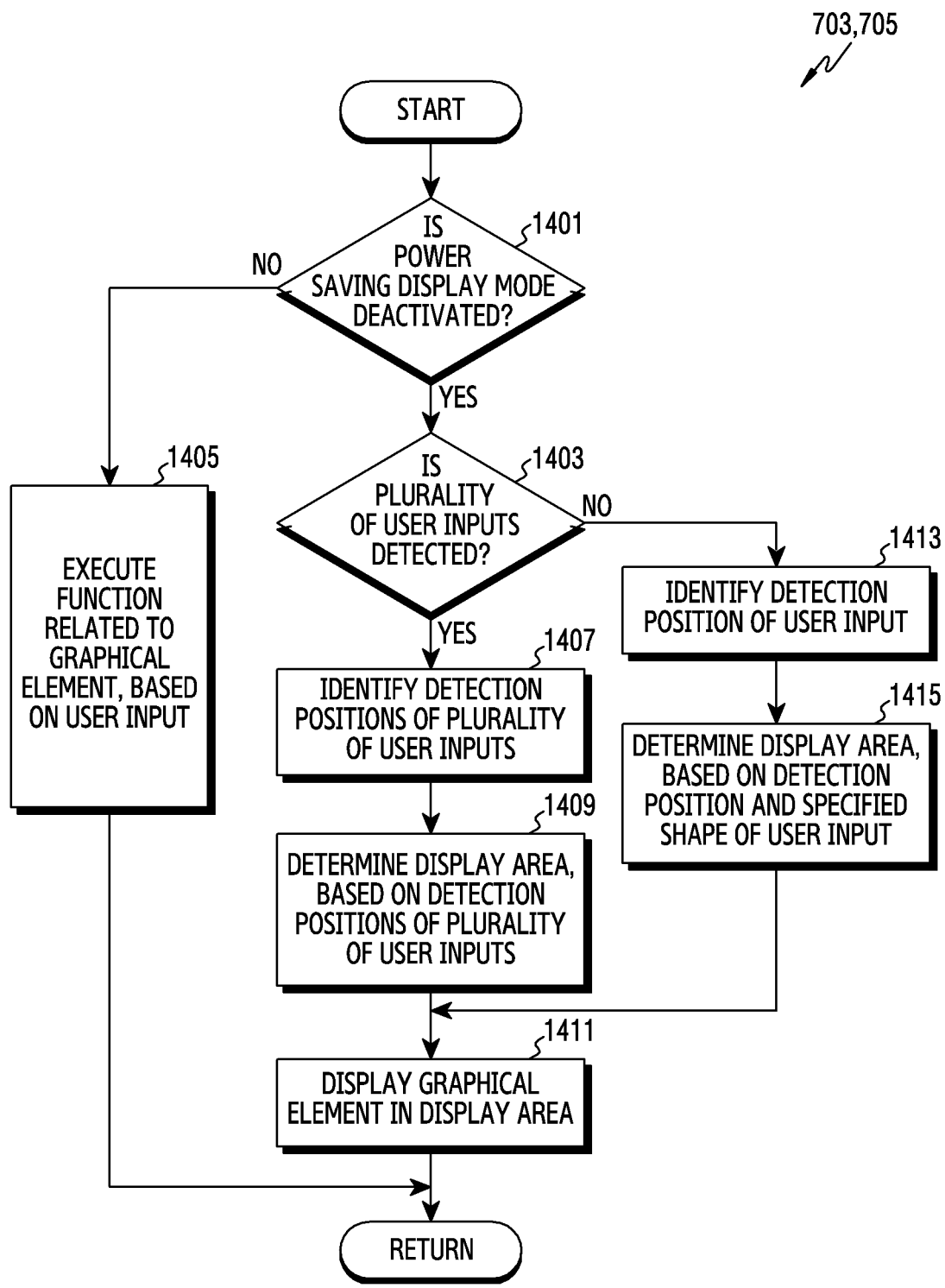
FIG. 14 is a flowchart illustrating a process of determining an area in which a graphical element is displayed in an electronic device according to various embodiments of the disclosure.
Figure 15:
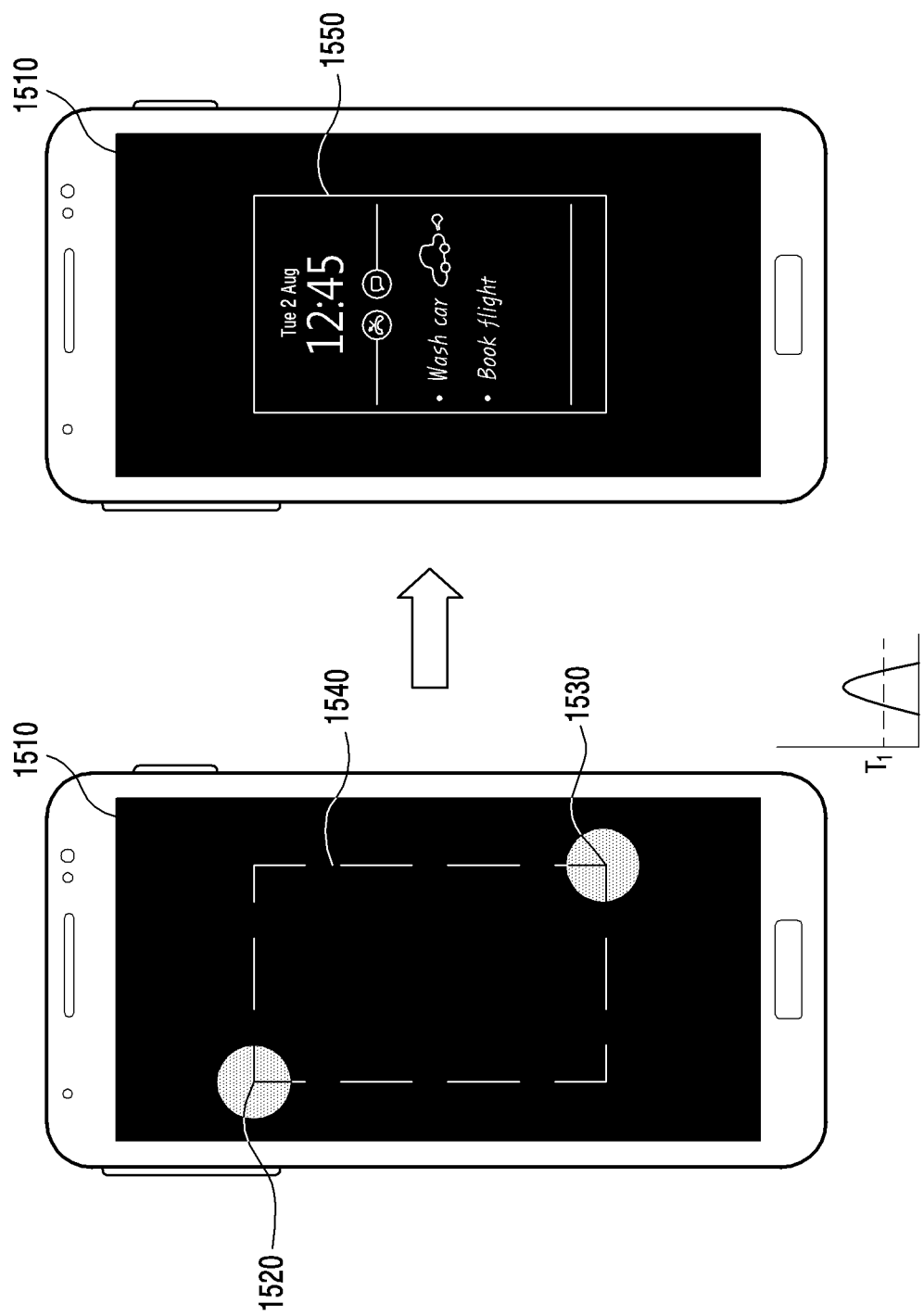
FIGS. 15 and 16 illustrate screen configurations for determining an area in which a graphical element is displayed in an electronic device according to various embodiments of the disclosure.
Figure 16:
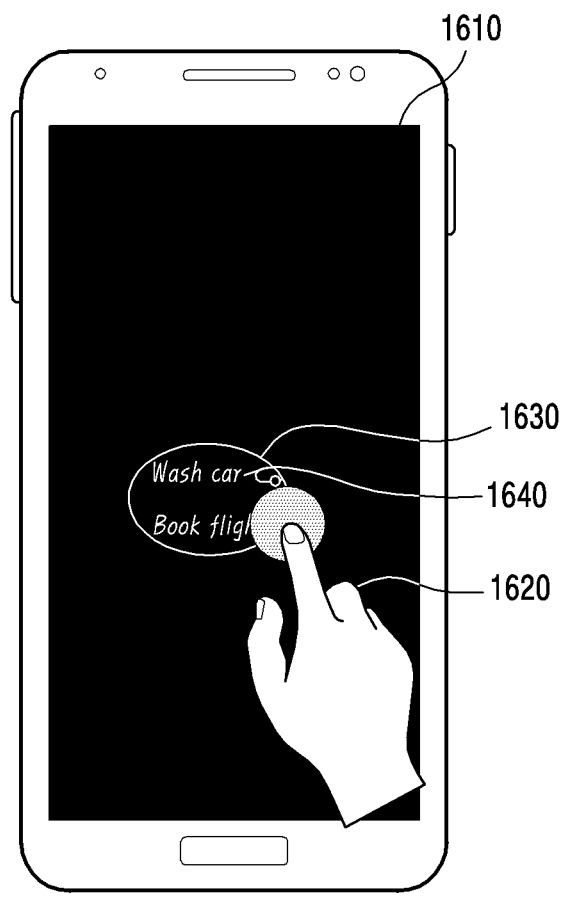

FIG. 14 is a flowchart illustrating a process of determining an area in which a graphical element is displayed in an electronic device according to various embodiments of the disclosure. FIGS. 15 and 16 illustrate screen configurations for determining an area in which a graphical element is displayed in an electronic device according to various embodiments of the disclosure. Hereinafter, a description will be made of operations 703 and 705 shown in FIG. 7. In the following description, an electronic device may include the electronic device 201 shown in FIGS. 2A and 2B or at least a part thereof (e.g., the processor 220, the display driving integrated circuit 262, the touch sensor IC 291, and the pressure sensor IC 293).

Referring to FIG. 14, the electronic device (e.g., the processor 220) may determine whether or not to deactivate the power saving display mode in operation 1401. For example, the processor 220 may identify whether or not the display panel 261 is displaying one or more graphical elements.

If the power saving display mode is activated, the electronic device (e.g., the processor 220) may proceed to operation 1405, thereby executing a function related to the graphical element, based at least on a user input.

On the other hand, if the power saving display mode is deactivated, the electronic device (e.g., the processor 220) may proceed to operation 1403, thereby determining whether or not a plurality of user inputs is detected. For example, the processor 220 may determine whether or not the user inputs 1520 and 1530 detected on the display screen 1510 are multiple inputs as shown in FIG. 15.

If a plurality of user inputs is detected, the electronic device (e.g., the processor 220) may proceed to operation 1407, thereby identifying the detection positions of the plurality of user inputs. For example, the processor 220 may identify the positions of a first user input 1520 and a second user input 1530 on the display screen 1510 as shown in FIG. 15.

In operation 1409, the electronic device (e.g., the processor 220) may determine a graphical-element display area, based on the detection positions of the plurality of user inputs. For example, the processor 220 may determine a graphical-element display area 1540, based on the first user input 1520 and the second user input 1530 as shown in FIG. 15. For example, the processor 220 may determine, as the graphical-element display area 1540, a rectangle having vertices of the first user input 1510 and the second user input 1520. According to an embodiment, after the initial area of the graphical-element display area 1540 is determined based on the plurality of user inputs, the final area of the graphical-element display area 1540 may be determined to be smaller or larger than the original area thereof, based on the intensity of pressure detected while the user input is maintained.

In operation 1411, the electronic device (e.g., the display driving integrated circuit 262) may display graphical elements on the graphical-element display area of the display screen 1510. For example, the processor 220 may transmit control information including the determined graphical-element display area to the display driving integrated circuit 262. The display driving integrated circuit 262 may display graphical elements 1550 on the graphical-element display area 1540 of the display screen 1510, based at least on the control information received from the processor 220, as shown in FIG. 15.

On the other hand, if a plurality of user inputs is not detected, the electronic device (e.g., the processor 220) may proceed to operation 1413, thereby identifying the detection position of a user input. For example, the processor 220 may identify the position of a user input 1620 having a predetermined intensity or more, which is detected on the display screen 1610, as shown in FIG. 16.

In operation 1415, the electronic device (e.g., the processor 220) may determine a graphical-element display area, based on the detection position of the user input and a specified shape. For example, the processor 220 may determine a circular graphical-element display area 1630, based on the detected position of the user input 1620 as shown in FIG. 16. The specified shape may be a predefined shape, such as a circle, an ellipse, a square, a rectangle, and the size of the specified shape may be determined in the range within a predetermined distance from the detected position of the user input 1620, and may be adjusted to be larger or smaller based on the intensity of the detected pressure. The electronic device (e.g., the display driving integrated circuit 262) may proceed to operation 1411, thereby displaying graphical elements 1640 in the determined graphical-element display area 1630.

According to an embodiment, the electronic device (e.g., the display driving integrated circuit 262) may display the graphical elements in the graphical-element display area only during the duration in which a plurality of user inputs is received. Alternatively, the display driving integrated circuit 262 may display the graphical elements in the graphic display area only while a plurality of user inputs is maintained.

According to various embodiments, operations 1201 to 1211 may be executed by the display driving integrated circuit 262, and the processor 220 may remain in the sleep mode.

Figure 17:
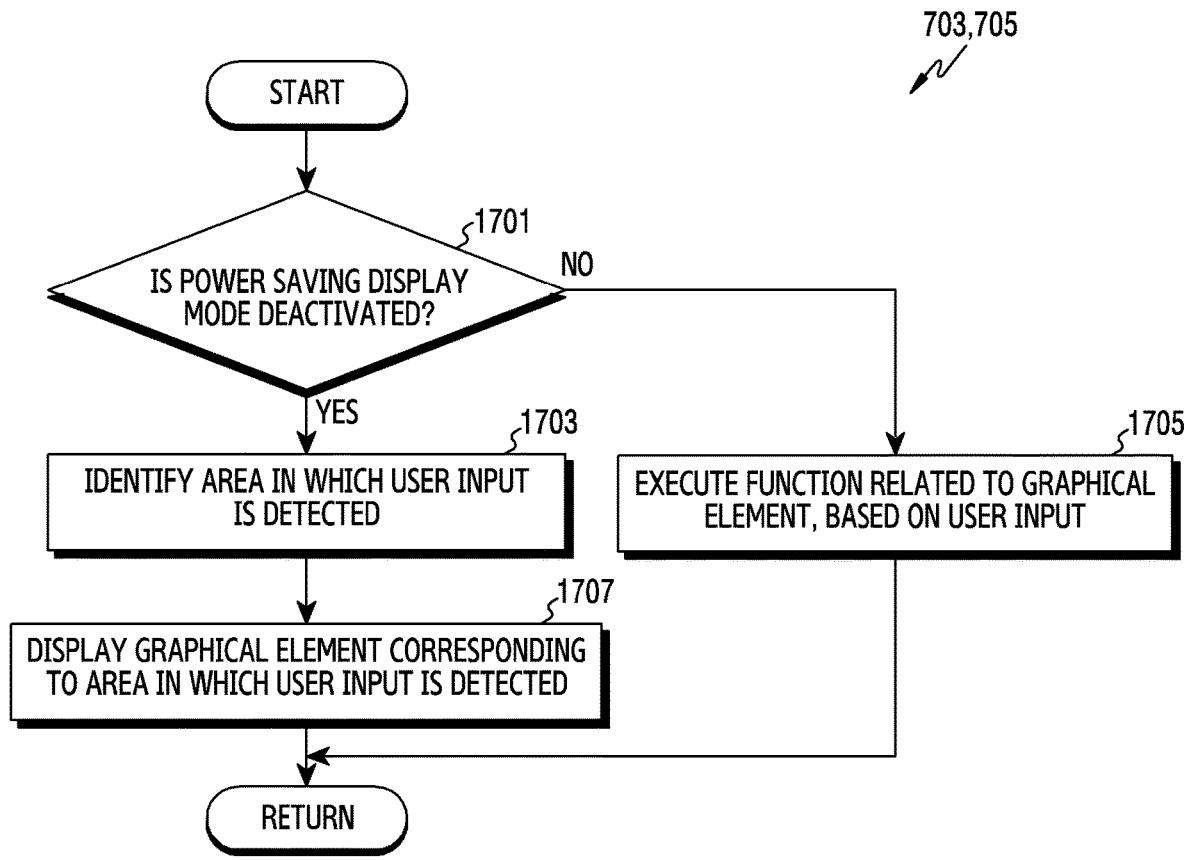
FIG. 17 is a flowchart illustrating a process of selecting an area in which a graphical element is displayed in an electronic device according to various embodiments of the disclosure.
Figure 18:
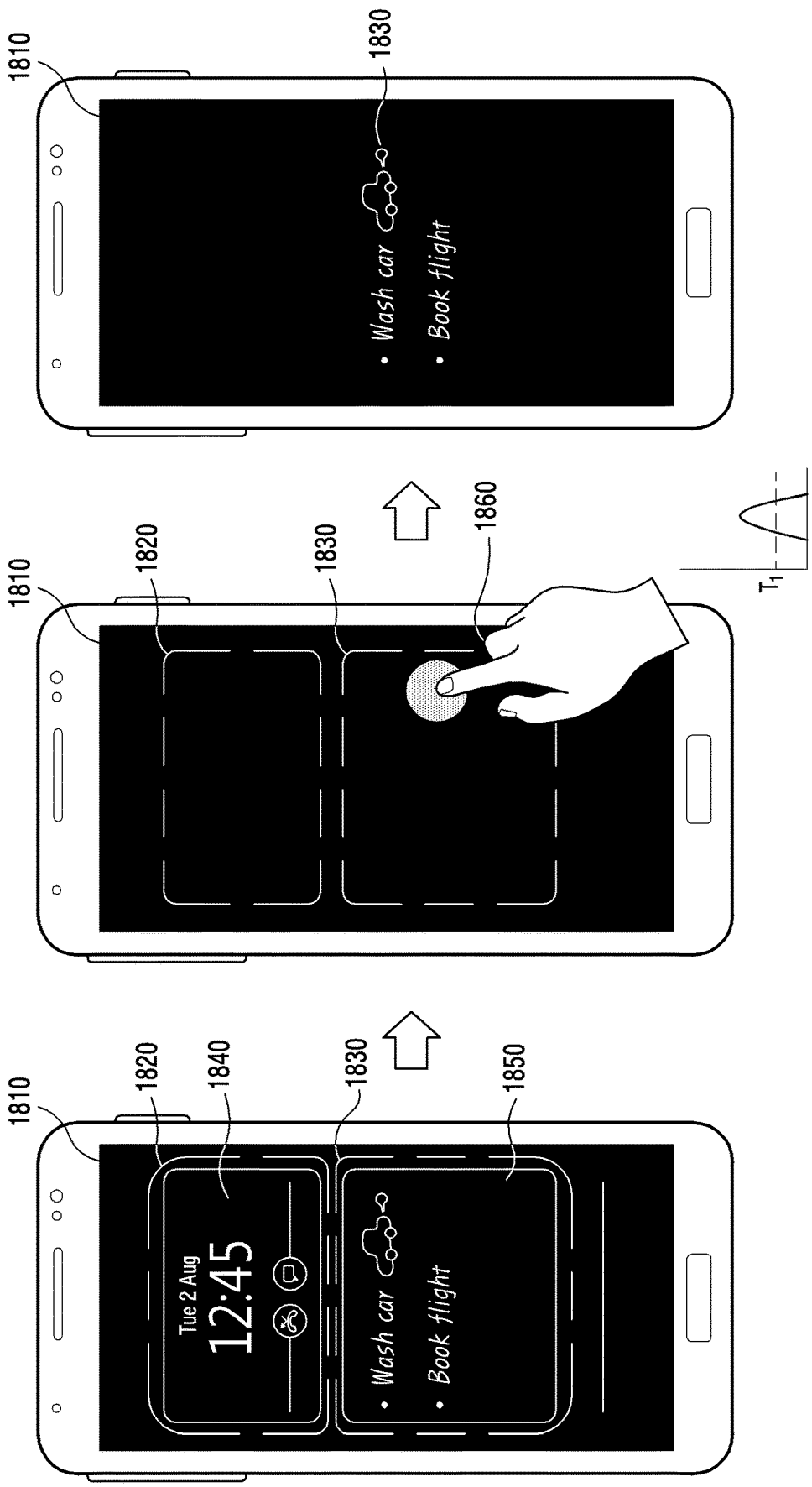
FIG. 18 illustrates a screen configuration for selecting an area in which a graphical element is displayed in an electronic device according to various embodiments of the disclosure.

FIG. 17 is a flowchart illustrating a process of selecting an area in which a graphical element is displayed in an electronic device according to various embodiments of the disclosure. FIG. 18 illustrates a screen configuration for selecting an area in which a graphical element is displayed in an electronic device according to various embodiments of the disclosure. Hereinafter, a description will be made of operations 703 and 705 shown in FIG. 7. In the following description, an electronic device may include the electronic device 201 shown in FIGS. 2A and 2B or at least a part thereof (e.g., the processor 220, the display driving integrated circuit 262, the touch sensor IC 291, and the pressure sensor IC 293).

Referring to FIG. 17, the electronic device (e.g., the processor 220) may determine whether or not to deactivate the power saving display mode in operation 1701. For example, the processor 220 may identify whether or not the display panel 261 is displaying one or more graphical elements.

If the power saving display mode is activated, the electronic device (e.g., the processor 220) may proceed to operation 1705, thereby executing a function related to the graphical element, based at least on a user input.

On the other hand, if the power saving display mode is deactivated, the electronic device (e.g., the processor 220) may proceed to operation 1703, thereby identifying the area in which a user input is detected. For example, the processor 220 may identify information related to a first display area 1820 and a second display area 1830 of a display screen 1810 from a memory as shown in FIG. 18. The first display area 1820 may be an area capable of displaying a specified first graphical element 1840 (e.g., a clock or icons), and the second display area 1830 may be an area capable of displaying a specified second graphical element 1850 (e.g., memo). For example, the processor 220 may identify that the area, in which the user input 1860 having a predetermined intensity (T1) or more is detected, is the second display area.

The electronic device (e.g., the processor 220) may display, on the display screen 1810, graphical elements corresponding to the area in which the user input 1860 is detected. For example, the processor 220 may display a second graphical element 1850 in the second display area 1830, and may maintain a black image on the first display area 1820, as shown in FIG. 18.

According to an embodiment, the electronic device (e.g., the display driving integrated circuit 262) may display the graphical elements in the graphical-element display area only during the duration in which a plurality of user inputs is received. Alternatively, the display driving integrated circuit 262 may display the graphical elements in the graphic display area only while a user input is maintained.

According to various embodiments, operations 1701 to 1707 may be executed by the display driving integrated circuit 262, and the processor 220 may remain in the sleep mode.

Figure 19:
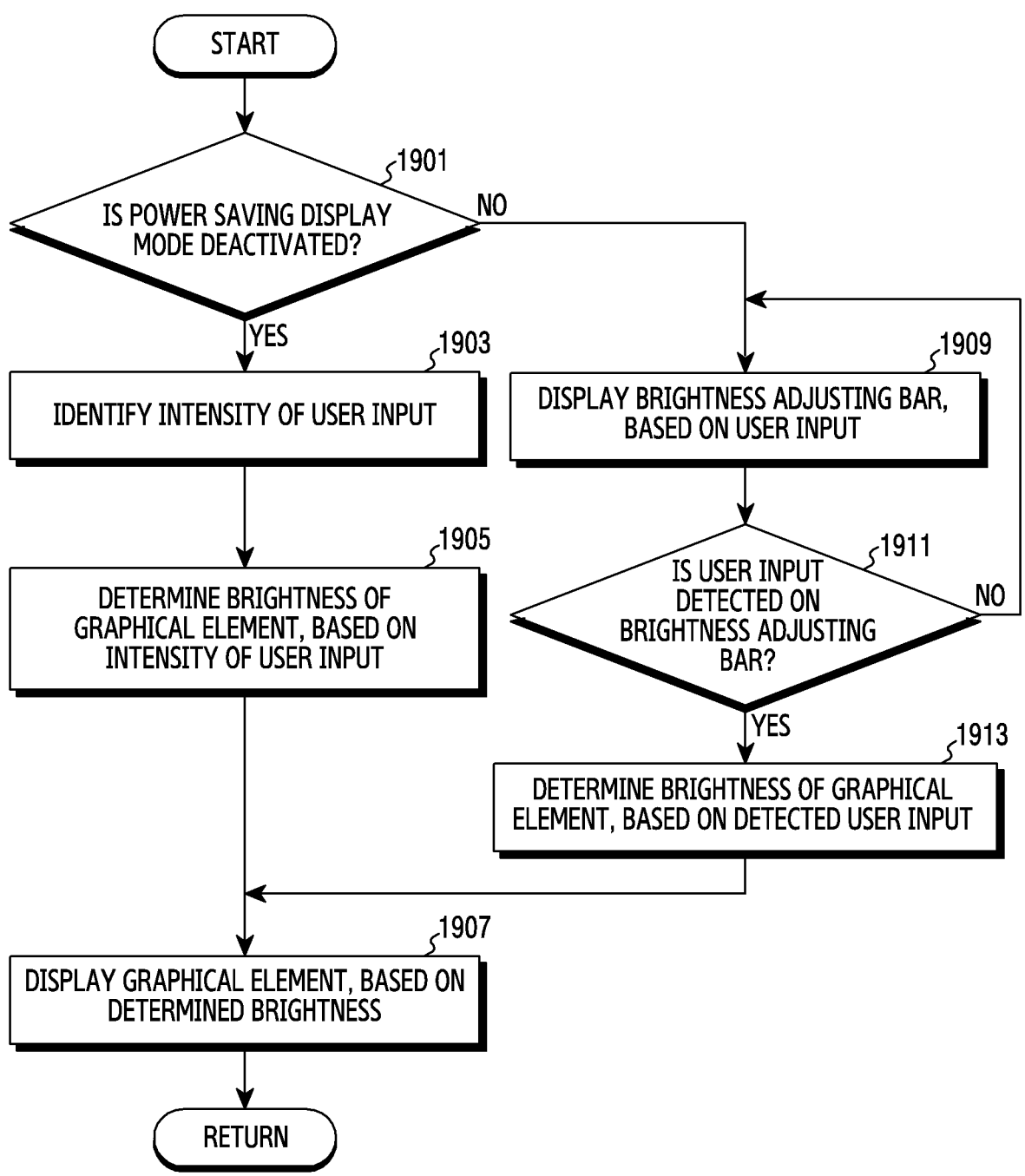
FIG. 19 is a flowchart illustrating a process of determining brightness of a graphical element in an electronic device according to various embodiments of the disclosure.
Figure 20:
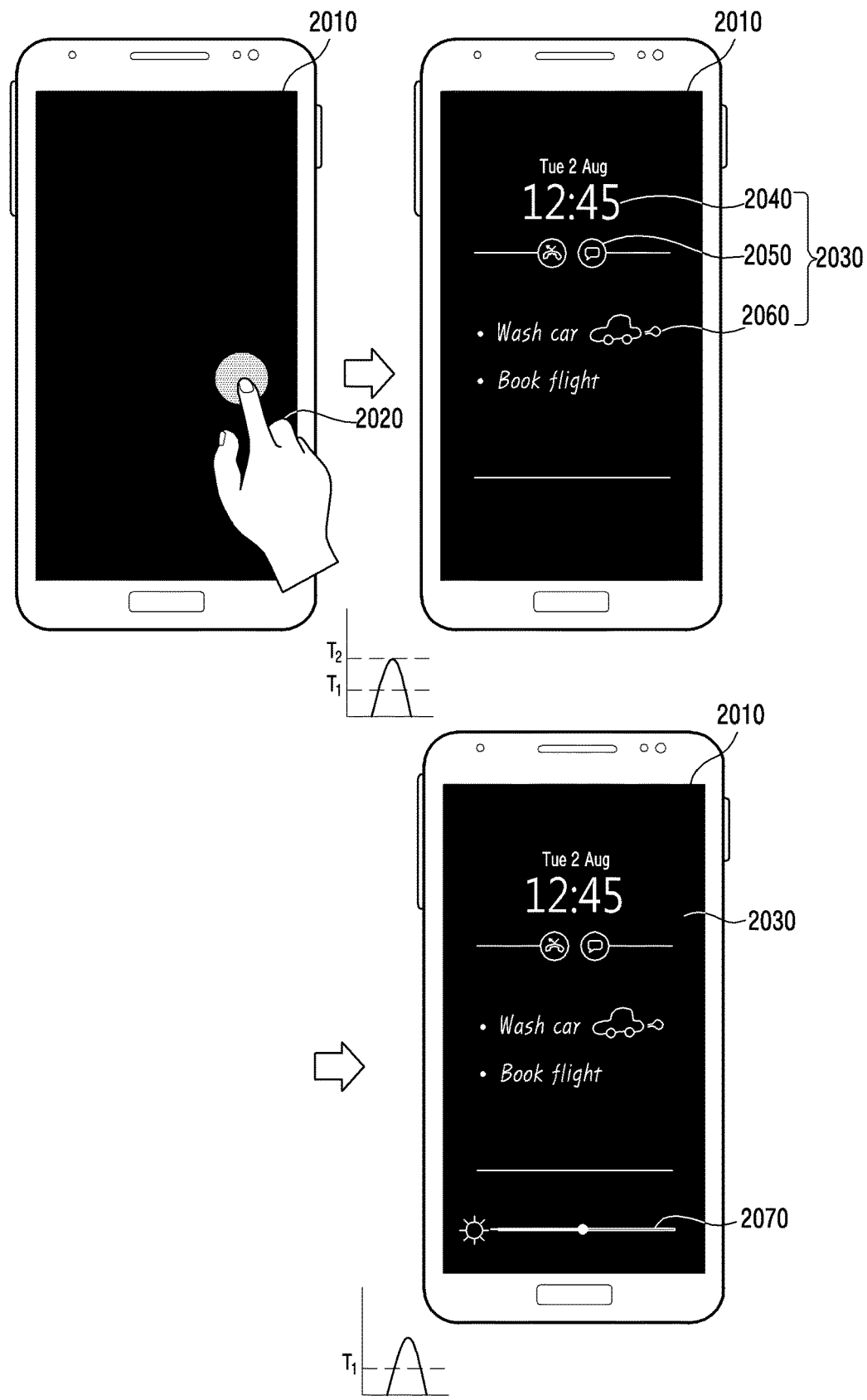
FIG. 20 illustrates a screen configuration for determining brightness of a graphical element in an electronic device according to various embodiments of the disclosure.

FIG. 19 is a flowchart illustrating a process of determining brightness of a graphical element in an electronic device according to various embodiments of the disclosure. FIG. 20 illustrates a screen configuration for determining brightness of a graphical element in an electronic device according to various embodiments of the disclosure. Hereinafter, a description will be made of operations 703 and 705 shown in FIG. 7. In the following description, an electronic device may include the electronic device 201 shown in FIGS. 2A and 2B or at least a part thereof (e.g., the processor 220, the display driving integrated circuit 262, the touch sensor IC 291, and the pressure sensor IC 293).

Referring to FIG. 19, the electronic device (e.g., the processor 220) may determine whether or not to deactivate the power saving display mode in operation 1901. For example, the processor 220 may identify whether or not the display panel 261 is displaying one or more graphical elements.

If the power saving display mode is deactivated, the electronic device (e.g., the processor 220) may proceed to operation 1903, thereby identifying the intensity of a user input. For example, the processor 220 may identify the intensity (T2) of the pressure of a user input 2020 having a predetermined intensity (T1) or more detected on the display screen 2010 as illustrated in FIG. 20.

In operation 1905, the electronic device (e.g., the processor 220) may determine the brightness of the graphical element, based on the intensity of the user input. For example, the processor 220 may primarily display the graphical element 2030 at the brightness of 60 nits in the power saving display mode, and may adjust the brightness up to 100 nits in response to the intensity of the pressure. For example, the processor 220 may gradually increase or decrease the brightness of graphical elements 2030 including the clock 2040, the icons 2050, and the memo 2060 in proportion to the intensity of the pressure.

In operation 1907, the electronic device (e.g., the display driving integrated circuit 262) may display graphical elements on the display screen 2010, based on the determined brightness. The display driving integrated circuit 262 may display the graphical elements 2030 at basic brightness on the display screen 2010, and may display, on the display screen 2010, the graphical elements 2030 at the brightness determined to correspond to the intensity of the pressure.

According to an embodiment, if pressure is detected while the power saving display mode is inactive as shown in FIG. 20, the display driving integrated circuit 262 may display the graphical elements 2030 at basic brightness along with a brightness adjusting bar 2070 on the display screen 2010. Accordingly, the display driving integrated circuit 262 may adjust the brightness of the graphical elements 2030 according to an additional user input detected on the brightness adjusting bar 2070.

On the other hand, if the power saving display mode is activated, the electronic device (e.g., the display driving integrated circuit 262) may proceed to operation 1909, thereby displaying a brightness adjusting bar 2070 on the display screen 2010, based on a user input. For example, if a user input is detected in the first area while displaying the graphical elements 2030, the display driving integrated circuit 262 may display the brightness adjusting bar 2070 together with the graphical elements 2030 on the display screen 2010.

According to an embodiment, although not shown in the drawing, the display driving integrated circuit 262 may adjust the brightness of the graphical elements 2030 according to the detected pressure, instead of separately displaying the brightness adjusting bar 2070.

In operation 1911, the electronic device (e.g., the display driving integrated circuit 262) may identify whether or not a user input is detected on the brightness adjusting bar using the touch sensor 290 or the pressure sensor 292.

If no user input is detected on the brightness adjusting bar 2070, the electronic device (e.g., the display driving integrated circuit 262) may proceed to operation 1909, thereby displaying the brightness adjusting bar 2070 on the display screen 2010 for a specified period of time.

On the other hand, if the electronic device (e.g., the display driving integrated circuit 262) detects a user input on the brightness control bar 2070 using the touch sensor 290 or the pressure sensor 292, the electronic device may proceed to operation 1913, thereby determining the brightness of graphical elements, based on the user input. For example, the display driving integrated circuit 262 may change the brightness of the graphical elements 2030 being displayed, based at least on the user input.

The electronic device (e.g., the display driving integrated circuit 262) may proceed from operation 1913 to operation 1907, thereby displaying the graphical elements 2030 on the display screen 2010 at the determined brightness.

According to various embodiments of the disclosure, operations 1901 to 1913 may be executed by the display driving integrated circuit 262, and the processor 220 may remain in the sleep mode.

Figure 21:
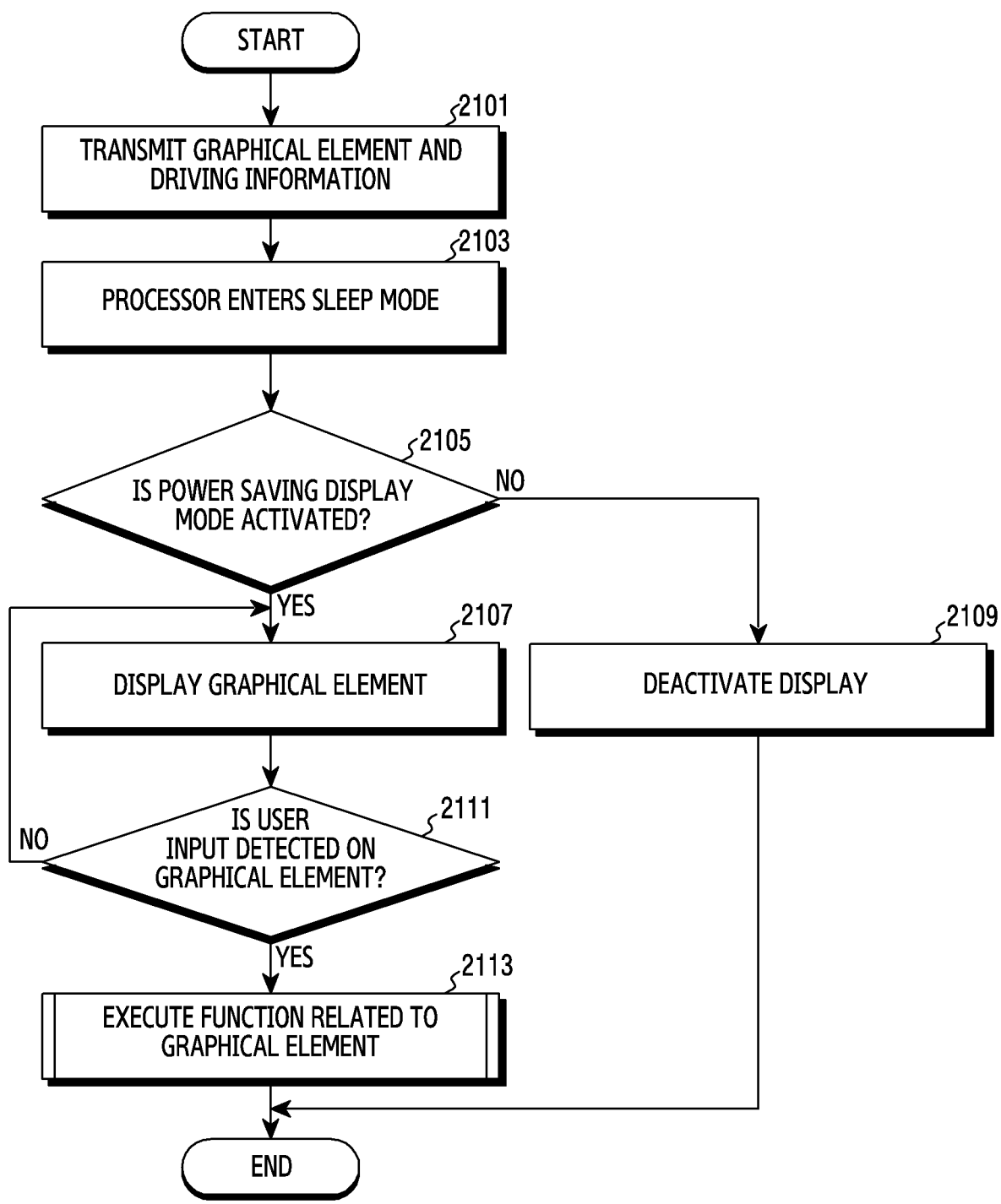
FIG. 21 is a flowchart illustrating a process of executing a function related to a graphical element in an electronic device according to various embodiments of the disclosure.

FIG. 21 is a flowchart illustrating a process of executing a function related to a graphical element in an electronic device according to various embodiments of the disclosure. In the following description, an electronic device may include the electronic device 201 shown in FIGS. 2A and 2B or at least a part thereof (e.g., the processor 220, the display driving integrated circuit 262, the touch sensor IC 291, and the pressure sensor IC 293).

Referring to FIG. 21, the electronic device (e.g., the processor 220) may transmit graphical elements and driving information to the display driving integrated circuit 262 in operation 2101. For example, the processor 220 may transmit graphical elements and driving information to the display driving integrated circuit 262. For example, the graphical elements may include at least one of an icon, an image, time, a date, a font, a graphic use time, or a user-specified phrase. The driving information may include at least one of an update period of a graphical element, a display size of a graphical element, an amount of display information of a graphical element, a display time of a graphical element, display brightness of a graphical element, associated function information of a graphical element (e.g., an application associated with a graphical element), or a display area of a graphical element.

In operation 2103, the electronic device (e.g., the processor 220) may switch the state of the processor 220 to a sleep mode. For example, as the processor 220 switches to the sleep state, the electronic device 201 may operate in a power saving display mode. In the power saving display mode, the touch sensor IC 291 or the pressure sensor IC 293 may detect a user input.

In operation 2105, the electronic device (e.g., the display driving integrated circuit 262) may determine whether or not to activate the power saving display mode. For example, as the electronic device 201 is driven in the power saving display mode, the display driving integrated circuit 262 may determine whether or not to activate the power saving display mode. For example, the display driving integrated circuit 262 may determine whether or not to display the graphical elements in the graphical-element display area of the display panel 261, based on the graphical elements and the driving information.

If it is determined that the power saving display mode is to be deactivated, the electronic device (e.g., the display driving integrated circuit 262) may proceed to operation 2109, thereby deactivating the display panel 261. For example, the display driving integrated circuit 262 may display a black background screen.

On the other hand, if it is determined that the power saving display mode is to be activated, the electronic device (e.g., the display driving integrated circuit 262) may proceed to operation 2107, thereby displaying the graphical elements in the graphical-element display area 1010 of the display panel 261.

The electronic device (e.g., the touch sensor IC 291 or the pressure sensor IC 293) may detect a user input on the graphical elements in operation 2111. For example, the touch sensor IC 291 or the pressure sensor IC 293 may detect a touch or pressure on the graphical elements using the touch sensor 290 or the pressure sensor 292, respectively.

In operation 2113, the electronic device (e.g., the processor 220) may execute functions related to the graphical elements. For example, the processor 220 may be activated if a touch or pressure is detected on the graphical elements, and may execute functions related to the graphical elements. Meanwhile, operation 2113 may be performed by the display driving integrated circuit 262, the touch sensor IC 291, or the pressure sensor IC 293.

Figure 22:
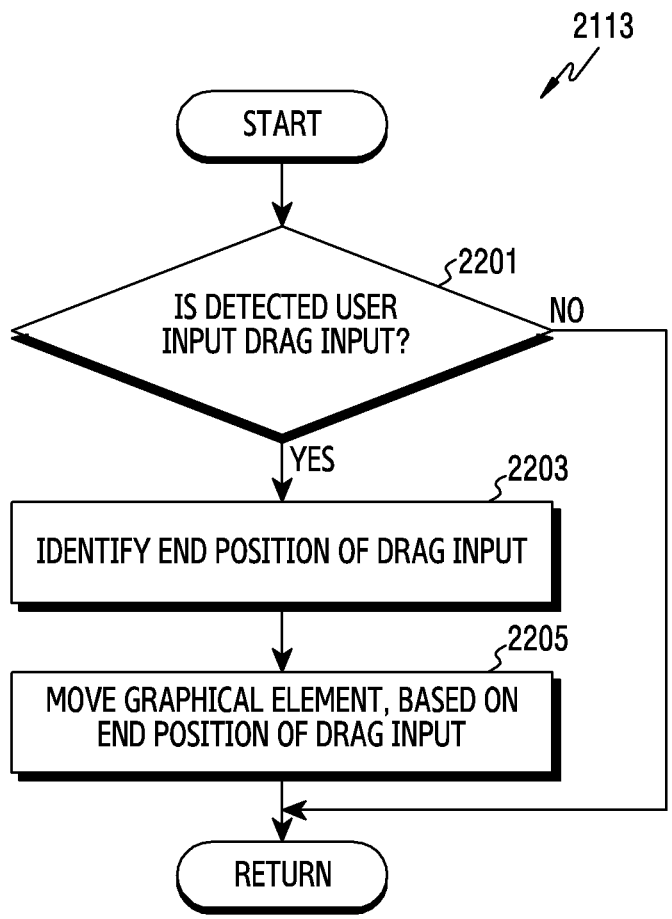
FIG. 22 is a flowchart illustrating a process of determining movement of a graphical element in an electronic device according to various embodiments of the disclosure.
Figure 23:
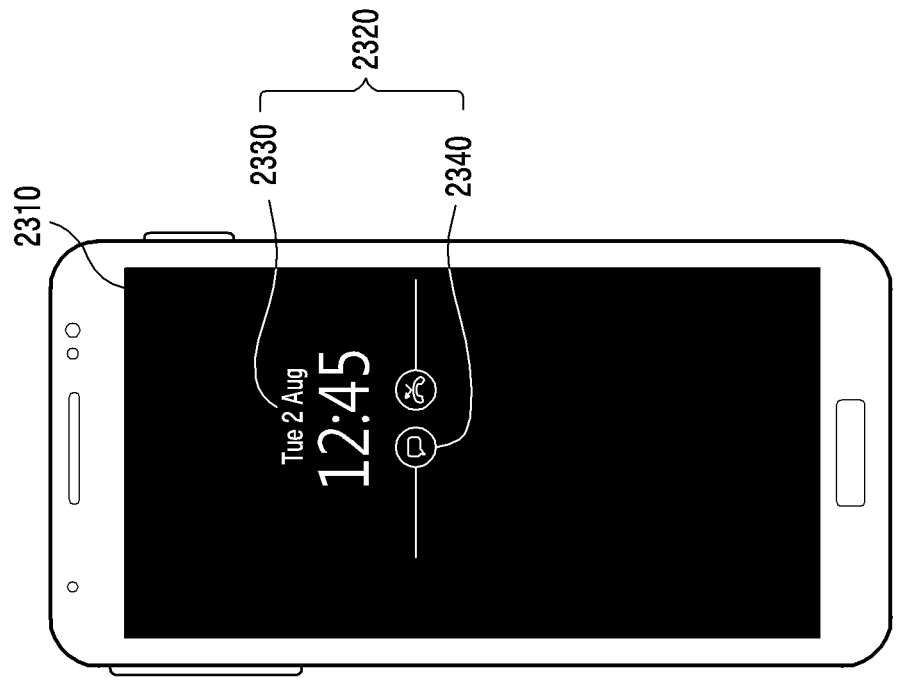
FIG. 23 illustrates a screen configuration for determining movement of a graphical element in an electronic device according to various embodiments of the disclosure.
Figure 23:
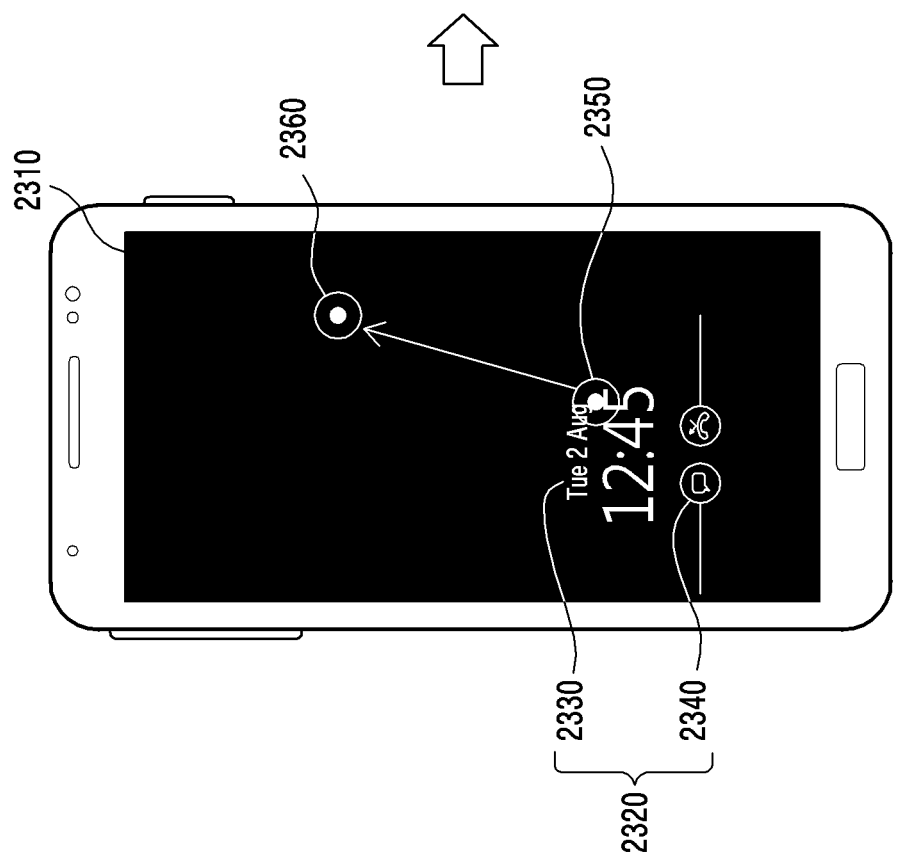

FIG. 22 is a flowchart illustrating a process of determining movement of a graphical element in an electronic device according to various embodiments of the disclosure. FIG. 23 illustrates a screen configuration for determining movement of a graphical element in an electronic device according to various embodiments of the disclosure. Hereinafter, a description will be made of operation 2113 shown in FIG. 21. In the following description, an electronic device may include the electronic device 201 shown in FIGS. 2A and 2B or at least a part thereof (e.g., the processor 220, the display driving integrated circuit 262, the touch sensor IC 291, and the pressure sensor IC 293).

Referring to FIG. 22, the electronic device (e.g., the processor 220) may identify whether or not a detected user input is a drag input in operation 2201. For example, the processor 220 may identify whether or not a drag input moving from a first point 2350 of the graphical elements 2320 including a clock 2330 and icons 2340 to a second point 2360 of the display screen 2310, as shown in FIG. 23, is received.

If the user input is not a drag input, the electronic device (e.g., the processor 220) may return to the power saving display mode, thereby displaying the graphical elements.

On the other hand, if the user input is a drag input, the electronic device (e.g., the processor 220) may identify the end position of the drag input in operation 2203. For example, the processor 220 may identify the end position of the detected drag input (e.g., a second point 2360).

The electronic device (e.g., the processor 220) may move the graphical elements, based on the end position of the drag input in operation 2205. For example, the processor 220 may display the graphical elements 2320 on the second point 2360 of the display screen 2310 as shown in FIG. 23.

According to various embodiments of the disclosure, operations 2201 to 2205 may be executed by the display driving integrated circuit 262, and the processor 220 may remain in the sleep mode.

Figure 24:
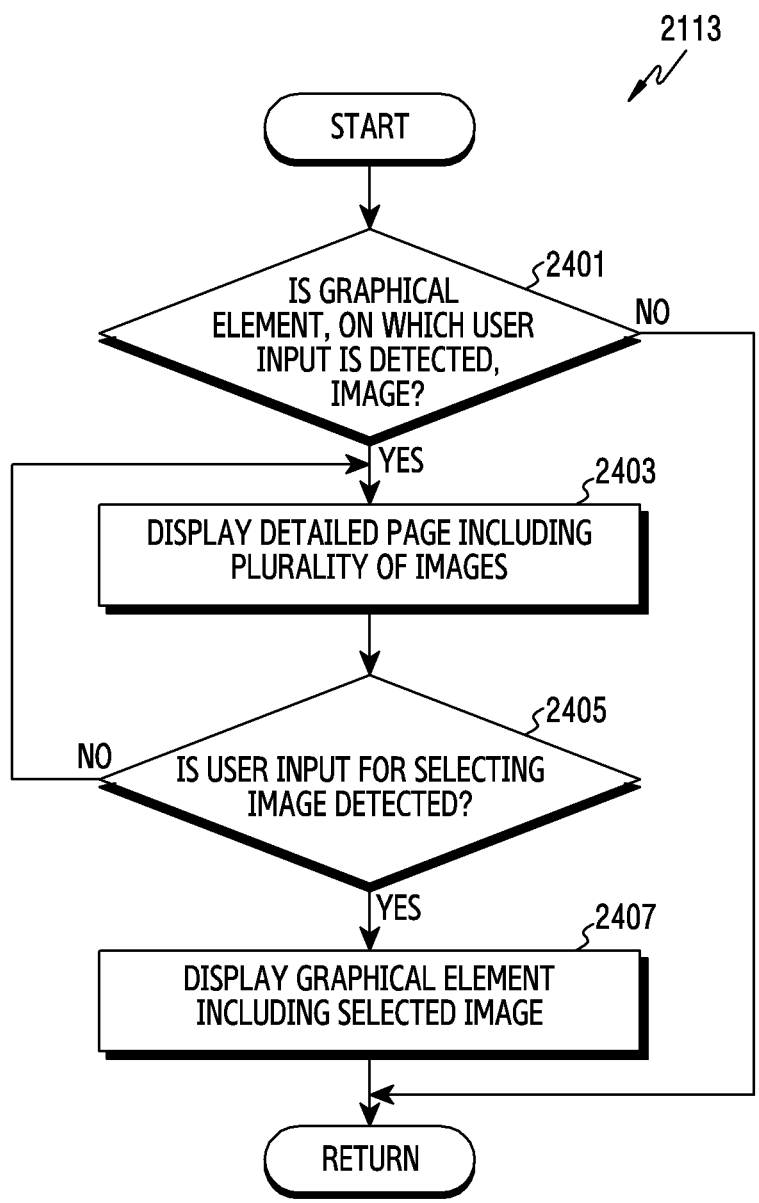
FIG. 24 is a flowchart illustrating a process of replacing an image included in graphical elements in an electronic device according to various embodiments of the disclosure.
Figure 25:
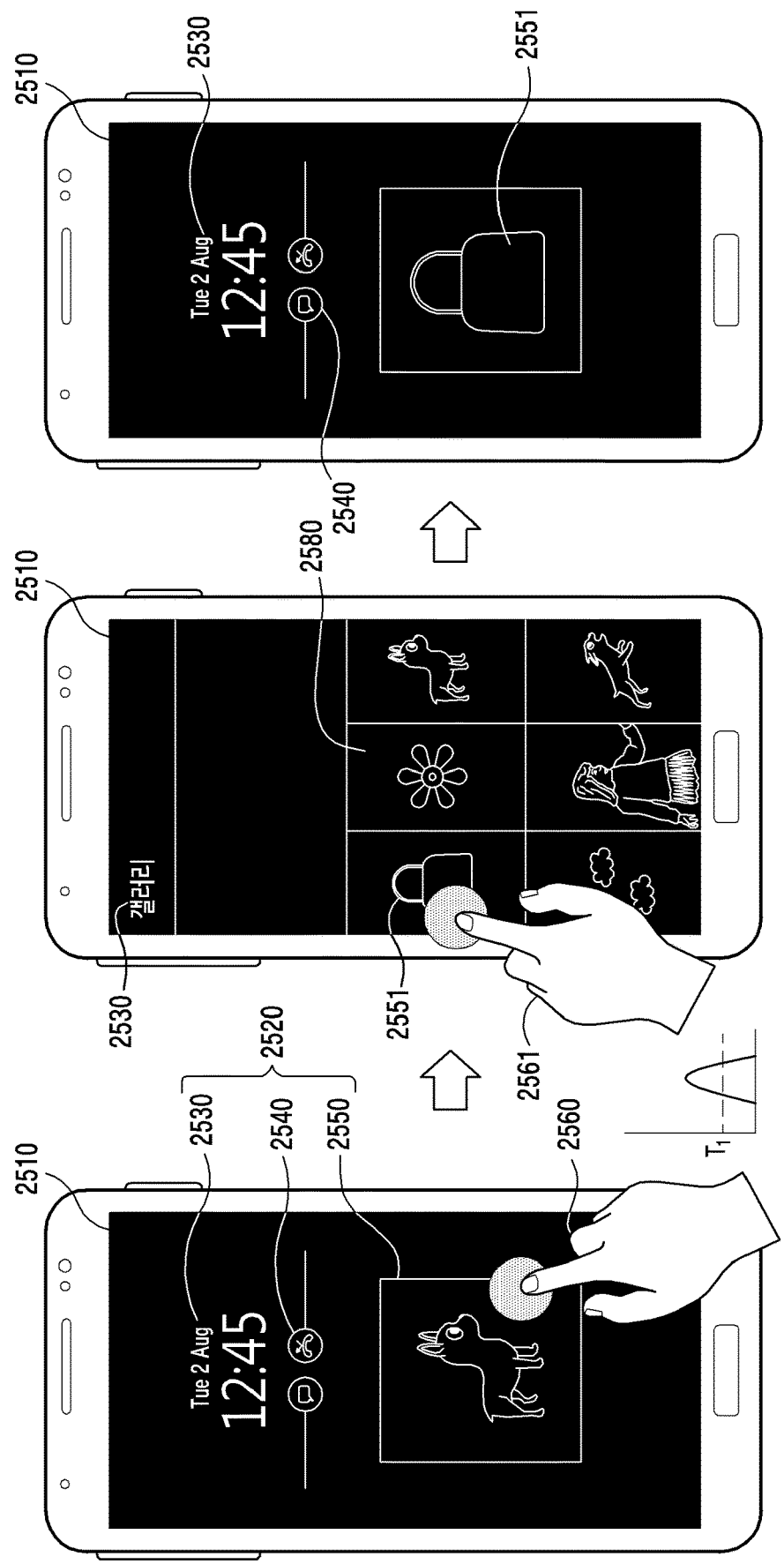
FIG. 25 illustrates a screen configuration for replacing an image included in graphical elements in an electronic device according to various embodiments of the disclosure.

FIG. 24 is a flowchart illustrating a process of replacing an image included in a graphical element in an electronic device according to various embodiments of the disclosure. FIG. 25 illustrates a screen configuration for replacing an image included in a graphical element in an electronic device according to various embodiments of the disclosure. Hereinafter, a description will be made of operation 2113 shown in FIG. 21. In the following description, an electronic device may include the electronic device 201 shown in FIGS. 2A and 2B or at least a part thereof (e.g., the processor 220, the display driving integrated circuit 262, the touch sensor IC 291, and the pressure sensor IC 293).

Referring to FIG. 24, the electronic device (e.g., the processor 220) may determine whether or not a graphical element on which a user input is detected is an image in operation 2401. For example, the processor 220 may identify a graphical element 2520 on which a user input is detected, among the graphical elements 2520 including a clock 2530, icons 2540, and an image 2550 being displayed on the display screen 2510 as shown in FIG. 25. For example, the processor 220 may identify that a user input 2560 having a predetermined intensity (T1) or more is detected on the image 2550.

If a user input is not detected on the image, the electronic device (e.g., the processor 220) may execute a function related to a graphical element on which a user input is detected.

On the other hand, if a user input is detected on the image, the electronic device (e.g., the processor 220) may proceed to operation 2403, thereby displaying a detailed page including a plurality of images. For example, the processor 220 may display a gallery 2570 including a plurality of images 2580 on the display screen 2570 as shown in FIG. 25.

The electronic device (e.g., the processor 220) may identify whether or not a user input for selecting at least one image is detected using the touch sensor 290 or the pressure sensor 292 in operation 2405. For example, the processor 220 may detect a user input 2561 having a predetermined intensity (T1) or more for selecting one image 2551 from among a plurality of images 2580 displayed on the display screen 2310 using the touch sensor 290 or the pressure sensor 292 as shown in FIG. 25.

If a user input for selecting at least one image is not detected, the electronic device (e.g., the processor 220) may proceed to operation 2403, thereby displaying a gallery 2570 on the display screen 2510.

On the other hand, if a user input for selecting at least one image is detected, the electronic device (e.g., the processor 220) may proceed to operation 2407, thereby displaying graphical elements including the selected image on the display screen 2510. For example, the processor 220 may display graphical elements 2520 including the selected image 2551 on the display screen 2510 as shown in FIG. 25. For example, the processor 220 may display the selected image 2551 on the display screen 2510 by replacing the previous image 2550 with the same.

According to various embodiments of the disclosure, operations 2401 to 2407 may be executed by the display driving integrated circuit 262, and the processor 220 may remain in the sleep mode.

Figure 26:
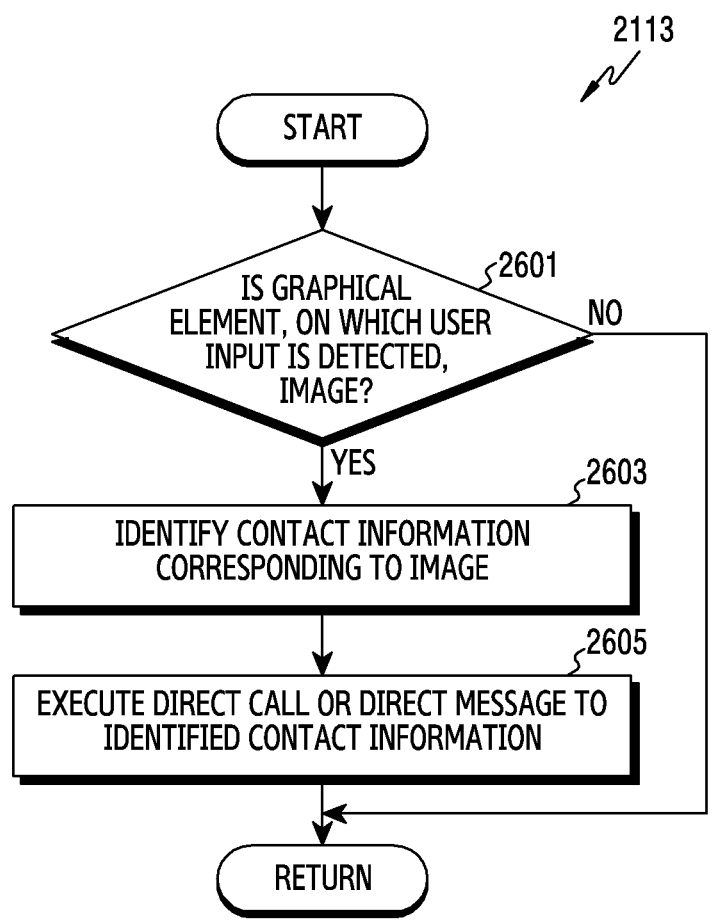
FIG. 26 is a flowchart illustrating a process of executing a direct call or a direct message to contact information corresponding to a graphical element in an electronic device according to various embodiments of the disclosure.
Figure 27:
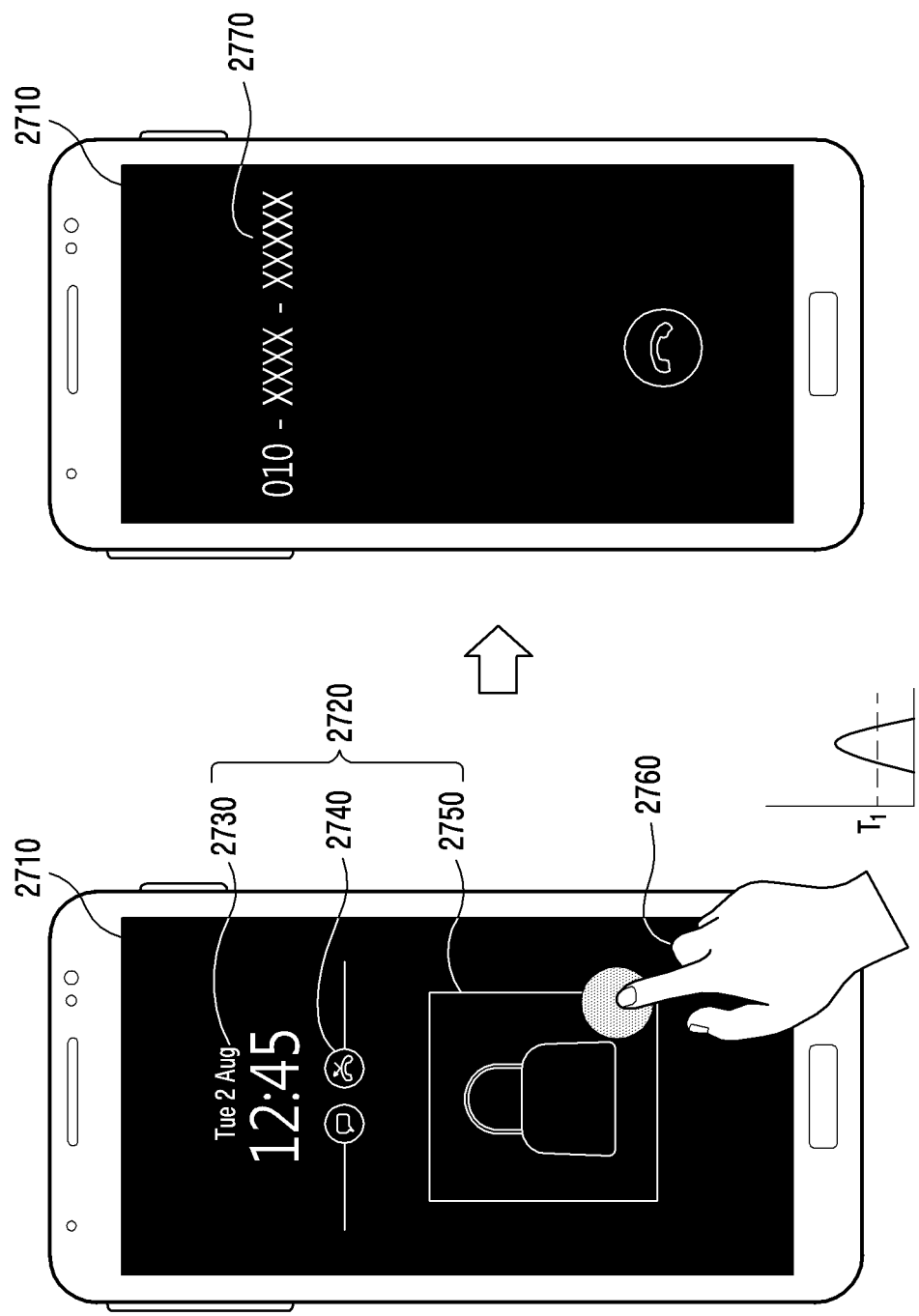
FIG. 27 illustrates a screen configuration for executing a direct call or a direct message to contact information corresponding to a graphical element in an electronic device according to various embodiments of the disclosure.

FIG. 26 is a flowchart illustrating a process of executing a direct call or a direct message to contact information corresponding to a graphical element in an electronic device according to various embodiments of the disclosure. FIG. 27 illustrates a screen configuration for executing a direct call or a direct message to contact information corresponding to a graphical element in an electronic device according to various embodiments of the disclosure. Hereinafter, a description will be made of operation 2113 shown in FIG. 21. In the following description, an electronic device may include the electronic device 201 shown in FIGS. 2A and 2B or at least a part thereof (e.g., the processor 220, the display driving integrated circuit 262, the touch sensor IC 291, and the pressure sensor IC 293).

Referring to FIG. 26, the electronic device (e.g., the processor 220) may identify whether or not a graphical element on which a user input is detected is an image in operation 2601. For example, the processor 220 may identify a graphical element on which a user input is detected among graphical elements 2720 including a clock 2730, icons 2740, and a portrait picture 2750 being displayed on the display screen 2710 as shown in FIG. 27. For example, the processor 220 may identify that a user input 2760 having a predetermined intensity (T1) or more is detected on the portrait picture 2750.

If a user input is not detected on the image, the electronic device (e.g., the processor 220) may execute a function related to a graphical element on which a user input is detected.

On the other hand, if a user input is detected on the image, the electronic device (e.g., the processor 220) may proceed to operation 2603, thereby identifying contact information corresponding to the image. For example, the processor 220 may identify contact information corresponding to the portrait picture 2760 from a memory as shown in FIG. 27.

The electronic device (e.g., the processor 220) may execute a direct call or a direct message to the identified contact information in operation 2605. For example, the processor 220 may execute a direct call to the contact information 2770 corresponding to the portrait picture 2760 using a communication module as shown in FIG. 27.

According to various embodiments of the disclosure, operations 2601 to 2605 may be executed by the display driving integrated circuit 262, and the processor 220 may remain in the sleep mode.

Figure 28:
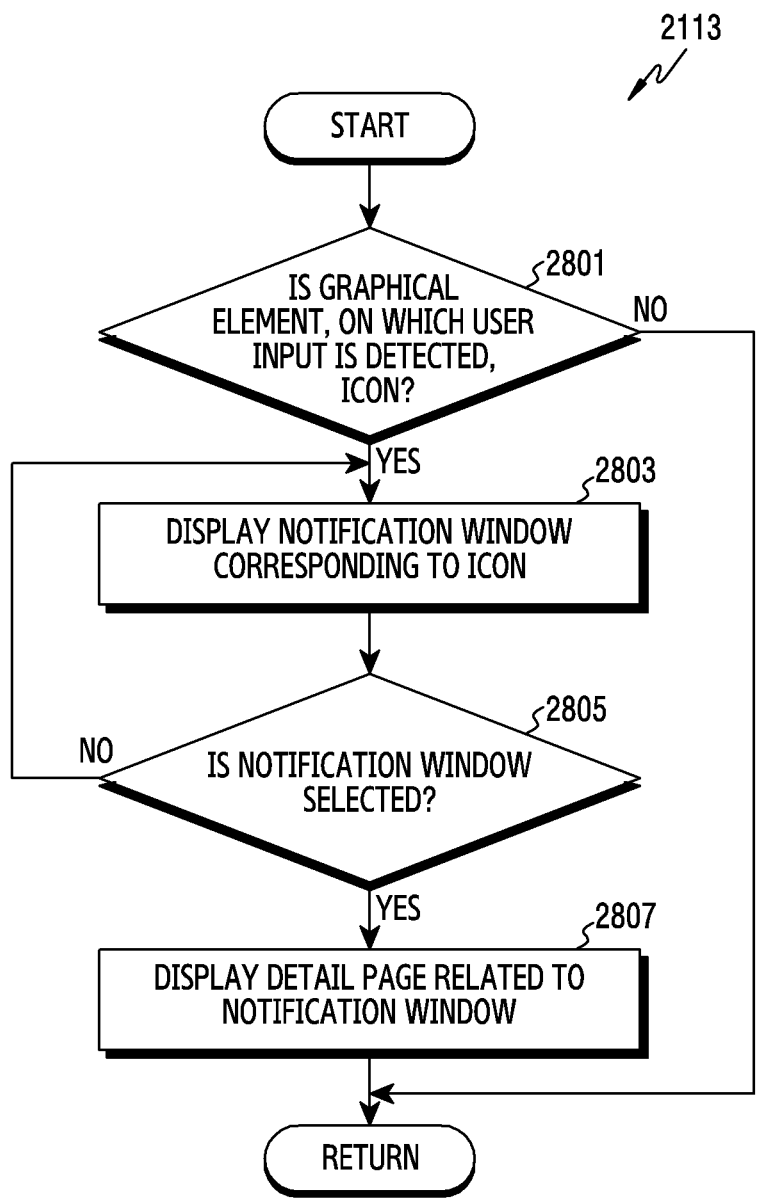
FIG. 28 is a flowchart illustrating a process of displaying a notification window corresponding to a graphical element in an electronic device according to various embodiments of the disclosure.
Figure 29:
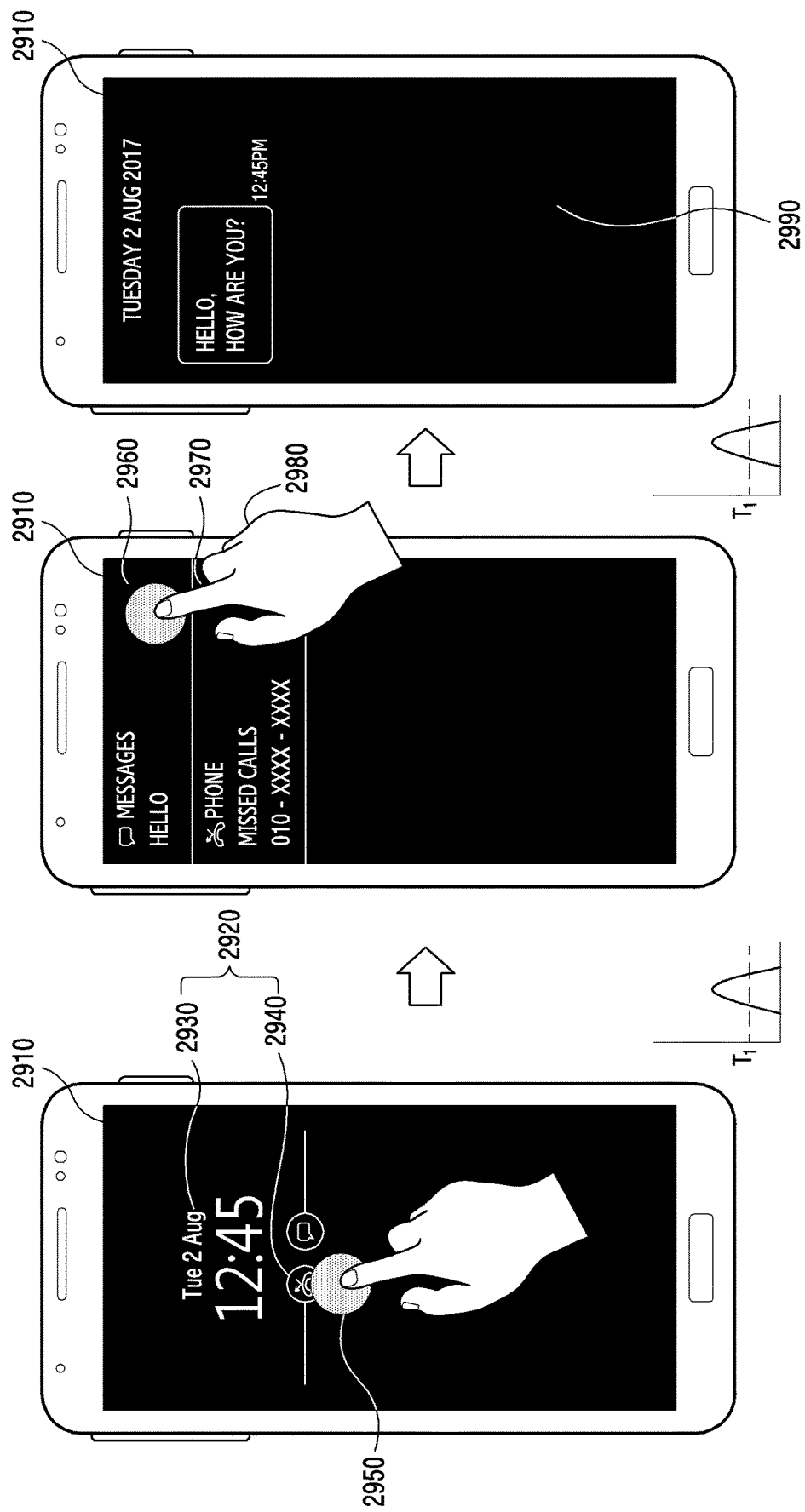
FIG. 29 is a diagram illustrating a screen configuration for displaying a notification window corresponding to a graphical element in an electronic device according to various embodiments of the disclosure.

FIG. 28 is a flowchart illustrating a process of displaying a notification window corresponding to a graphical element in an electronic device according to various embodiments of the disclosure. FIG. 29 is a diagram illustrating a screen configuration for displaying a notification window corresponding to a graphical element in an electronic device according to various embodiments of the disclosure. Hereinafter, a description will be made of operation 2113 shown in FIG. 21. In the following description, an electronic device may include the electronic device 201 shown in FIGS. 2A and 2B or at least a part thereof (e.g., the processor 220, the display driving integrated circuit 262, the touch sensor IC 291, and the pressure sensor IC 293).

Referring to FIG. 28, the electronic device (e.g., the processor 220) may identify whether or not a graphical element on which a user input is detected is an icon in operation 2801. For example, the processor 220 may identify a graphical element 2920 on which a user input is detected among graphical elements 2920 including a clock 2930 and icons 2940 being displayed on the display screen 2910 as shown in FIG. 29. For example, the processor 220 may identify that a user input 2950 having a predetermined intensity (T1) or more is detected on the icon 2940.

If a user input is not detected on the icon, the electronic device (e.g., the processor 220) may execute a function related to a graphical element on which a user input is detected.

On the other hand, if a user input is detected on the icon, the electronic device (e.g., the processor 220) proceeds to operation 2803, thereby displaying notification windows 2960 and 2970 corresponding to the icon 2940 on the display screen 2910. For example, the processor 220 may display a message-related notification window 2960 and a call-related notification window 2970 on the display screen 2910 as shown in FIG. 29.

The electronic device (e.g., the processor 220) may identify whether or not a user input for selecting a notification window is detected in operation 2805. For example, the processor 220 may identify whether or not a user input 2980 having a predetermined intensity (T1) or more for selecting the message-related notification window 2960 is detected as shown in FIG. 29.

If a user input for selecting a notification window is not detected, the electronic device (e.g., the processor 220) may proceed to operation 2803 to continue to display the notification window corresponding to the icon on the display screen 2910. Alternatively, the processor 220 may display the graphical elements 2920 on the display screen 2910.

On the other hand, if a user input for selecting a notification window is detected, the electronic device (e.g., the processor 220) may proceed to operation 2807, thereby displaying a detailed page related to the notification window. For example, the processor 220 may display a message-related detail page 2900 on the display screen 2910 as shown in FIG. 29. The processor 220 may display the details of the message through the detailed page 2900 of the display screen 2910.

According to various embodiments, operations 2801 to 2807 may be executed by the display driving integrated circuit 262, and the processor 220 may remain in the sleep mode.

According to various embodiments of the disclosure, a method of operating an electronic device may include an operation of allowing a display driving integrated circuit to display one or more graphical elements in a selected area of a display having a substantially black background screen while at least a portion of a processor is in a sleep mode, to detect a change in pressure using a pressure sensor IC, and to deactivate the display in response to the detected change in the pressure.

According to various embodiments, the one or more graphical elements may include at least one of text, numbers, symbols, or icons.

According to various embodiments, the processor may include an application processor and a micro control unit electrically connected to the display and the pressure sensor IC, and the method may further include an operation of allowing the display driving integrated circuit to display the one or more graphical elements using the micro control unit while the application processor is in a sleep mode.

According to various embodiments, the method may further include an operation of detecting the change in the pressure and deactivating the display using the micro control unit while the application processor is in the sleep mode.

According to various embodiments of the disclosure, a method of operating an electronic device may further include an operation of detecting a change in pressure using a pressure sensor IC while a display is inactive and an operation of allowing a display driving integrated circuit to display one or more graphical elements in a selected area of the display having a substantially black background screen in response to the detected change in the pressure while at least a portion of a processor is in a sleep mode.

According to various embodiments, the one or more graphical elements may include at least one of text, numbers, symbols, or icons.

According to various embodiments, the processor may include an application processor and a micro control unit electrically connected to the display and the pressure sensor IC, and the method may further include an operation of allowing the display driving integrated circuit to display the one or more graphical elements using the micro control unit while the application processor is in a sleep mode.

According to various embodiments, the method may further include an operation of detecting the change in the pressure and deactivating the display using the micro control unit while the application processor is in the sleep mode.

According to various embodiments of the disclosure, a method of operating an electronic device may further include an operation of detecting a user input using a sensor IC, an operation of identifying a state of a power saving display mode using a processor, based at least on the user input, and an operation of determining activation or deactivation of the power saving display mode using the processor, based at least on the user input and the state of the power saving display mode.

According to various embodiments, the method may further include an operation of detecting the user input using the sensor IC while at least a portion of the processor is in a sleep mode, and an operation of determining whether or not a position in which the user input is detected is a specified first area of the display.

According to various embodiments, the method may further include an operation of, if the position in which the user input is detected is a specified first area of the display, identifying the state of the power saving display mode, based at least on the user input.

According to various embodiments, the method may further include an operation of, if the identified state of the power saving display mode is an inactive state, controlling the display driving integrated circuit so as to display one or more graphical elements in a second area of the display, based at least on the user input.

According to various embodiments, the method may further include an operation of, if the identified state of the power saving display mode is an active state, controlling the display driving integrated circuit so as to release display of one or more graphical elements on the display, based at least on the user input.

According to various embodiments, the method may further include an operation of determining a function of the power saving display mode, based at least on the user input, an operation of transmitting control information including the determined function of the power saving display mode to the display driving integrated circuit, and an operation of allowing the display driving integrated circuit to display one or more graphical elements on the display, based at least on the control information.

According to various embodiments, the method may further include an operation of determining a function of the power saving display mode, based on at least one of a duration, a detection position, or an intensity of a user input or a plurality of user inputs.

According to various embodiments, the function of the power saving display mode may include at least one of a size of a graphical element, a display time of a graphical element, a display area of a graphical element, brightness of a graphical element, an update period of a graphical element, or an application associated with a graphical element.

According to various embodiments, the method may further include an operation of allowing the display driving integrated circuit to display one or more graphical elements while the processor is in a sleep mode, an operation of detecting a user input on the graphical element, and an operation of executing a function related to the graphical element, based at least on the user input detected on the graphical element.

According to various embodiments, the function related to the graphical element may include at least one of movement of the graphical element, change of the graphical element, execution of an application associated with the graphical element, or display of a notification window associated with the graphical element The term "module" as used herein may include a unit including hardware, software, or firmware, and may, for example, be used interchangeably with the term "logic", "logical block", "component", "circuit", or the like. The "module" may be an integrated element, or a minimum unit for performing one or more functions or a part thereof. The "module" may be mechanically or electronically implemented and may include, for example, an application-specific integrated circuit (ASIC) chip, a field-programmable gate arrays (FPGA), or a programmable-logic device, which has been known or are to be developed in the future, for performing certain operations.

At least some of devices (e.g., modules or functions thereof) or methods (e.g., operations) according to various embodiments may be implemented by an instruction which is stored a computer-readable storage medium (e.g., the memory 230) in the form of a program module. The instruction, when executed by a processor (e. g., the processor 220 or 520), may cause the one or more processors to execute the function corresponding to the instruction. The computer-readable storage medium may include a hard disk, a floppy disk, a magnetic medium (e.g., a magnetic tape), an Optical Media (e.g., CD-ROM, DVD), a Magneto-Optical Media (e.g., a floptical disk), an inner memory, etc. The instruction may include a code made by a complier or a code that can be executed by an interpreter. The programming module according to the disclosure may include one or more of the aforementioned elements or may further include other additional elements, or some of the aforementioned elements may be omitted.

Operations performed by a module, a programming module, or other elements according to various embodiments may be executed sequentially, in parallel, repeatedly, or in a heuristic manner. At least some operations may be executed according to another sequence, may be omitted, or may further include other operations.

Various embodiments disclosed herein are provided merely to easily describe technical details of the disclosure and to help the understanding of the disclosure, and are not intended to limit the scope of the disclosure. Therefore, it should be construed that all modifications and changes or modified and changed forms based on the technical idea of the disclosure fall within the scope of the disclosure.

The invention claimed is:
1. An electronic device comprising:
a housing comprising a first plate and a second plate facing in a direction opposite the first plate;
a display positioned inside the housing and exposed through a portion of the first plate;

a touch sensor integrated circuit (IC) positioned between the first plate and the second plate and configured to detect a user input applied to the first plate;
a pressure sensor integrated circuit (IC) positioned between the touch sensor IC and the second plate and configured to detect a pressure applied to the first plate by the user input;
a wireless communication circuit positioned inside the housing;
a display driving integrated circuit positioned inside the housing;
at least one processor positioned inside the housing and electrically connected to the display, the touch sensor IC, the pressure sensor IC, the wireless communication circuit, and the display driving integrated circuit; and
a memory positioned inside the housing and electrically connected to the processor,
wherein the memory stores instructions that, when executed, cause the display driving integrated circuit to:
while at least a portion of the processor is in a sleep mode, display one or more graphical elements in a selected area of the display having a substantially black background screen,
detect the user input using the touch sensor IC,
determine whether the user input is in a first area of the display,
based on determining that the user input is in the first area of the display, deactivate the displaying of the one or more graphical elements in response to detecting a change in pressure of the user input using the pressure sensor IC, and
based on determining that the user input is in a second area of the display other than the first area of the display, maintain the displaying of the one or more graphical elements, and
wherein the first area of the display and the second area of the display are substantially on a same plane.

2. The electronic device of claim 1,
wherein the at least one processor comprises an application processor and a micro control unit electrically connected to the display, the touch sensor IC, and the pressure sensor IC, and
wherein the instructions cause the micro control unit to perform control such that the display driving integrated circuit displays the one or more graphical elements while the application processor is in the sleep mode.

3. The electronic device of claim 2, wherein the instructions further cause the micro control unit to detect the change in the pressure and to deactivate the display while the application processor is in the sleep mode.

4. An electronic device comprising:
a housing comprising a first plate and a second plate facing in a direction opposite the first plate;
a display positioned inside the housing and exposed through a portion of the first plate;
a touch sensor integrated circuit (IC) positioned between the first plate and the second plate and configured to detect a user input applied to the first plate;
a pressure sensor integrated circuit (IC) positioned between the touch sensor IC and the second plate and configured to detect a pressure applied to the first plate by the user input;
a wireless communication circuit positioned inside the housing;
a display driving integrated circuit positioned inside the housing;
a processor positioned inside the housing and electrically connected to the display, the touch sensor IC, the pressure sensor IC, the wireless communication circuit, and the display driving integrated circuit; and
a memory positioned inside the housing and electrically connected to the processor,
wherein the memory stores instructions that, when executed, cause the touch sensor IC to detect the user input while the display is inactive,
wherein the memory stores instructions that, when executed, further cause the pressure sensor IC to detect a change in pressure while the display is inactive,
wherein the memory stores instructions that, when executed, further cause the display driving integrated circuit to:
while at least a portion of the processor is in a sleep mode and the display is inactive, detect the user input using the touch sensor IC,
determine whether the user input is in a first area of the display,
based on determining that the user input is in the first area of the display, display one or more graphical elements in a selected area of the display having a substantially black background screen in response to detecting a change in pressure of the user input using the pressure sensor IC, and
based on determining that the user input is in a second area of the display other than the first area of the display, maintain the display inactive, and
wherein the first area of the display and the second area of the display are substantially on a same plane.

5. The electronic device of claim 4,
wherein the processor comprises an application processor and a micro control unit electrically connected to the display, the touch sensor IC, and the pressure sensor IC, and
wherein the instructions further cause the micro control unit to perform control such that the display driving integrated circuit displays the one or more graphical elements while the application processor is in a sleep mode.

6. The electronic device of claim 5, wherein the instructions further cause the micro control unit to detect the change in the pressure and to deactivate the display while the application processor is in the sleep mode.

7. The electronic device of claim 1, wherein the one or more graphical elements comprise at least one of text, numbers, symbols, or icons.

8. The electronic device of claim 4, wherein the one or more graphical elements include at least one of text, numbers, symbols, or icons.

* * * * *